United States Patent [19]

Freiling et al.

[11] Patent Number: 4,816,994

[45] Date of Patent: Mar. 28, 1989

[54] RULE ACQUISITION FOR EXPERT SYSTEMS

[75] Inventors: Michael J. Freiling, Portland; James H. Alexander, Beaverton; Brian Phillips, Aloha; Steven L. Messick, Portland, all of Oreg.

[73] Assignee: Tektronix, Inc., Beaverton, Oreg.

[21] Appl. No.: 678,193

[22] Filed: Dec. 4, 1984

[51] Int. Cl.[4] .............................................. G06F 15/18

[52] U.S. Cl. .................................... 364/200; 364/300; 364/513

[58] Field of Search ... 364/200 MS File, 900 MS File, 364/513, 513.5, 300

[56] References Cited

U.S. PATENT DOCUMENTS

| | | | |
|---|---|---|---|
| 4,286,330 | 8/1981 | Isaacson | 364/900 |
| 4,479,241 | 10/1984 | Buckley | 382/15 |
| 4,591,983 | 5/1986 | Bennett et al. | 364/403 |
| 4,593,367 | 6/1986 | Slack et al. | 364/513 |
| 4,595,982 | 6/1986 | Burt | 364/300 |
| 4,599,691 | 7/1986 | Sakai et al. | 364/419 |
| 4,599,692 | 7/1986 | Tan et al. | 364/513 |
| 4,599,693 | 7/1986 | Denenberg | 364/513 |
| 4,635,199 | 1/1987 | Muraki | 364/419 |
| 4,638,445 | 1/1987 | Mattaboni | 364/513 |
| 4,648,044 | 3/1987 | Hardy et al. | 364/513 |
| 4,658,370 | 4/1987 | Erman et al. | 364/513 |
| 4,675,829 | 6/1987 | Clemenson | 364/513 |
| 4,688,195 | 8/1987 | Thompson et al. | 364/300 |
| 4,697,242 | 9/1987 | Holland et al. | 364/513 |

OTHER PUBLICATIONS

Miller, J. C. et al., "An Adaptive Speech Recognition System Operating in a Remote Time-Shared Computer Environment", IEEE Transactions on Audio and Electroacoustics, vol. AU-18, No. 1, Mar. 1970, pp. 26-31.

Rich, Elaine, Natural-Language Interfaces, Computer, Sep. 1984, pp. 39-47.

Hayes-Roth, Frederick, The Knowledge-Based Expert System: A Tutorial, Computer, Sep. 1984, pp. 11-28.

Avron Barr and Edward A. Feigenbaum, The Handbook of Artifical Intelligence, 1982, vol. II and III.

Hayes-Roth, Frederick; Knowledge Based Expert Systems, *Computer,* Oct. 1984, pp. 263-273.

*Primary Examiner*—Gareth D. Shaw

*Assistant Examiner*—Kevin A. Kriess

*Attorney, Agent, or Firm*—John P. Dellett; Robert S. Hulse

[57] ABSTRACT

A rule acquisition method for expert systems receives input from the expert, one word at a time, and checks each word by determining alternative parses for the partial sentence as so far entered. Feedback is provided to the expert when a word does not conform to a required grammar, this feedback comprising a menu of legal next choices. When the sentence is completed it is translated into the form of a diagnositc rule. An expert system for troubleshooting electronic equipment is disclosed employing rules generated in the aforementioned manner.

14 Claims, 8 Drawing Sheets

```
<rule>::=
        IF <observation> THEN <conclusion>
<observation>::=
      <measurement><comparator><value>
<value>::=
      <constant> |< measurement>
<measurement>::=
      <voltage measurement> |<current measurement>
<voltage measurement>::=
        THE VOLTAGE AT <node reference> |
        THE VOLTAGE BETWEEN
            <node reference> AND <node reference>
<current measurement>::=
        THE CURRENT BETWEEN
            <node reference> AND <node reference>
<conclusion>::=
      <device> IS OK |<device> IS FAILING
<device>::=
        {pointing action} |
      <device type><unsigned integer>
<device type>::=
        CAPACITOR | DIODE | RESISTOR | TRANSISTOR
<node reference>::=
        {pointing action} | NODE <unsigned integer>
<constant>::=
      < integer ><unit>
<integer>::=
      <unsigned integer>|< sign>< unsigned integer>
<comparator>::=
        IS | '=' | '>' | '<' | '>=' | '<=' |' ='
<sign>::=
        '±'| '-'
<unsigned integer>::=
        digit> |< digit ><unsigned integer >
<digit>::=
        0|1|2|3|4|5|6|7|8|9
<unit>::=
        volts | AMPS
```

FIG. 4

| | | |
|---|---|---|
| AMPS | -> | THEN |
| AND | -> | < node reference > |
| AT | -> | < node reference > |
| BETWEEN | -> | < node reference > |
| CAPACITOR | -> | < unsigned integer > |
| CURRENT | -> | BETWEEN |
| DIODE | -> | < unsigned integer > |
| IF | -> | THE |
| IS | -> | {OK, FAILING, THE, < integer >} |
| RESISTOR | -> | < unsigned integer > |
| THE | -> | {VOLTAGE, CURRENT} |
| THEN | -> | {DIODE, RESISTOR CAPACITOR, TRANSISTOR} |
| TRANSISTOR | -> | < unsigned integer > |
| VOLTAGE | -> | {AT, BETWEEN} |
| VOLTS | -> | THEN |
| = | -> | {THE, < integer >} |
| > | -> | {THE, < integer >} |
| < | -> | {THE, < integer >} |
| >= | -> | {THE, < integer >} |
| <= | -> | {THE, < integer >} |
| ¬= | -> | {THE, < integer >} |
| < integer > | -> | {VOLTS, AMPS} |
| < unsigned integer > | -> | {AND, IS, THEN} |
| < node reference > | -> | {THEN, AND, IS, '=', '>', '<', '>=', '<=', '¬='} |

FIG. 5

RULE ACQUISITION FOR EXPERT SYSTEMS

BACKGROUND OF THE INVENTION

The present invention relates to expert systems and particularly to a method of generating the rules therefor.

Expert systems as heretofore available have employed a technique known as knowledge engineering to formulate groups of rules for the solution of problems. The rules may be presented to the user by means of a series of questions which require observation by the user and input by the user of answers to the questions. The expert system will thereupon supply the user with a conclusion or conclusions in accordance with the set of rules. Expert systems have heretofore been employed in fields such as medical diagnosis for logically indicating a patient's status in accordance with a large number of observations, and would also be advantageously employed in the repair of various kinds of apparatus. The rules comprising the expert system are typically constructed by so-called knowledge engineers who interview experts in the field in order to derive the body of rules which captures the required expertise.

The human "knowledge engineer" usually builds a large collection of rules which conform to a predetermined rule structure required by the expert system. Another approach which goes a little farther towards reducing the costs of expert system development is to define rule structures within a particular structural form with reference to domain-specific terms which may be referred to as the task ontology. This simplifies the process of rule acquisition, since some decisions about control structures do not need to be made. The drawbacks of this approach are that a knowledge engineer in still required to acquire the task ontology for the form being utilized and to conform the expert knowledge into the specific rule form.

SUMMARY OF THE INVENTION

In accordance with the present invention, in a particular embodiment thereof, the human knowledge engineer is not required since the expert is able to supply the desired information regarding his expertise directly to an acquisition system. Instead of employing a generic structural form, the approach of the present invention captures the ontology as well, and defines a grammar for acceptable utterances which can be automatically converted to rules. The advantage of this approach in terms of cost is that a grammar and ontology can be completely defined for a whole class of problems for which expert systems can be constructed. An example of such a class of problems comprises electronic instrument diagnosis.

In accordance with an aspect of the present invention, rule acquisition includes parsing of an input sentence as it is received and guiding the expert through the sentence creation. Feedback is provided, e.g. in the form of menu, when the expert deviates from the acceptable format.

Each word is checked as it is entered by using an incremental, breadth-first parsing algorithm on a semantic grammar. The algorithm is simultaneously considering all possible parses for the partial sentence so far entered. A semantic grammer combines syntactic and semantic information so that both the form and the meaning of a sentence are checked together. If the word does not match any of the current partial parses, a menu is built from all possible next steps in the parses and this menu is presented to the user for him to select a legal continuation. When a sentence has been completed, it is translated into the internal form for the diagnostic rules.

It is accordingly an object of the present invention to provide an improved method for the acquisition of rules utilized in expert systems.

It is a further object of the present invention to provide an improved method for economically generating rules for a class of expert systems without requiring the intervention of a knowledge engineer.

It is another object of the present invention to provide an improved method for the acquisition of rules for an expert system wherein aid in rule formulation is provided in a step-by-step manner.

It is another object of the present invention to provide an improved method for the acquisition of rules for an expert system wherein said rules are substantially automatically generated in response to the input of expert information.

The subject matter of the present invention is particularly pointed out and distinctly claimed in the concluding portion of this specification. However, both the organization and method of operation, together with further advantages and objects thereof, may best be understood by reference to the following description taken in connection with the accompanying drawings wherein like reference characters refer to like elements.

DRAWINGS

FIG. 1 is a block diagram of an artificial intelligence system or workstation upon which an expert system utilizng the present invention is implemented, FIG. 2 illustrates a typical display provided by the expert system, FIGS. 3A through 3C are flowcharts illustrating the general operation of the expert system, FIG. 4 illustrates a subset of a structured interface language employed with the present invention, FIG. 5 illustrates an expectation table used with the structured interface language, FIG. 6 is a flow chart for a parser portion of a rule acquisition system according to the present invention, and FIG. 7 is a flow chart for a rule generation portion of a rule acquisition system according to the present invention.

DETAILED DESCRIPTION

Figure 1:
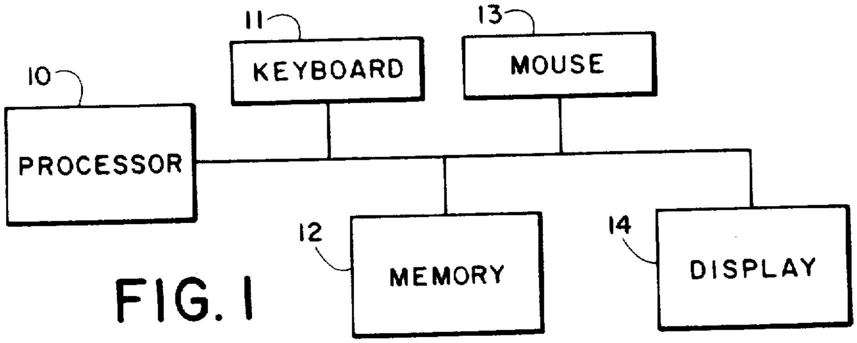

An expert system utilizing the present invention is implemented on an artificial intelligence system or workstation such as Tektronix 4404AI or a Xerox 1100 or 1132 workstation. Such a system is illustrated generally in FIG. 1 and includes a programmed processor 10 having associated therewith a memory 12 accessible by the processor and a display means or monitor 14 including a cathode ray tube. Also provided are a keyboard 11 and a mouse 13. A typical display generated on the display means is illustrated in FIG. 2. In the present example of the expert system, a troubleshooting assistant for a Tektronix type FG 502 function generator is disclosed, but it is understood the expert system according to the present invention comprehends a trouble shooting assistant for any type of apparatus, or alternatively an assistant for solving problems with respect to other subject matter for which a set of rules may be formulated. Rule formulation is more particularly described in a subsequent portion of this application.

The expert system is provided with a bit-mapped display, i.e. the memory 12 includes bit maps capable of supplying a diagrammatic representation of particular subject matter on display means 14. In this case the diagrammatic representation comprises schematic and circuit board diagrams of the aforementioned FG 502 function generator (triangle generator section). The bit-mapped display supplies a drawing 16 of the circuit board, a corresponding circuit schematic diagram 18, and is further provided with three windows 20, 22 and 24. Each component and significant node in a diagram is stored as an "object" programmed in SMALLTALK. Each SMALLTALK object, called a "diagram component instance", contains as part of the data structure the coordinates of a bounding box in the diagram including the object of interest, or in the case of a node, of the point representing that node in the diagram. A collection of icons, for example probe icons 26 and 28 in FIG. 2, are stored as SMALLTALK objects of the type "icon instance". SMALLTALK objects of the form "icon instance" can accept a message which causes the icons to be displayed at a particular location on the diagrams. SMALLTALK objects of the form "icon instance" may also accept a message which causes the icon to be visibly moved across the screen from one known location to another. A rule processor part of the expert system program processes rules which request individual actions of the type display or translate, and dispatches the request to whichever icon is appropriate.

A display icon representing a probe may be displayed at the location where a measurement is to be performed. The diagram display region containing the object to be removed may be blanked out and a moveable icon may also be constructed from the blanked out area. The last mentioned icon may be moved across the screen the deposited in a separate screen area. An icon representing a new part to be inserted can be moved across the screen to the diagram location where a substitution is to take place. The latter icon is then merged with the diagram to form an appropriate picture of the appearance of the new configuration. The illustrated embodiment as hereinafter more fully described mainaly implements icons of the probe type, i.e. where the icon represents a measuring probe such as oscilloscope probe, digital multimeter probe, high voltage probe, or the like.

Referring again to FIG. 2, the system according to the present invention suitably employs schematic-to-board cross referencing such that the user may utilize a mouse or other pointing means to identify a component part on the schematic 18. A corresponding part on the circuit board diagram 16 will be automatically identified. The part pointed to on schematic 18 employing the mouse may be caused to reverse its color and the corresponding component on the circuit board representation 16 will also reverse color. The user will then not have to trace through part numbers in a technical manual to locate the particular component on the circuit board preparatory to making a test or measuring a voltage with respect to a component on the corresponding real world circuit board. The particular component may be simultaneously identified using alphanumeric characters in window 20 in FIG. 2. This cross referencing of corresponding parts is implemented in a manner known to those skilled in the art.

Similarly, the system memory may store a plurality of waveform representations in bit-map form depicting the correct signals which should appear at given circuit nodes. Employing a probe icon, the user may select a given node and open another window (not shown) within which the correct waveform is displayed. This type of information retrieval is also implemented in a known manner.

In accordance with the present invention, a plurality of rules are consecutively presented to the user wherein the rules include conditions involving queries about measurements the user can make in the corresponding real world circuit. The locations where the measurements are to be made are consecutively identified utilizing probe icons 26 and 28 in the schematic and circuit board representations 18 and 16. As the user answers the queries regarding measurements he has made, further conditions and/or rules are presented to the user which will eventually result in an action set or trouble shooting advice for indicating to the user the action which is needed in order to repair the circuit board. As hereinbefore described, in addition to identifying a faulty component or components. e.g. by highlighting the component, an action sequence may illustrate the removal of the faulty component from the board and replacement with a substitute component.

Referring again to FIG. 2, a query is presented in window 30 relative to the voltage at node 19 (identified by the probe icon 26 incorporating the numeral 19 as part of the probe). The user is able to identify the location where the measurement is to be taken in the real world circuit for answering the query because of the positions of the probes 26 and 28, incorporating the node identification 19, on the display. After making the measurement on the real world version of the circuit board, a mouse or other pointer may be employed by the user, in menu fashion relative to window 30, to select either the YES or the NO answer. As the consultation progresses, the technician also views windows 22 and 24 in FIG. 2, with troubleshooting advance being given in window 22 while the rule currently being examined is displayed in window 24. It is noted the trouble shooting advice in window 22 will ordinarily indicate the next step to be taken. As the system asks further questions, the answers given by the user will eventually identify the faulty component which can then be highlighted and/or moved relative to the schematic and circuit board representations. The system thus uses icons to demonstrate to the technician the action that must be taken at any point of time in the diagnosis. This is done by displaying icons at appropriate test locations, and/or in graphically representing a sequence of actions that must be performed.

The program in accordance with the expert system is illustrated in general flow chart fashion in FIG. 3. The system operates in accordance with a set of rules, as hereinafter more fully described, and these rules are stored in a dictionary (in memory) in the order that they are to be examined. Each rule is taken from the dictionary and asked to evaluate itself. A rule evaluates itself by examining one or more conditions that govern the applicability of the rule and these conditions are examined one by one in order.

Figure 3B:
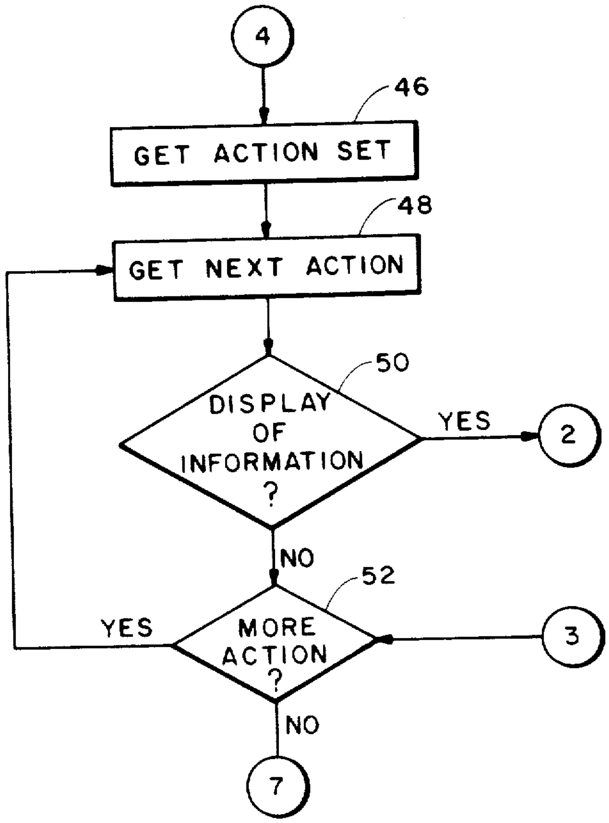
Figure 2:
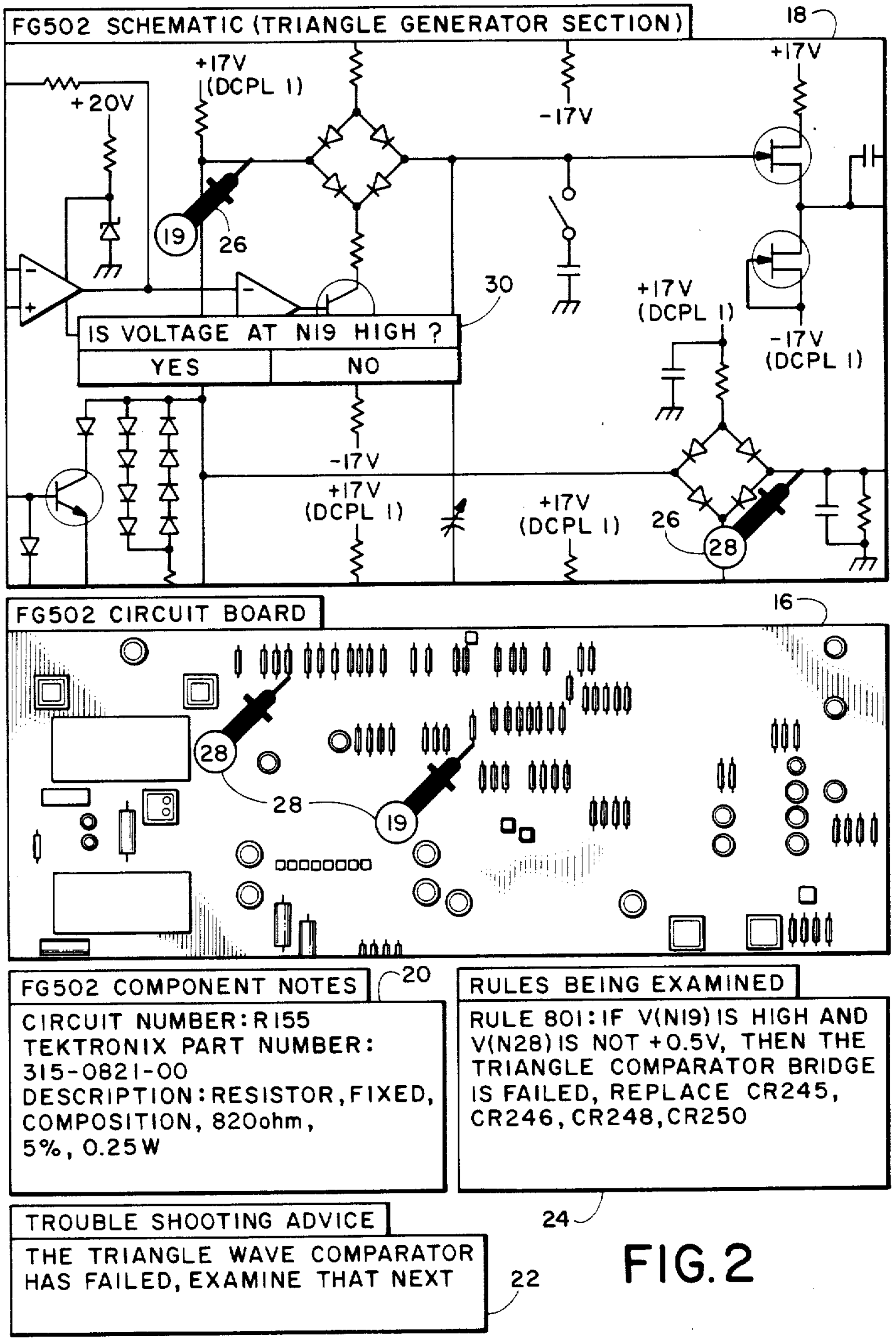
Figure 3A:
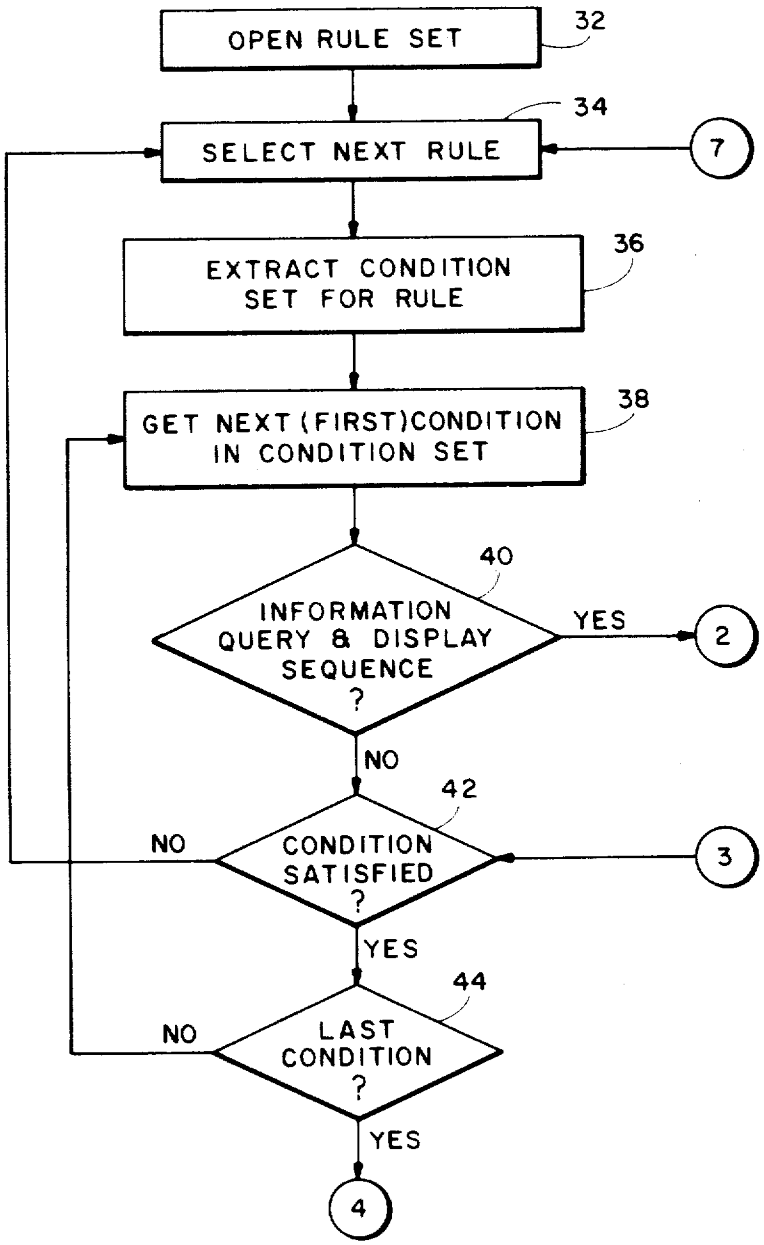

Referring to FIG. 3A, the rule set is opened in block 32 and a first rule (or the next rule in sequence) is selected in block 34. In block 36 a condition set is extracted for the particular rule under consideration, while the next (or first) condition in the condition set is selected in accordance with block 38. In decision block 40, it is ascertained whether the condition contains a query/display sequence and if the answer is yes, the program proceeds to decision block 54 in FIG. 3C where the question is asked whether the query includes an animation sequence, i.e. the moving portion of the circuit or a component thereof from one location to another. If the answer to this question is no, then the query is understood to call for displaying an icon or icons (such as illustrated at 26 and 28 in FIG. 2) whereby the location or locations of measurements to be taken for answering the query are identified. The icon is displayed per block 56. The query (or other comment) is displayed in window 30 in FIG. 2 in accordance with block 58 of the flow chart. An answer is awaited in block 60, i.e. a selection by the technician of either a yes or no answer in window 30, in answer to the query posted in window 30. After the technician indicates the answer, the icon is "undisplayed" in block 62.

The pointing sequence operates as follows. The query/display has an address for the pointing location. The proper icon is sent a message to display itself at the appropriate location, and in displaying itself, the icon also stores a picture of the background that it is occluding. The query is generated in window 30 and the answer is awaited. Once the answer to the query is received, the icon is undisplayed by redisplaying the occluded background previously stored.

The animination sequence operates in a similar fashion. The principal difference is that there is a series of display actions at a sequence of points which are calculated from the path between the start and finish locations of the animation sequence. In block 64, an animation sequence is fetched when the decision from block 54 is that an animation sequence is desired. The first display point is set in block 66 followed by the display of an icon in block 68. The icon in this case may comprise a portion, part or node of the circuit diagram rather than a probe icon or the like. An icon or icons are displayed at successive points to indicate movement in accordance with display actions at the series of points. The first icon is undisplayed in block 70, and in decision block 72 it is determined whether the last displayed icon is the last icon in the sequence. If it is not, return is made to block 66. If it is, then a display query or othe window indication as may be associated with the sequence is displayed according to block 74. The technician's answer, as by menu selection in window 30, is awaited in block 76. Return from either block 62 or 76 is made to decision block 42 in FIG. 3A.

Returning to FIG. 3A, if there is either no information query and display sequence, or if the information query and display sequence is concluded, decision block 42 is entered and it is determined whether the particular condition is satisfied, i.e. whether the user has given an answer which will lead to the next condition in a diagnostic sequence or if the last condition has been satisfied such that some conclusion can be made. If the condition is not satisfied, return is made to block 34 and a next rule is tried. If the condition is satisfied, decision block 44 is entered and it is determined whether the condition is the last condition for the particular rule under consideration. If it is not, return is made to block 38 and a next condition associated with the rule is fetched. If it is the last condition, then block 46 in FIG. 3B is entered to acquire an "action set".

The action set involves some kind of conclusion or possibly an animated movement for graphically demonstrating to the technician the particular curative action which is to be taken. An individual "action" is selected in block 48, and decision block 50 is entered where it is determined whether information is to be displayed. If it is, the sequence of FIG. 3C is again entered via decision block 54. If no animation sequence is directed, the path on the left side of the drawing is selected, and an icon, if any, is displayed in block 56 and/or a particular part or component, e.g. a faulty part or component, is highlighted. In block 58, a conclusion in the nature of trouble-shooting advice is directed for window 22 in FIG. 2. No answer is awaited in block 60. The icon, if any, is again undisplayed in block 62, and return is made, in this instance, to decision block 52 in FIG. 3B.

Figure 3C:
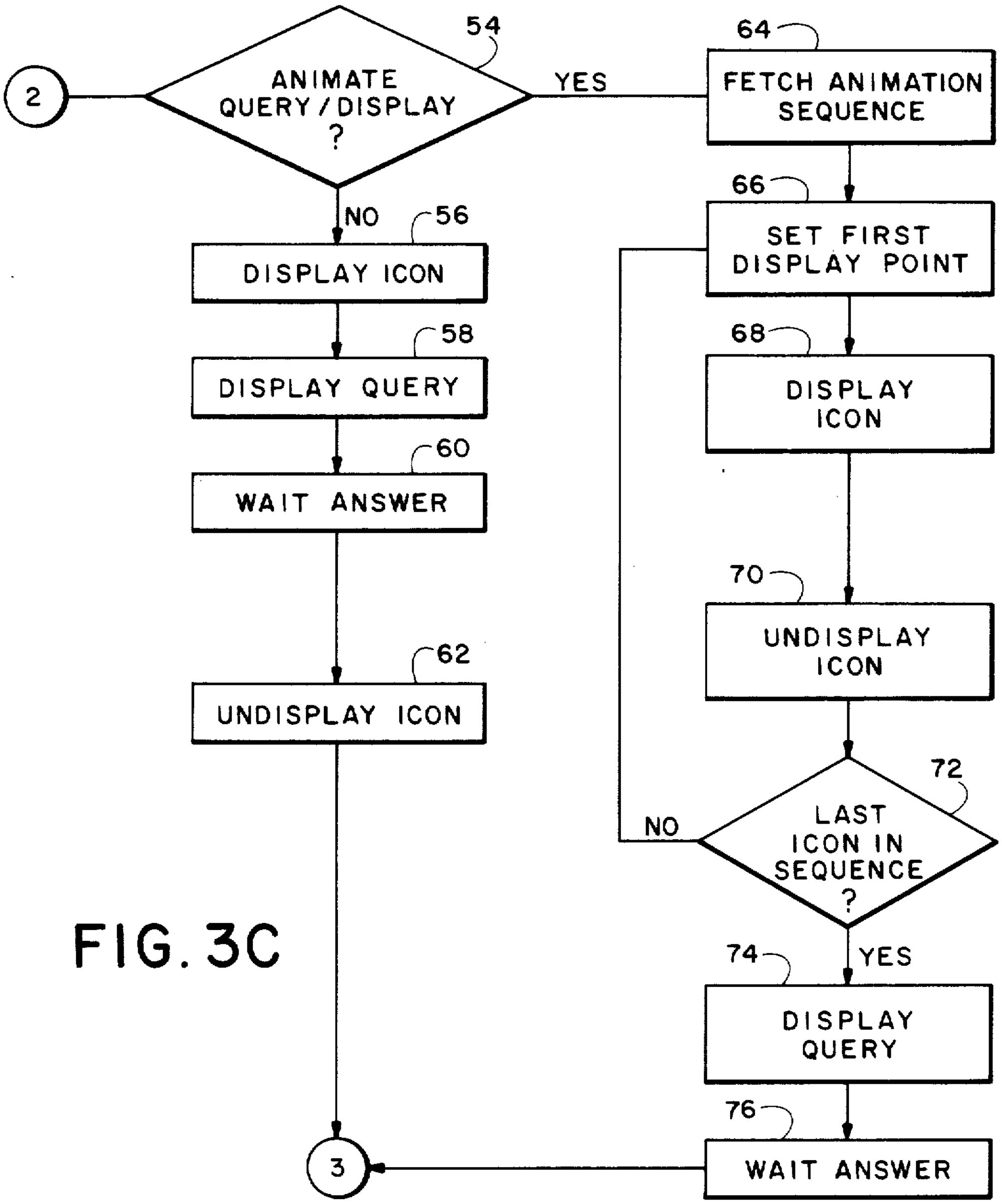

If an animation sequence is selected via decision block 54 in FIG. 3C, the animation sequence is fetched in block 64 and the first display point is selected in block 66. Again, there may be a series of display actions at a series of points which are calculated from the path between the start and finish location of the animation sequence. The icon, displayed according to block 68, may comprise a part or portion of the circuit rather than a probe icon, and this part or portion of the circuit, for example indicating a faulty component, may be moved across the display to a "work bench area" or the like. The icon may then be undisplayed in block 70 and a determination is made according to block 72 whether there is another icon in the sequence. If there is another icon in the sequence, return is made to block 66 and another icon is displayed according to block 68. This icon may comprise a new component from a "parts bin" which can be moved across the display to the location formerly occupied by the faulty component, thereby illustrating the needed action to the technician operating the system. A conclusion, e.g. troubleshooting advice in window 22, is displayed according to block 74, and assuming no answer is required, return is made to decision block 52 in FIG. 3B where it is determined whether further actions are involved. If there are, then return is made to block 48.

In this manner, a number of rules are explored, and assuming the technician selects the "right" answers which would indicate some particular curable fault in the circuit, then the technician is advised of the correct action. If the technician does not make the "right" answers, then the system proceeds to the next rule for further exploration of the possible difficulties that may be involved in the circuit. It will be appreciated the corrective action suggested is dependent upon the rules initially formulated and it is not understood that a particular set of rules which may have been formulated by an expert technician will in every case enable a less experienced technician to repair the circuit. The efficacy of the system is based on the proposition that in many cases the expert knowledge built into the system will save the novice technician considerable time in evaluating possible problems.

Software for implementing the expert system according to the present invention is more fully disclosed in Appendix D in the concluding portion of this specification. The program includes three major components: a diagram manager, a rule processor, and a communications manager. The diagram manager can support several diagrams relating to the task at hand and manages the pointing relationships, e.g. by probe icons and the like, among these diagrams and between the diagrams and the rule processor. The rule processor interprets diagnostic rules to suggest troubleshooting operations to the technician. The rule processor decides which rules to process, i.e. which tests to perform next, and then sends off a request to the diagram manager to highlight or point with an icon to whatever parts or circuit points are relevant to that test. The communications manager consists of routines to handle miscellaneous display requirements such as English rule text and question-answer dialogues in the windows. This communication manager generates the questions, e.g. in window 30 in FIG. 2, and accepts answers via the same window.

In the software of Appendix D the word "and" in the "if" part of a rule separates the various conditions. Frequently a rule includes but one condition. Again, example rules are given for checking the aforementioned FG502 function generator circuit.

A rule acquisition subsystem is employed according to the present invention whereby the rules can be formulated and entered. As in the case of the expert system, the rule acquisition subsystem is not useful solely to the repair or troubleshooting of some particular apparatus such as the FG 502 Tektronix Function Generator employed as an example herein, but rather this rule acquisition system can be utilized for generating rules in a number of related environments for solving related problems. Problems of this type may be referred to as expert family problems. Perhaps the most natural examples occur in automatic troubleshooters for a variety of similar devices such as electronic instruments. Thus, rather than providing a custom-made expert system for each problem to be solved or apparatus to be repaired, the rule acquisition system according to the present invention is effective for generating rules for a family or problems employing a common task model.

It is desirable to obtain the rules from the expert (e.g. an experienced technician) in an automatic or semi-automatic manner, without ambiquity, wherein the rule is easily traced and an explanation of conclusions can be derived. This should be accomplished without the assistance of a human "knowledge engineer". Formulating rules in arbitrary natural language has not been found effective for accomplishing these purposes. Rather, in accordance with the present invention, a dual medium is utilized combining diagrams or graphical presentations relative to the problem with a restricted formal language, called a structured interface language, that presents an English-like syntax at the surface level, while providing an underlying semantics which serves as the task model.

The goal of an expert system interface technology can be seen as achieving cognitive transparency. Many modes of thinking about a problem have been found to be non-linguistic in nature. When engaged in non-linguistic reasoning, diagrammatic communication can effectively reduce the cognitive overhead with limits cognitive transparency. A pointing paradigm is applied to diagrammatic representations and menus to assist in effective communication.

In accordance with an embodiment of the present invention, a structured interface language for acquiring rules used in troubleshooting systems known as GLIB (General Language for Instrument Behavior) is employed and is described more fully at the conclusion of this specification in Appendix A. A simple subset of GLIB is shown in FIG. 4. The subset illustrated is concerned solely with the acquisition of simple diagnostic rules and is not intended to represent the complete acquisition language. In the subset illustrated in FIG. 4, observations are limited to a single relationship between a measured value and a constant or other measured value. Conclusions are limited to the observations that a device is either functioning correctly or is failing.

There are several ways in which a structured interface language such as GLIB can be presented to the expert technician for rule acquisition. One is menu-based acquisition which is a technique wherein the expert does not generator or complete rules on his own, but rather a menu displays alternative choices for each word in the rule as it is being selected. A single menu is employed consisting of only terminal tokens to choose from at any point in time.

To support menu-based acquisition, the GLIB rules are processed to produce an expectation table utilized to determine which words are syntactically admissible at any point in a sentence, so that the correct menu can be constructed. An example of an expectation table, based only upon the previous word, is illustrated in FIG. 5.

The following example illustrates menu-based rule acquisition using the GLIB subset of FIG. 4 and the expectation table of FIG. 5. Since all the rules in this example must begin with the words "IF THE", these need not be selected at all. Instead they are added to the rule automatically. This provides the user with a starting point from which to generate the rest of the rule:

(1) IF THE

VOLTAGE
CURRENT

After selecting VOLTAGE from the menu, the next choice to be made is whether the VOLTAGE is of a single point (with respect to ground) or between two points.

(2) IF THE VOLTAGE

OF
BETWEEN

Now a node in the schematic may be referenced by either pointing to it or typing in the name. Our user chooses the latter.

(3) IF THE VOLTAGE OF

NODE
point to node

A number must be typed in at this point.

(4) IF THE VOLTAGE OF NODE type a number
32

Some comparison operator must be chosen next.

(5) IF THE VOLTAGE OF NODE 32

AND
IS
=
>
<
>=
<=
'=

A constant value is next chosen for comparison.

(6) IF THE VOLTAGE OF NODE 32 IS

THE VOLTAGE
THE CURRENT
number type a number
3

Then a unit must be picked. In this subset of GLIB, VOLTS and AMPS are the only possible units.

(7) IF THE VOLTAGE OF NODE 32 is 3

VOLTS
AMPS

THEN is filled in automatically. Now a device must be specified as working or broken.

(8) IF THE VOLTAGE OF NODE 32 is 3 VOLTS THEN

CAPACITOR
DIODE
RESISTOR
TRANSISTOR
point to a device

If the expert chooses a device type, then the reference is made explicitly by typing the device number. In this case, the user points directly at the schematic employing a mouse or the like.

(9) IF THE VOLTAGE OF NODE 32 IS 3 VOLTS THEN TRANSISTOR 6 IS

OK
FAILING

Finally the expert decides that transistor 6 must be O.K., and the rule is completely assembled as follows.

(10) IF THE VOLTAGE OF NODE 32 IS 3 VOLTS THEN TRANSISTOR 6 IS O.K.

Menu-based acquisition is not the only way to present a structured interface language. A more general structured interface language processor supports acquisition via typing or graphic selection or a mixture of the two. The pointing paradigm can be successfully used to enhance the cognitive transparency wherein each act of pointing is viewed as a linguistic act, namely a reference to the object being pointed at. Whenver it is appropriate to refer to an object in the GLIB sentence, the expert may instead point to an element in the diagram. The mechanism for referencing elements in a diagram is described hereinabove.

Figure 6:
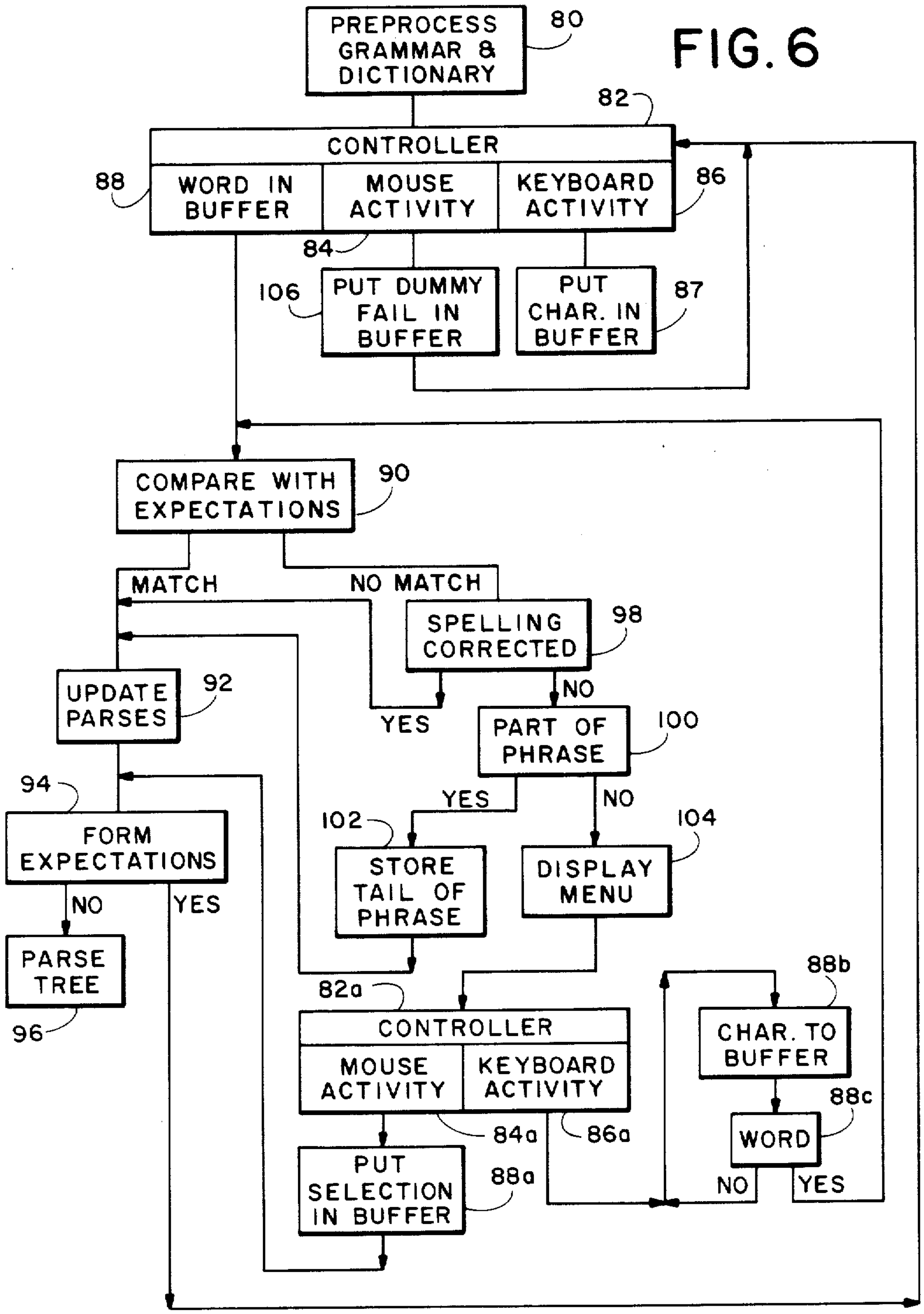
Figure 7:
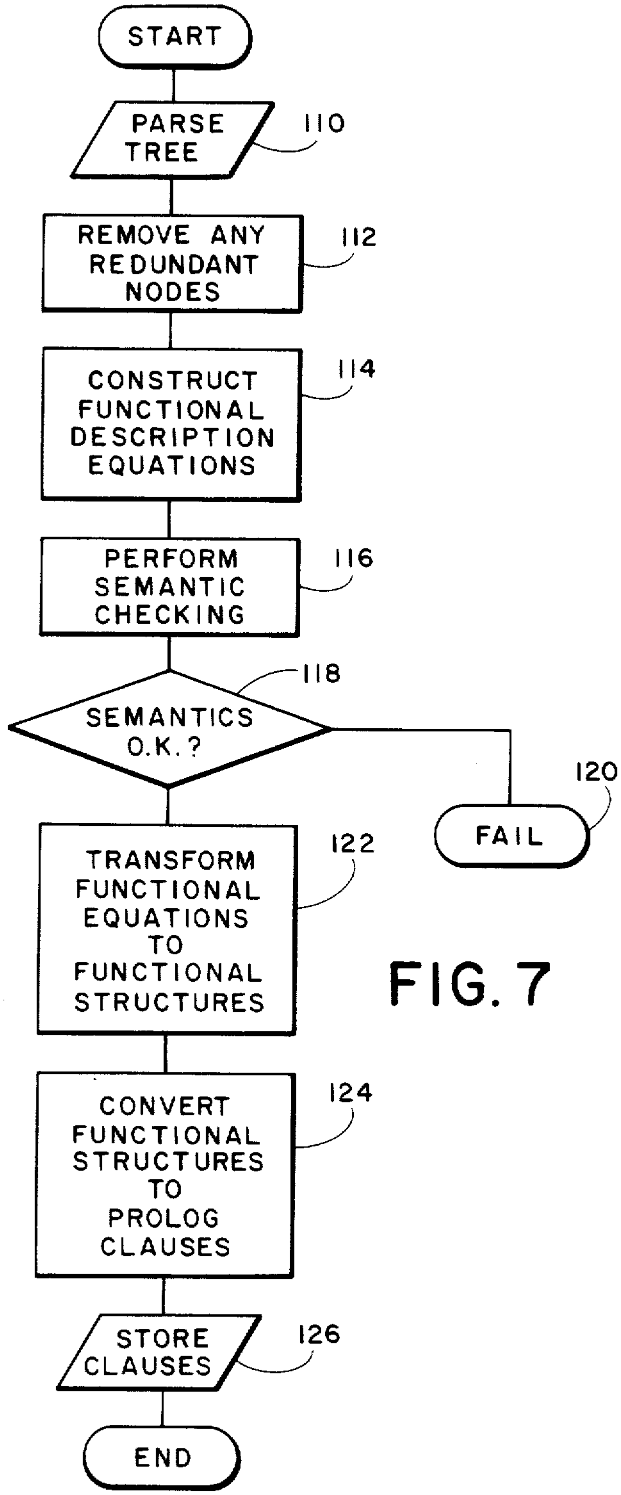

A more generalized and sophisticated structured interface language processor is illustrated by means of the flow charts of FIGS. 6 and 7. The processor operates on an artificial intelligence system or workstation as hereinbefore disclosed. The knowledge engineer is not required to cast expert knowledge into a specific form for rules or rule components (which may be referred to as task ontology), but rather the rule acquisition process is more automated. Instead of engineering a generic structural form, the present invention involves capture of the ontology as well, and defines a complete grammer for acceptable utterances which can be converted into rules. The grammar and ontology can be completely defined for a whole class or family or problems for which it is necessary to build expert systems. A grammar approrpriate for the present example is given in Appendix E and an ontology is given in Appendix F.

The mechanism for acquisition of the expert knowledge consists of two parts: a parser for GLIB which allows the user to generate a statement in GLIB as illustrated in FIG. 6, and a rule generator depicted in FIG. 7. In the present example, the GLIB parser is coded in SMALLTALK, and the rule generator is coded in SMALLTALK and generates rules coded in PROLOG. The parser assists or guides the expert.

Referring to FIG. 6, operation begins by the insertion of a grammer and dictionary of the GLIB language indicated at block 80 in FIG. 6. The grammer and dictionary are preprocessed to generate appropriate data structures for operation. In addition, initial expectations (similar to the expectation table of FIG. 5) are generated.

Interactions all go through controller 82 which senses mouse activity 84 and keyboard activity 86, collecting characters and tokens in buffer 88. Characters are placed in the buffer as indicated by block 87. When a word appears in the buffer 88 it is compared with the expectations generated from the preprocessed grammar and dictionary. In the event of mouse activity, a "dummy fail" is placed in the buffer as indicated at 106 so that mouse activity can direct further selection as further noted in blocks 84a and 88a to which reference is made hereinbelow. If there is a match with expectations, a parse tree is updated and next expectations are generated. If there are no expectations, the statement is completed, and the parse tree is passed to the rule generation component. The comparison with expectations is indicated in block 90 and if the comparison is favorable, the parse tree is updated in block 92. Next expectations are then generated in block 94 with a return to block 90 for comparison. If there are no further expectations, the statement is completed, and the parse tree is passed to the rule generation component of the system as indicted at 96.

When there is no match to the expectations, a series of steps are taken to correct the input to match one of the expectations. First a spelling corrector is invoked as indicated at block 98. If a match can occur with the spelling corrected, the procedure continues as before. If not, a phrase completion is attempted to block 100. If phrase completion is successful in generating a match, the procedure continues as before, with the tail of the phrase being stored as indicated in block 102. Finally if neither spelling correction or phrase completion is successful, the controller at 82a provides a menu which is displaced to the user as indicated in block 104. If the user selects a menu item, i.e. from possible expectations, the procedure continues with the selected item as specified by mouse activity at 84a and it is placed in the buffer as indicated at 88a. If the user inputs key strokes as indicated at 86a, the character is placed in the buffer at 88b and when a word is completed as indicated by block 88c, the processing goes back to compare with an expectation by return to block 90. The mouse also implements the pointing paradigm for rule acquisition as hereinbefore mentioned.

The GLIB parser as illustrated in FIG. 6 is employed for the purpose of compiling results into forms dictated by rule construction grammer. The parser provides a parse tree which creates a structure that represents the meaning of the terminology. The parse tree shows the grouping and the relationship of words in a sentence, rather than just listing a series of words. In other words, associations are captured in the parse tree and these associations are used to provide an internal representation of the rules as well as an understandable representation thereof. The parse tree establishes the proper "bracketing" of an input sentence such that the burden of establishing this bracketing for association is not required of the expert user.

A second part of the mechanism for rule generation, i.e. the rule generator, as depicted by the flow chart of FIG. 7, receives parse tree information from the GLIB parser and uses the same to generate rules coded in PROLOG. After receiving the parse tree at block 110 in FIG. 7, the rule generator examines the nodes generated in the parse tree. Redundant nodes will be removed in block 112. The resultant data structure will be used to construct equations which functionally describe the statement, as noted in block 114. At this point, the semantics of the system may be checked. Semantics are optionally checked in blocks 116, 118 and 120. Processing continues if the semantics are acceptable, or if no semantic checking is performed. The equations are unified to resolve variable references and transformed into a data structure in block 122 which gives a functional definition of the statement. Finally, this functional structure is converted to PROLOG clauses in block 124 which are stored as indicated in block 126 for use as components of the expert system.

The GLIB acquisition grammer has the form of a semantic grammar where grammatical categories are based not on the theory of syntax, but instead on semantically meaningful units in the structures being acquired. For instance, sample semantic categories are <rule>, <observation>, <conclusion>, etc. in construction of a rule generation grammar to parallel the rule acquisition grammar, for each projection of the form:

<cat−0>::=G(<cat−1>,<cat−2>, . . .
<cat−n>)

in the rule acquisition grammar (where cat stands for category), there is a corresponding generation production of the form:

F(<cat−0>)=>H(F(<cat−2>), . . . ,
F(<cat−n>))

which determines the form of the resulting rule fragment, based on the combining function (H) of the fragments of the rule constituents (F(<cat−i>)) as defined by the semantic grammar.

Considering the parser and rule generator in greater detail, it will again be noted that the parser permits sentences to be created by selecting successive words or phrases from menus or by typing. The parser is able to check each word as it is entered by using an incremental, breadth-first parsing algorithm on the semantic grammar (GLIB). "Breadth-first" refers to the processing of all parse trees in parallel. The algorithm simultaneously considers all possible parses for the partial sentence so far entered. The semantic grammar (GLIB) combines syntactic and semantic information so that both the form and the meaning of a sentence are checke together. The use of a semantic grammar permits real time processing of both syntax and semantics. If a particular word does not match any of the current partial parses, the parser provides feedback to the expert operator, i.e. it builds a menu from all possible next steps in the parses and presents this menu to the operator for him to select a legal continuation.

The parser builds an internal data structure which represents the syntactic structure of the completed GLIB statement. This syntactic representation comprises a parse tree. The parser parses incrementally from left to right and performs all checking on each word as it is entered. The parser follows the left-corner algorithm (see "On the Relative Efficiencies of Context-Free Grammar Recognizers" by Griffiths and Petrick, Communications of the ACM, May, 1965) modified to a parallel format so that it can follow all parses simultaneously. This algorithm builds phrases bottom-up from the left corner, i.e., rules are selected by the first symbol of their right-hand-sides. For example, given a phrase initial category c, a rule of the form X−>c . . . will be chosen. The remaining rule segments of the right-hand side are predictions about the structure of the remainder of the phrase and are processed left-to-right. Subsequent inputs will directly match successive rule segments if the latter are terminal symbols of the grammer. When a non-terminal symbol is encountered, a subparse is initiated. The subparse is also constructed bottom-up from the left corner, following the rule selection. When an embedded rule is completed, the phrase formed may have the structure of the non-terminal category that originated the subparse and so complete the subparse. If there is no match, it will become the left-corner of a phrase that will eventually match the originating category. The parser includes a reach-ability matric (see Griffiths and Petrick supra) to provide top-down filtering of rule selection.

The parser assigns a rule to an object instance of glass "constituent" that attempts to match the rule against input as described above. Several constituent instances may exist simultaneously to track alternative parses. A detailed description of object-oriented parsing can be found in "An Object-oriented Parser for Text Understanding" in The Proceedings of the Eighth International Joint Conference on Artificial Intelligence", Karlsruhe, West Germany, 1982, pages 690–692, published by William Kaufmann, Inc., Los Altos, Calif.

Parsing is driven by a "lookahead dictionary", a refinement of the expectation table mentioned on page 16. This associates constituent instances with the words that will advance their state. Through this dictionary those constituents that accept the current input are found their state advanced according to the parsing algorithm. A new lookahead dictionary is then formed by interrogating the updated instances for their next rule segments. These segments are translated into words using a reverse dictionary. If no matches for the input are found, the lookahead dictionary's keys are used to form the aforementioned menu used for operator selection. It is seen that the program can guide an expert technician through sentence creation to keep him within GLIB. Assistance is only involved when the technician deviates from GLIB.

As noted, the parser creates a parse tree. As an example, if the parser were given the following simple semantic grammar:

```
<rule>→IF<condition>THEN<conclusion>
<condition>→<indicator>IS <state>
<conclusion>→<device>HAS FAILED
```

and the following sentence:

IF LED-2 IS ON THEN TRANSISTOR-17 HAS FAILED it would produce the following parse tree:

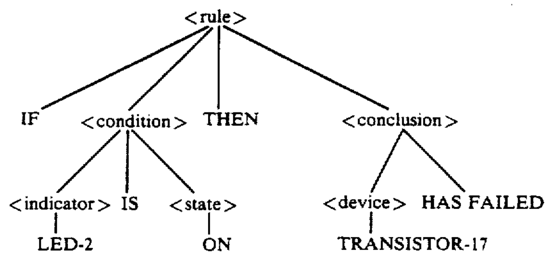

This parse tree is next processed to convert if from a syntatic representation into a semantic representation.

The parse tree which is actually produced is slightly different from the one shown. The parser accepts a lexical-functional grammar (which also describes GLIB) and produces a parse tree which includes functional equations for each constituent. These functional equations describe the semantic relationships of a constituent to its neighboring constituents. Going back to our example, a lexical functional form of the grammar would be:

```
                                          (↑CNCL)=↓
                        (↑COND)=↓         (↑FORM)=<rule(↑COND, ↑CNCL)>
<rule>         ——> IF <condition>THEN<conclusion>

                                       (↑STATE)=↓
                         (↑IND)=↓     (↑FORM)=<state(↑IND, ↑STATE)>
<condition>    ——>   <indicator>IS<state>

                          (↑DEV)=↓
                          (↑FORM)=<status(↑DEV,failed)>
<conclusion>   ——>    <device>HAS FAILED
```

The corresponding parse tree for our sample rule is:

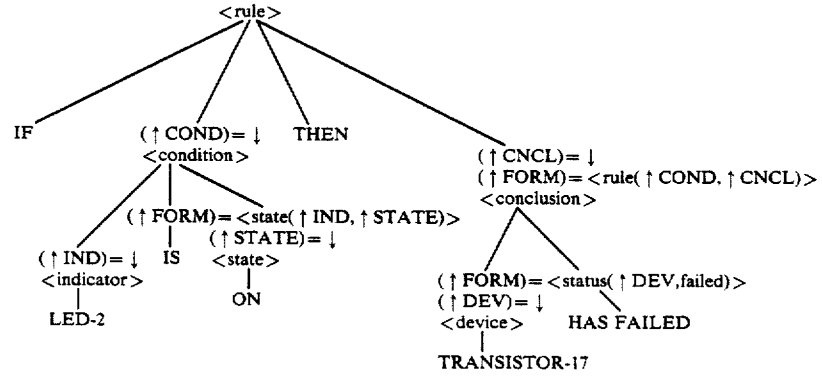

We interpret this as saying that a rule has a condition part, COND, and a conclusion part, CNCL, and is printed in clausal-form as "rule (COND, CNCL)." The up-arrows (↑) and down-arrows (↓) are meta-symbols which refer to parent node (↑) or to the node to which the equation belongs (↓). A parse tree with attached functional equations is referred to as a constituent-structure, or c-structure. C-structures are actually produced by the parser instead of simply a parse tree. This is more efficient than building a parse tree and then attaching the functional equations at a later time.

C-structures are converted to functional-structures, or f-structures, in the second phase or rule generation phase of the program. For further information on how this is accomplished, reference is made to Kaplan and Bresnan in the "Mental Representation of Grammatical Relations" edited by J. W. Bresnan, M.I.T. Press, 1982. The functional equations may be solved by instantiating the metasymbols with actual nodes and assigning properties and values to the nodes according to the functional equations. In the example given, all equations are of the form "(↑ property)=value" where "value" is always ↓. This says that a node pointed to by ↓ is the indicated property of the parent node (pointed to by ↑).

The f-structure for our example is:

```
[ COND  [ IND    led-2
        [ STATE  on
        [ FORM   <state(↑IND, ↑STATE)>

  CNCL  [ DEV    transistor-17
        [ FORM   <status(↑DEV,failed)>

  FORM  <rule(↑COND, ↑CNCL)>
```

The final phase of the program interprets the f-structures to produce PROLOG clauses. Most of the information required to produce the clauses is contained in the "form" property, as in the example, However, certain ordering is accomplished by the program. If the program were given the example used above would find that it produces the PROLOG clause:

rule (state (led-2, on), status (transistor-17, failed). which may be interpreted as "if the state of indicator led-2 is "on" then the status of device transistor-17 is "failed" or less formally, IF LED-2 IS ON THEN TRANSISTOR-17 HAS FAILED as above. The program for the example of the parser and rule generator is attached hereto as Appendix G.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

APPENDIX A

GLIB — A LANGUAGE FOR REPRESENTING THE BEHAVIOR OF ELECTRONIC DEVICES (a) SQUARE-WAVE IS A SIGNAL CLASS.

(b) SIGNAL-1 IS A SIGNAL OF TYPE SQUARE-WAVE.

(c) VOLTAGE IS A PROPERTY OF SIGNAL.

(d) VOLTAGE HAS A VALUE OF TYPE VOLTS.

Figure 1 — Examples of GLIB Declaration Sentences

DESCRIPTION OF THE LANGUAGE

For convenience in understanding its structure, GLIB constructs may be divided under six primary headings (1) value expressions
(2) interval descriptions
(3) signal descriptions
(4) predicates
(5) contexts
(6) sentences Intuitively, *value expressions* are concerned with the direct or indirect description of scalar quantities which form the basic electronic values, such as voltage. *Interval descriptions* deal with the description of temporal intervals, and *predicates* with the relationships between intervals and/or values. *Contexts* provide for the description of conditions under which an observation may be valid or relevant. *Sentences* form a framework encompassing all complete statements of the language. In the interests of clarity, we will discuss sentences first, and then deal with the building blocks that form them in order of increasing complexity.

SENTENCES

Complete utterances of GLIB are covered by the linguistic unit *sentence*, and are of four basic types:

(1) declarations
(2) specifications
(3) observations
(4) rules

*Declarations* are sentences which enable the language user to extend the descriptive power of the language by adding new terms and values. Some examples of declarations are shown in figure 1. Several declarations have the form <term> IS A <category>

The effect of a declaration of this type is to add a new term to the GLIB grammar, of the form <category> ::= TERM For instance, the sentence

SQUARE-WAVE IS A SIGNAL CLASS.

has the effect of adding the syntactic rule

<signal class> ::= SQUARE-WAVE to the grammar. Other declarations associate types with particular properties, and appropriate values with attributes, and units with specific value types. Each declaration expands the basic GLIB grammar in the manner of the above example.

*Specifications* are sentences which express expectations about the behavior of devices. A specification can be thought of as an expression of some condition coupled with a *context*. The context stipulates those situations in which the condition is to be considered relevant. Some examples of specifications are shown in figure 2. In figure 2(a), the phrase

... WHEN SIGNAL-3 IS HIGH.

forms a *context*. The indicated relationship, that the power of signal 1 is greater than the power of signal 2, is specified to hold whenever signal 3 is high. Outside of this context, nothing is specified about the relationships of the two signals. Figure 2(b) illustrates use of a special *universal context*

AT ALL TIMES

---

(a) THE POWER OF SIGNAL-1 IN WATTS MUST BE GREATER THAN
THE POWER OF SIGNAL-2 IN WATTS
WHEN SIGNAL-3 IS HIGH.

(b) THE AMPLITUDE OF SIGNAL-1 MUST EQUAL
THE AMPLITUDE OF SIGNAL-2 PLUS 5 VOLTS
AT ALL TIMES.

Figure 2 — Examples of GLIB Specification Sentences

---

Figure 2(b) also illustrates use of *intensional equality* to specify device behavior. The device being specified is constructed so that the amplitudes of the two signals must always be equal. If this specification is ever found not to hold, it is considered a fault of the device.

The next type of sentence is the *observation*. An observation describes observed, predicted, or expected behavior of the device under test. Figure 3 shows some examples of observations. The difference between an observation and a specification is that the observation represents an *actual state* of the device, while a specification represents a *constraint on the legal states* of the device.

The actual state of a device may, of course, be quite illegal. This is often the case when the device is faulty. For instance, the behavior described by the observation in figure 3(a) directly contradicts the behavior required by the specification in figure 2(a). Observations of this sort can easily occur in the course of troubleshooting a device, indicating a discrepancy between specified (or correct) behavior, and the actual (or observed) behavior.

Note the syntactic difference between a specification and an observation. The observation has a primary form <value reference> IS EQUAL TO <value reference> while the specification has a form

<value reference> MUST EQUAL <value reference>

Specifications are distinguished from observations by a "specification modality" which expresses the normative character of specifications. Currently the only two specification modalities in GLIB are MUST and MAY ONLY.

---

(a) THE POWER OF SIGNAL-1 IN WATTS IS LESS THAN THE POWER OF SIGNAL-2 IN WATTS WHEN SIGNAL-3 IS HIGH.

(b) THE AMPLITUDE OF SIGNAL-1 IS EQUAL TO THE AMPLITUDE OF SIGNAL-2 PLUS 5 VOLTS.

Figure 3 — Examples of observations about a device

---

The final type of GLIB sentence is the *rule*. Rules share with specifications the characteristic that they are intended to be valid characterizations of the device at all times, but they are more explicit than specifications, in that they posit actions or conclusions suggested by the existence of a particular state of affairs. Although many types of rules are possible, the current version of GLIB contains only *diagnostic rules*. Diagnostic rules have the structure IF <observation> THEN <diagnostic conclusion> where the *observation* is any observable aspect of the device behavior which can be captured by the observation, and *conclusion* is a statement about which aspects of the device are now known to be working or broken. Examples of diagnostic rules are shown in figure 4. Figure 4(b) demonstrates GLIB's capability to discuss the behavior of digital as well as analog devices.

---

(a) IF THE AMPLITUDE OF SIGNAL-1 IS EQUAL TO THE AMPLITUDE OF SIGNAL-2 PLUS 5 VOLTS THEN TRANSISTOR-56 IS OK.

(b) IF SIGNAL-1 BECOMES HIGH BEFORE SIGNAL-2 BECOMES HIGH THEN IC-32 IS FAILED.

Figure 4 — Examples of diagnostic rules

---

VALUE EXPRESSIONS

Value expressions in GLIB form the most primitive syntactic units for the construction of larger GLIB expressions. The two major types of values which are referred to by value expressions are scalar values (such as voltages and frequencies) and entities which are referred to as if they were single units. The former, references which are intended to denote a particular scalar value, are called *value references*. Complex entities which are referred to as a single unit are called *unit objects*. References to unit objects are termed *object references*. As mentioned earlier, GLIB permits the addition of new unit object classes to the language in order to extend the language's expressive power.

The value expression constructs permit complex descriptions to be built up, including intensional reference to the attributes of unit objects without direct specification of their value. Indirect descriptions are necessary in order to define observations or rules which refer symbolically to the appropriate objects. In the first sentence of figure 3, for example, we want the rule to apply for all levels of amplitude of signal 1. Thus reference is made to the value

THE AMPLITUDE OF SIGNAL-1 rather than as a constant value such as

3 VOLTS.

The value expression constructs also provide for arithmetic and computational expressions which mix direct and indirect values, such as the expression

THE AMPLITUDE OF SIGNAL-2 PLUS 5 VOLTS.

In describing the behavior of a complex device, it is necessary to express values of measured quantities under certain circumstances. The language makes this possible by associating a *context* with the value reference. Use of contexts is discussed in section 3.5.

The dummy expression <user defined identifier> in the grammatical specification of unit object constructs like <signal class>, <object type>, and <device type> indicates that it may be extended to include new members by means of the appropriate declarations. Typically four sorts of declarations are needed to completely integrate a new unit object into GLIB.

— declare the object itself
— name the object's relevant properties
— declare the types of those properties
— declare the units in which those properties are measured Figure 5, for instance, shows a set of declarations whose cumulative effect is to define a new unit object called an AMPLIFIER, and describe its most important property, GAIN.

---

AMPLIFIER IS AN OBJECT.

GAIN IS A PROPERTY OF AMPLIFIER.

GAIN HAS NO UNITS.

Figure 5 — Defining the amplifier as a new unit object

---

THE BASE-EMITTER VOLTAGE OF TRANSISTOR-63
WHEN THE CURRENT THROUGH POINT-21
IS GREATER THAN 100 MICROAMPERES.

Figure 4 — A complex value expression

SIGNAL DESCRIPTIONS

Most of the behavior of electronic devices which is observable at all is observed in the form of signals. As a result, it is natural that a major portion of GLIB is devoted to describing different signal forms and their relationships. A signal may be defined generally as a value which varies with respect to time.

What makes the description of a particular signal form important is the fact that many of the larger functional units in electronic devices are designed specifically to produce operations or transformations on certain types of signal.

INTERVAL DESCRIPTIONS

Most descriptions of the relationships between signals center on the temporal relationships between certain time periods in each of the signals. In GLIB, these periods are called *intervals*. The exact temporal relationships of these intervals are often important, and this makes it important that GLIB provide adequate linguistic means to precisely define particular time instants and intervals on one signal.

The first level of GLIB which deals with these signal relationships then is concerned with the definition of intervals of interest within a signal. The GLIB construct *atomic interval expression* permits intervals of signals to be defined relative to the signal's intrinsic characteristics. An atomic interval expression may then be followed by an *interval adjustment*, which defines some transformation on the interval initially defined, or relates it to a separate interval defined with respect to a different signal.

The atomic interval expressions themselves are divided into those which normally would define a point in time, and those which normally would define a continuous interval. Expressions which normally would define a point include descriptions of the instant when the signal value achieves a given value, and descriptions of the instants when two signals cross. Examples of these are given in figure 5.

(a) SIGNAL-1 BECOMES HIGH (b) SIGNAL-4 ATTAINS VOLTAGE OF 5 VOLTS (c) SIGNAL-6 CROSSES SIGNAL-10 GOING HIGH (d) SIGNAL-10 CROSSES 3 VOLTS GOING LOW

Figure 5 — Interval descriptions defining points

Other atomic interval expressions are used to describe intervals of longer duration. The best examples of such intervals are those periods of time in which the signal variable maintains a specific value or condition. Examples of this sort of interval expression are shown in figure 6.

(a) THE VOLTAGE OF SIGNAL-3 IS 6 VOLTS (b) THE INTERVAL
WHEN THE CURRENT THROUGH NODE-6
IS GREATER THAN 1 MILLI-AMPERE

Figure 6 — Interval expressions describing periods of time

---

Interval adjustments which may be performed on intervals include

- delay of a defined interval
- intersection of two intervals
- selection of one of several intervals
- selection of the period between two defined intervals Examples of these type of adjustments are shown in figure 7.

---

(a) THE INTERVAL WHEN SIGNAL-3 IS HIGH DELAYED BY 40 NANO-SECONDS (b) THE INTERVAL WHEN SIGNAL-3 IS HIGH WHILE SIGNAL-4 IS LOW (c) 5TH OCCURRENCE OF THE INTERVAL WHEN SIGNAL-3 IS HIGH (d) AFTER SIGNAL-3 IS HIGH
UNTIL SIGNAL-3 CROSSES 2 VOLTS GOING NEGATIVE

Figure 7 — Interval adjustments

---

PREDICATES

Most observations and specifications regarding the behavior of any device are couched eventually in terms of *predicates*, expressions which have an ultimate interpretation as either TRUE or FALSE. The predicate level of GLIB provides for linguistic constructs which permit the basic scalar values and intervals of previous levels to be combined and compared to produce predicates.

As with the interval level, there are two levels of construction for predicates. The first is the *context independent predicate*. Context independent predicates test the basic temporal, structural, and numeric relationships between objects and values. These may be further modified by use of *contexts*, to specify narrower ranges under which the predicate is meaningful. Contexts and their use in predicate formation are discussed in the next section on the context level of GLIB.

The two basic type of predicates defined in GLIB are *value predicates*, and *temporal predicates*. Value predicates are relatively simple, and refer to a number of common relationships between attributes and their values, including

- class membership
- identity of value
- numeric value comparison
- attribute presence or absence Some examples of value predicates are shown in figure 8.

(a) THE VOLTAGE OF SIGNAL-6 IS GREATER THAN 5 VOLTS (b) SIGNAL-25 IS HIGH (c) SIGNAL-30 HAS AVERAGE-AMPLITUDE OF 2 VOLTS (d) SIGNAL-2 IS SQUARE-WAVE

Figure 8 --- Examples of value predicates

Temporal predicates, on the other hand, are used to build tests out of descriptions of the relationships between signal intervals. The basic forms of a temporal predicate is <interval expression> BEFORE <interval expresssion>
<interval expression> DURING <interval expresssion>
<interval expression> AFTER <interval expresssion>
<interval expression> WHENEVER <interval expresssion>

Examples of their use may be found in figure 9.

The precise interval relationships indicated by these four keywords need some explaining. In the general case, each *interval expression* denotes not a single interval from the signal in question, but a *sequence of intervals* corresponding to those periods in the signal when the interval expression holds true. We could represent an interval sequence as the following:

[ <i1,f1> , <i2,f2> , <i3,f3> , ... , <i4,f4> ]

In this context, if we let the interval boundaries be selector functions on some signal S, i.e. the first initial boundary is i1(S), then the temporal relationships named above have (a) SIGNAL-10 BECOMES HIGH
BEFORE SIGNAL-4 CROSSES 2.5 VOLTS GOING NEGATIVE (b) SIGNAL-4 CROSSES 2.5 VOLTS GOING NEGATIVE
DURING SIGNAL-10 IS HIGH (c) SIGNAL-23 BECOMES HIGH
AFTER SIGNAL-4 BECOMES HIGH (d) SIGNAL-23 BECOMES HIGH
WHENEVER SIGNAL-4 BECOMES HIGH

Figure 9 — Examples of temporal predicates the following properties. S1 BEFORE S2 is true if i1(S1) < i1(S2). S1 AFTER S2 is true if i1(S2) < i1(S1).

S1 DURING S2 is true if both of the following conditions hold. The first condition is that i1(S1) >= i1(S2). The second condition is that f1(S1) < f1(S2).

S1 WHENEVER S2 is true if for each interval j in S2, there is a corresponding interval k in S1 such that ik(S1) <= ij(S2) and fk(S1) >= fj(S2). For more on the semantics of these predicates see section 5.3.

CONTEXTS

The context level of GLIB permits conditions to be specified in a set of circumstances which are restricted by conditions external to the original expression. These are of special use in describing diagnostic tests because many tests need to be made on specially perturbed versions of a circuit board.

There are five basic classes of context. These are *universal context*, *static context*, *temporal context*, *functional context*, and *structural context*.

The universal context, which we have already encountered, is

AT ALL TIMES.

This context provides a convenient way of specifying that a particular measurement or specification is relevant all the time.

A static context is simply a predicate on static values. The major use of static contexts is to force the relevance of a specification to be dependent on external settings, as in the following example.

SIGNAL-6 IS HIGH MUST BE TRUE
IF AUTO-TRIGGER-KNOB IS ON.

A temporal context relates the specification to a sequence of intervals from some signal. An example is

SIGNAL-6 IS HIGH MUST BE TRUE
WHILE SIGNAL-7 IS LOW.

A structural context relates specifications or observations to particular perturbations which may be performed on the DUT. For instance, it is often common troubleshooting practice to perform an electronic measurement, and then to repeat the measurement with some device removed from the DUT. An example of the use of a structural context is

SIGNAL-6 IS HIGH MUST BE TRUE
WHEN TRANSISTOR-25 IS REMOVED.

Currently the only perturbations acknowledged by GLIB involve removal of parts from the DUT, leaving the severed terminals open.

Functional contexts are the last form of context permitted, and are used in a totally different way from the other three. While static, temporal, and structural contexts are all used to modify the applicability or relevance of observations or specifications, functional contexts are used to specify *knowledge* about the state of a diagnostic process. Currently the only types of knowledge permitted are the correct or incorrect behavior of single parts. An example of a functional context is

TRANSISTOR-25 IS OK

EXAMPLES

Figure 2 shows part of the triangle-generator loop of the FG502 function generator. Sentences in the signal language describing aspects of this circuit are demonstrated below.

The op-amp buffer with input voltage, S3, from the FREQUENCY-dial potentiometer will supply an output voltage signal, S4, which will be equal to S3. This relation can be expressed as:

THE VOLTAGE OF S3 IS THE SAME AS THE VOLTAGE OF S4.

using the BNF form:

<value expression> IS THE SAME AS <value expression>

This could also be stated as:

AT ALL TIMES THE VOLTAGE OF S3 = THE VOLTAGE OF S4.

where <predicate> is:

THE VOLTAGE OF S3 = THE VOLTAGE OF S4 and the expressions on each side of "=" are value expressions.

Predicates are commonly stated. Some further examples are:

AT ALL TIMES S3 VOLTAGE <= S1 VOLTAGE.

where:

DCV IS A SIGNAL CLASS. (DCV is the class of dc voltages)
S3 IS DCV.
S4 IS DCV.
VOLTAGE IS A PROPERTY OF DCV.

Or,

AT ALL TIMES S8 VOLTAGE = THE NEGATIVE OF S4 VOLTAGE.

since S4 is inverted by the U135 op-amp circuit to produce S8. Another example of predicate declaration is:

AT ALL TIMES S7 VOLTAGE = -5.1V.

Here, the -5.1V quantity is a constant of the form:

<real number> <measure> where <measure> is the atomic measure, V.

A more complex relationship is:

S5 VOLTAGE = S4 VOLTAGE OCCURS WHEN S5 VOLTAGE = S6 VOLTAGE.

That is, if S6 = S5, no external signal source must be connected to VCF IN. Thus, S5 (as well as S6) is determined by, S4, the output of U100.

Finally,

S19 IS HIGH WHEN THE SLOPE OF S20 > 0.

describes the relationship between the gate-switching signal, S19, and the generated triangle-wave, S20. It is of the form:

<condition> WHEN <condition>

In addition to its use in representing conversation between a user and the computer system, the denotational aspects of some GLIB constructs can be exploited to provide a procedural Interface as well. For example, suppose we want to know whether SIGNAL-2 goes high before SIGNAL-1 crosses 3V with a positive slope. The interval in which this is true is denoted by the expression:

SIGNAL-2 BECOMES HIGH BEFORE SIGNAL-1 CROSSES 3 VOLTS GOING POSITIVE

In functional notation, this expression could be cast as

BEFORE ( BECOMES (SIGNAL-1 , HIGH) , +CROSSES (SIGNAL-1 , 3 VOLTS) )

or in the postfix syntax of Forth [FORTH],

SIGNAL-2 HIGH BECOMES SIGNAL-1 3V +CROSSES BEFORE

Here, the function +CROSSES takes a signal and a voltage value and returns the intervals where this event occurs. Similarly, BECOMES takes a signal and a qualitative value and returns the intervals where this happens. The arguments to BEFORE are both sets of intervals. Considered as a function returning an interval, BEFORE returns the first interval from the first set, *provided* it occurs before the first interval from the second set. Thus BEFORE is used here to test the truth of an expression in computations utilizing data captured from a device under test.

SEMANTICS OF GLIB CONSTRUCTS

A language like GLIB provides a useful medium of communication for knowledge acquisition in building expert systems for electronic device troubleshooting However, the power of such a medium is directly related to the accuracy with which knowledge can be transferred. The more rigorous the semantics of GLIB, the more precisely the knowledge, which is acquired in the form of separate rules, can be integrated through analysis of the interaction between individual rules.

GLIB is defined as a collection of forty or so linguistic units. Every unit has a *syntactic form*, which appears in the BNF syntax presented in Appendix B. The syntactic definition of any linguistic unit is usually a structured combination of syntactic representations of other linguistic units, called *constituents*. A *semantic interpretation* of the referent of any linguistic expression is called its *denotation*. This denotation in turn depends on the *semantic form* of a unit, which is usually some combination of the denotations of its syntactic constituents. The semantic forms and denotations for several of the major linguistic units of GLIB are shown in Appendix C.

As a matter of notation for describing the semantic types of GLIB expressions, each type is defined as a domain of semantic objects. New domains can be formed from old ones by three basic mechanisms, Cartesian product, power domain formation, and function formation. In the notation of this paper, ( A x B )

represents the Cartesian procuct of two domains A and B, ( 2 ** A )

represents the power set of some domain A, and

[ A -> B ]

represents the domain of functions which map elements from A into elements from B.

VALUE EXPRESSIONS

The value level of GLIB primarily consists of expressions which denote elements of the basic primitive domains. Each type of measureable or computable value may be thought of as defining its own domains. Thus, for example, Currents, Voltages, and Resistances might each have individual domains, CUR, VOL, and RES, respectively.

It is usually convenient to think of these domains as varying continuously. However, for purposes of GLIB, we will assume that each domain is equivalent in size to the integers. This should not cause too much confusion, since real numbers sampled to some limiting precision are in such a class anyway. For instance, the domain VOL might be considered to consist of 0.000, 0.001, 0.002, 0.003, etc.

as its individual values.

A GLIB expression which refers to some value may be *extensional*, naming the value directly, as in 5.003 VOLTS or it may be an *intensional reference*, describing the value indirectly as the attribute of some structural object. For instance

THE CURRENT BETWEEN NODE-3 AND NODE-4 defines an intensional reference. To determine the type of such an expression, we need a special domain consisting of all the structural objects. We shall call this special domain STR.

STR = NOD u PAT u DEV u SUB

In other words, the domain STR is composed from subdomains of the nodes paths, devices, and substructures in the device under test.

Most of the value references cannot be thought of as denoting a scalar value directly, but as denoting a signal constructed from that scalar value. For instance, the expression THE CURRENT BETWEEN <node> and <node> does NOT denote an object of the form ( NOD x NOD ) -> CUR but rather an object of the form ( NOD x NOD ) -> [ T -> CUR ]

because the current may be varying at any point in time.

In principle, it is best to think about fully specified value expressions as denoting either a scalar, such as CUR, or a scalar signal, such as [ T -> CUR ].

INTERVAL DESCRIPTIONS

Signals are probably most easily conceptualized as continuous functions of the form

[ T -> V ]

mapping individual points in time into values from some domain V. However, viewing signals as continuous quantities can make their semantic description excessively complicated. In order to preserve simplicity of our semantic definition, then, we will define signals as discrete functions from the integers into some domain V.

The basic domain of time units T, is the set of integers between 0 and infinity. A raw signal over some domain V, then, is a *partial function* of the form

[ T -> V ]

The construct *interval expression* takes on many syntactic forms. These forms usually involve embedding all the information necessary to construct a value predicate in the expression, even though *value predicate* is not usually a sub-expression. As a result, the semantic form of this construct is designated

G(P)

where P is a value predicate, and G is a special semantic function, called the *interval generator*. G plays a role similar to the semantic function E, which is typically used to define the results of evaluating express The type of G is

P -> [ S -> I ]

in other words, it maps a predicate expression into a function which projects a signal onto the set of intervals during which the predicate evaluates to *true*.

PREDICATES

At the predicate level values and intervals are combined to produce expressions which function as boolean tests, or generators which produce boolean values. The construct <temporal predicate>, for example, takes two interval sets i1 and i2 and produces a boolean value b, which depends on the relationship between the two intervals. The semantic form of a temporal predicate is IC(i1,i2)

where IC is a semantic primitive called the interval comparator, having a denotation (I x I) -> B The object denoted by a temporal predicate, then, is a boolean value.

Similarly, a value predicate represents a combination of value references, using the value comparator CV, denoting a function (R x R) -> [ T -> B ]

Since value references actually have the form

T -> V the object denoted by

CV(r1,r2)

is not of type b, but of type

T -> B which can be thought of in some sense as a boolean-valued signal.

CONTEXTS

Contexts provide a means for using either extrinsic or intrinsic conditional information to narrow the focus of a value reference or predicate. Remember that value references denote objects of the form

[ T -> V ]

while value predicates denote objects

[ T -> B ]

When combined with a context, these functions are applied to a wide range of instants of t to produce a single value. A context itself denotes an interval set i. Context dependent predicates have the following semantic form EP(P,i)

where EP is a primitive semantic function called the predicate evaluator. The type of the interval evaluator is

[([ T -> B ] x I) -> B ]

The predicate evaluator evaluates its predicate at a number of instants of time, and returns a boolean TRUE if the predicate is true at each of the instants. Otherwise the function returns a value of FALSE.

In a similar fashion, there is a primitive semantic function ER, the reference evaluator, whose type is

[ ([ T -> V ] x I) -> ( V u NIL ) ]

The reference evaluator evaluates its predicate at each instant in i, and returns a known value only if the value at all instants of i is the same. Otherwise this function returns the undefined object NIL. The semantic form of a context dependent value reference is defined using ER, $$ER(r,i)$$

denoting a value when the expression has a meaning.

The special context expression AT ALL TIMES represents the set of all instants of time, T.

SENTENCES

Because of their operational nature, declarations do not have a semantic denotation.

The semantic denotation of specifications is B, the set of Boolean values. The semantic denotation of observations is also B.

NOTE DISTINCTION BETWEEN PREDICATE AND OBSERVATION IS SEMANTIC ALTHOUGH SYNTAX IS IDENTICAL ###

APPENDIX B

Annotated BNF for Preliminary Signal Language

```
.        = delimiter (space , cr , tab , etc.)
[x]      = optional element in expansion
{x}*     = 0 or more repetitions of x
{x}+     = 1 or more repetitions of x
{x}'d'*  = 0 or more repetitions of x separated by d
{x}'d'+  = 1 or more repetitions of x separated by d
']'      = BNF character used literally
"        = quote character used literally
;        = remainder of line is comment
```

— SENTENCES —

```
<GLIB statement> ::= <sentence> <sentence terminator>

<sentence terminator> ::= '.'

<sentence> ::=
     <declaration> |
     <specification> |
     <observation> |
     <rule>

<declaration> ::=
     <structural declaration> |
     <type declaration> |
     <property declaration> |
     <unit declaration>

<type declaration> ::=
     <signal class> IS A SIGNAL CLASS |
     <signal> IS A SIGNAL OF TYPE <signal class> |
     <property> HAS A VALUE OF TYPE <object type>

<property declaration> ::=
     <property> IS A PROPERTY OF { <object type> }','+

<unit declaration> ::=
     <measure> IS A UNIT OF MEASURE |
     <property> IS MEASURED IN <atomic measure> |
     <property> HAS NO UNITS

<specification> ::=
     <specification condition> <context expression> |
     <context expression> <specification condition> |

<specification condition> ::=
     <context independent predicate> <specification modality> BE TRUE |
     <context independent predicate> <specification modality> OCCUR |
     <interval expression> <specification modality> OCCUR |
     <value reference> <specification modality> EQUAL <value reference>

<specification modality> ::= MUST | MAY ONLY

<observation> ::= <predicate>

<rule> ::= <diagnostic rule>

<diagnostic rule> ::=
     IF <observation> THEN <diagnostic conclusion>

<diagnostic conclusion> ::=
     <functional context>
```

— CONTEXTS —

```
<context expression> ::=
     <universal context>          |
     IF <static context>          |
     WHILE <behavioral context>   |
     WHEN <structural context>    |
     WHILE <behavioral context> WHEN <structural context>

          ; note that functional contexts do not appear
          ; in context expressions. At present it is
          ; not clear that information on the correct or
          ; incorrect functioning of any devices need be
          ; specified in any of the linguistic constituents
          ; in which <context expression> appears.

<universal context> ::=
     AT ALL TIMES

<atomic static context> ::=
     <value predicate>

<atomic behavioral context> ::=
     <interval expression>

<atomic structural context> ::=
     <device> IS REMOVED
```

```
<atomic functional context> ::=
    <device> IS FAILING |
    <device> IS OK

<atomic context> ::=
    <atomic behavioral context>              |
    <atomic functional context>              |
    <atomic structural context>

<static context> ::=
    <atomic static context>                  |
    <atomic static context> AND <static context>     |
    <atomic static context> OR <static context>

<behavioral context> ::=
    <atomic behavioral context>              |
    <atomic behavioral context> AND <behavioral context>   |
    <atomic behavioral context> OR <behavioral context>

        ; notice that currently entire contexts
        ; cannot be negated. This is for convenience
        ; of the grammar primarily. All negations
        ; must at present be incorporated into the
        ; atomic context of interest.

<structural context> ::=
    <atomic structural context>              |
    <atomic structural context> AND <structural context>

<functional context> ::=
    <atomic functional context>              |
    <atomic functional context> AND <functional context>   |
    <atomic functional context> OR <functional context>
```

— PREDICATES —

```
<predicate> ::=
    <context independent predicate> |
    <context dependent predicate>

<context dependent predicate> ::=
    <context independent predicate>
        [ OCCURS ] <context expression>

<context independent predicate> ::=
    <value predicate> |
    <temporal predicate>

<value predicate> ::=
    <signal> HAS <property>
        [ OF <value expression> ] |
    <signal> IS <property> |

        ; assumption is that property is
        ; boolean valued.

    <signal> IS <signal description> |
    <value expression> IS <value expression> |
    <value expression> <comparator> <value expression>

        ; these predicates are used to express
        ; extensional relationships (temporary
        ; or accidental relationships) between
        ; values.

<comparator> ::=
    IS EQUAL TO | = |
    IS GREATER THAN | > |
    IS LESS THAN | < |
    IS LESS THAN OR EQUAL TO | <= |
    IS GREATER THAN OR EQUAL TO | >= |
    IS NOT EQUAL TO | !=

<temporal predicate> ::=
    <interval expression> BEFORE <interval expression> |

        ; this predicate applies only to the
        ; first of the intervals denoted by
        ; the interval expression. The first
        ; interval denoted by the first expression
        ; must completely precede the first
        ; interval denoted by the second expression.

    <interval expression> DURING <interval expression> |

        ; all intervals denoted by the first
        ; expression must be sub-intervals of
        ; intervals denoted by the second expression.

    <interval expression> AFTER <interval expression> |

        ; again, applies only to first intervals.
        ; The first interval denoted by the second
        ; expression must completely precede the
        ; first interval denoted by the first
        ; expression.

    <interval expression> WHENEVER <interval expression>

        ; all intervals denoted by the second
        ; expression must be sub-intervals of
        ; intervals denoted by the first expression.
```

— INTERVAL EXPRESSIONS —

```
<interval expression> ::=
    <interval adjustment> |
    <atomic interval expression>

<interval adjustment> ::=
    <interval expression> DELAYED BY <temporal value> |

        ; this adjustment shifts all beginning and
        ; ending events in the denoted intervals
        ; by the indicated amount.

    <interval expression> WHILE <value predicate> |

        ; this adjustment restricts denoted
        ; intervals to those subintervals where
        ; the value predicate holds true.

    <ordinal integer> OCCURRENCE OF <interval expression>

        ; this adjustment selects the nth
        ; interval from the set of intervals
        ; denoted by an interval expression.

    <interval expression> UNTIL <interval expression>

        ; this adjustment selects a new interval
        ; whose starting point is the ending point
        ; of the first interval denoted by the first
        ; expression and whose ending point is the
        ; starting point of the first interval of
        ; the second expression. Should the first
        ; interval of the second expression begin
        ; before the first interval of the first
        ; expression ends, the result is an empty
        ; set of intervals.

<atomic interval expression> ::=
    <signal> BECOMES <property> |
    <signal> ATTAINS <property>
        OF <value expression> |
    <signal> CROSSES <signal>
        [ GOING <polarity> ] |
    <signal> CROSSES <value reference>
        [ GOING <polarity> ] |
    THE INTERVAL WHEN <value predicate> |
    <value reference> IS <value reference>

<polarity> ::= POSITIVE | NEGATIVE
```

— SIGNAL DESCRIPTIONS —

```
<signal description> ::=
    <simple signal description> |
    <simple signal description> <signal operation> <signal description>

<signal operation> ::=
    ADDED TO | SUBTRACTED FROM | MULTIPLIED BY |
    CONVOLVED WITH | WITH ENVELOPE

<simple signal description> ::=
    A <signal type> [ WITH <signal property list> ]

<signal property list> ::=
    <signal property expression> |
    <signal property expression> AND <signal property list>

<signal property expression> ::=
    <signal property> OF <value expression>

<signal property> ::=
    FREQUENCY | AMPLITUDE

        ; obviously the value must be of a type
        ; compatible with the particular signal
        ; property.
```

— VALUE EXPRESSIONS —

```
<value expression> ::=
    <value reference> | <context dependent value expression>

<context dependent value expression> ::=
    <value reference> WHEN <context>

<value reference> ::=
    <atomic value reference> | <compound value reference>

<compound value reference> ::=
    ( <value reference> ) |
    <monadic operator> <value reference> |
    <value reference> <dyadic operator> <value reference>

<atomic value reference> ::=
    <intensional value reference> |
    <intensional value reference> IN <measure> |
    <constant>

<intensional value reference> ::=
    <temporal value reference> |
    <voltage value reference> |
    <current value reference> |
    <generic value reference> |
    <substructure value reference>

<temporal value reference> ::=
    THE DURATION OF <interval expression>

<voltage value reference> ::=
    THE VOLTAGE ACROSS <point> AND <point> |
    THE <terminal>-<terminal> VOLTAGE OF <device>

<current value reference> ::=
    THE CURRENT THROUGH <point> |
    THE <terminal>-<terminal> CURRENT OF <device>

<generic value reference> ::=
    THE <property> OF <argument> |
    <object reference> <property> |
    THE <property> OF { <argument> }'AND' + |
    <property> ( { <argument> }',' + )

<argument> ::=
    <object reference> | <atomic value reference>

<substructure value reference> ::=
    THE IMPEDANCE OF <substructure>
```

— STRUCTURAL DESCRIPTIONS —

```
<structural declaration> ::=
    <node declaration> | <connection declaration>

<node declaration> ::=
    <node> IS A NODE OF <device> |
    <node> IS A NODE OF <substructure> |
    <structural object> CONTAINS <node>

<connection declaration> ::=
    <node> IS CONNECTED TO <node> |
    <nodelist> ARE CONNECTED

<nodelist> ::=
    <node> AND <node> |
    <node> ',' <nodelist>
```

— UNIT OBJECTS —

```
<object type> ::=
    <scalar object type> |
    <signal class> |
    <temporal object type> |
    <structural object type>

<scalar object type> ::=
    BOOLEAN | INTEGER | REAL-NUMBER |
    SCALAR WITH UNITS <measure>

<signal class> ::=
    SIGNAL |
    SINE-WAVE | SQUARE-WAVE |
    TRIANGLE-WAVE | POSITIVE-RAMP |
    NEGATIVE-RAMP |
    <user defined identifier>
    <temporal object type> ::=
        INTERVAL | SET OF INTERVALS

    <structural object type> ::=
        DEVICE | PATH | POINT | SUBSTRUCTURE

    <object reference> ::=
        <scalar object> |
        <signal object> |
        <temporal object> |
        <structural object>

    <scalar object> ::= <constant>

    <signal object> ::= <signal>

    <signal> ::= SIGNAL-<unsigned integer>

    <temporal object> ::= <interval> | <interval set>

    <interval> ::= INTERVAL-<unsigned integer>

    <interval set> ::= INTERVAL-SET-<unsigned integer>

    <structural object> ::=
        <device> | <path> | <node> | <substructure>

    <device> ::= <device type>-<unsigned integer>

    <device type> ::=
        CAPACITOR | DIODE | RESISTOR | TRANSISTOR |
        <user defined identifier>

    <path> ::=
        PATH-<unsigned integer> |
        [ THE PATH ] FROM <node> TO <node> |
        [ THE PATH ] BETWEEN <node> AND <node>

    <node> ::=
        NODE-<unsigned integer> |
        THE <terminal> OF <device>

    <terminal> ::=
        ANODE | BASE | CATHODE | COLLECTOR | DRAIN |
```

```
    EMITTER | GATE | SOURCE |
    <user defined identifier>

<substructure> ::= <substructure type>-<unsigned integer>

<substructure type> ::=
    AMPLIFIER-STAGE | BLOCK | FILTER |
    <user defined identifier>

        — SYNTACTIC UNITS —

<property> ::=
    AMPLITUDE | FREQUENCY |
    POWER | RESISTANCE | IMPEDANCE |
    <user defined identifier>

<monadic operator> ::=
    THE NEGATIVE OF |
    THE INVERSE OF |
    THE RECIPROCAL OF

<dyadic operator> ::=
    PLUS | MINUS | TIMES | DIVIDED BY |
    TO THE POWER OF |
    '+' | '-' | '*' | '/' | '**'.

<constant> ::=
    <object reference> |
    <boolean constant> |
    <real-number> [ <measure> ] |

<alphabetic ordinal> ::=
    FIRST  | SECOND | THIRD | FOURTH | FIFTH |
    SIXTH  | SEVENTH | EIGHTH | NINTH | TENTH

        ; obviously this could be extended to
        ; include larger alphabetic ordinals.

    <integer> [ <measure> ] |
    <literal constant>

<boolean constant> ::= TRUE | FALSE

<literal constant> ::= HIGH | LOW | <user defined identifier>

<measure> ::=
    <atomic measure> | <measure prefix><atomic measure>

<measure prefix> ::=
    MICRO | u |
    PICO  | p |
    MILLI | m |
    CENTI | c |
    <etcetera>
```

```
<atomic measure> ::=
    V | VOLTS   |
    A | AMPERES |
    F | FARADS  |
    O | OHMS    |
    <etcetera>

<user defined identifier> ::=
    <user defined word> |
    <user defined word> '-' <user defined identifier>

<user defined word> ::=
    <letter> |
    <letter> <user defined word>

<letter> ::= A | B | C | D | E | F | G | H | I | J |
        K | L | M | N | O | P | Q | R | S | T |
        U | V | W | X | Y | Z

        — NUMERIC UNITS —

<real-number> ::=
    <integer> '.' <unsigned integer> |
    <integer> '.' <unsigned integer> E <integer>

<integer> ::=
    <unsigned integer> |
    <sign> <unsigned integer>

<sign> ::= '+' | '-'

<unsigned integer> ::=
    <digit> |
    <digit> <unsigned integer>

<digit> ::= 0 | 1 | 2 | 3 | 4 | 5 | 6 | 7 | 8 | 9

<non unit digit> ::= 0 | 2 | 3 | 4 | 5 | 6 | 7 | 8 | 9

<ordinal integer> ::=
    <ordinal units suffix> |
    <ordinal teens suffix> |
    <non unit integer> <ordinal units suffix> |
    <unsigned integer> <ordinal teens suffix> |
    <alphabetic ordinal>

<ordinal units suffix> ::=
    0th | 1st | 2nd | 3rd | 4th | 5th |
    6th | 7th | 8th | 9th

<ordinal teens suffix> ::=
    10th | 11th | 12th | 13th | 14th | 15th |
    16th | 17th | 18th | 19th

<non unit integer> ::=
    <non unit digit> |
    <digit> <non unit integer>
```

APPENDIX C

SEMANTIC SPECIFICATION OF MAJOR LINGUISTIC UNITS OF GLIB

| symbol | name | semantic form | denotation |
|---|---|---|---|
| | **UNIT OBJECTS:** | | |
| NIL | bottom | primitive | {NIL} the undefined object |
| V | value | primitive | O (set of objects) |
| T | time instant | primitive | T (set of time instants) |
| I | interval set | primitive | 2 ** T |

| | | | |
|---|---|---|---|
| B | boolean | primitive | B (set of boolean values) |
| S | signal | primitive | T -> V |
| Pd | property (dynamic) | primitive | S -> [ T -> V ]<br>S -> S |
| Ps | property (static) | primitive | S -> V |

SEMANTIC PRIMITIVES:

| | | | |
|---|---|---|---|
| CI | interval comparator | primitive | ( S x S ) -> [ T -> B ] |
| CV | value comparator | primitive | ( R x R ) -> [ T -> V ] |
| ER | reference evaluator | primitive | ( R x I ) -> (V u {NIL}) |
| EP | predicate evaluator | primitive | ( P x I ) -> B |
| G | interval generator | primitive | P -> I |

VALUE LEVEL:

| | | | |
|---|---|---|---|
| R | value reference | PD(s) | T -> V |
| cdr | context dependent ref. | ER(r,i) | V u {NIL} |

PREDICATE LEVEL:

| | | | |
|---|---|---|---|
| P | predicate | C(s1,s2) | T -> B |
| cdp | context dependent pred. | | EP(p,i)B |

CONTEXT LEVEL:

| | | | |
|---|---|---|---|
| C | context | G(p) | I |

SENTENCE LEVEL:

| | | | |
|---|---|---|---|
| Pc | predicate in context | E(p1,G(p2)) | B |

APPENDIX D

EXPERT SYSTEM SOFTWARE

```
DictionaryInspector subclass: #DataInspector
    instanceVariableNames: 'superView '
    classVariableNames: ''
    poolDictionaries: ''
    category: 'Diagnostics-Graphics'
```

*DataInspector methodsFor: 'inspecting'*

```
inspect: t1
    | t2 t3 t4 |
    super inspect: t1.
    keys ← object keys.
    t2 ← keys detect: [:t3 | (t3 respondsTo: #<=) not]
              ifNone: [].
    keys ← t2 isNil
              ifTrue: [keys ← keys asSortedCollection removeAllSuchThat: [:t4 | (t4 at: 1)
                              = $Z]]
              ifFalse: [keys asOrderedCollection]
```

*DataInspector methodsFor: 'selection'*

```
selection
    selectionIndex = 1 ifTrue: [↑object].
    superView model currentComponent: (object at: (keys at: selectionIndex - 1)).
    ↑(object at: (keys at: selectionIndex - 1)) specs

selection: t1
    t1 = nil ifTrue: [↑object].
    contents ← (object at: t1) specs.
    self changed: #selection
```

*DataInspector methodsFor: 'private'*

```
superView: t1
    superView ← t1
"- - - - - - - - - - - - - - - - - - -"

DataInspector class
    instanceVariableNames: ''
```

*DataInspector class methodsFor: 'As yet unclassified'*

```
inspect: t1 superView: t2
    | t3 |
    t3 ← super inspect: t1.
    t3 superView: t2.
    ↑t3

Controller subclass: #DataInspectorController
    instanceVariableNames: ''
    classVariableNames: ''
    poolDictionaries: ''
    category: 'Diagnostics-Graphics'
```

*DataInspectorController methodsFor: 'no messages'*

```
InspectorView subclass: #DataInspectorView
    instanceVariableNames: ''
    classVariableNames: ''
    poolDictionaries: ''
    category: 'Diagnostics-Graphics'
```

*DataInspectorView methodsFor: 'selection index'*

```
getSelectionIndex
    | t1 |
    1 to: self firstSubView list lastLine do:
        [:t1 |
        ((self firstSubView list lines at: t1)
            at: 2)
            = (self firstSubView list text findString: 'C204' startingAt: 1) ifTrue: [↑t1 - 2].
        nil]

getSelectionIndex: name
    1 to: (self firstSubView list lastLine) do: [:i|
(((self firstSubView list lines at: i) at: 2) = (self firstSubView list text findString: name startingAt: 1))
ifTrue: [↑i - 2]]
```

```
StandardSystemController subclass: #DiagnosisController
    instanceVariableNames: ''
    classVariableNames: ''
    poolDictionaries: ''
    category: 'Diagnostics-Graphics'


DiagnosisController methodsFor: 'no messages'

Object subclass: #Icons
    instanceVariableNames: 'box idealObject '
    classVariableNames: 'Pictures Legs '
    poolDictionaries: ''
    category: 'Diagnostics-Graphics'

Icons methodsFor: 'variable access'

at: aBox

    box ← aBox.

box
    ↑box

box: foo
    box ← foo

idealObject
    ↑idealObject

idealObject: aPartSpecification
    ↑idealObject ← aPartSpecification

legs
    ↑Legs at: type

pointingTo
    ↑self pointingTo: Sensor cursorPoint

pointingTo: aPoint

    ↑box containsPoint: aPoint

reverse
    Display reverse: box
"-------------------"

Icons class
    instanceVariableNames: ''


Icons class methodsFor: 'As yet unclassified'

buildingUp
    Pictures ← Dictionary new.
    Legs ← Dictionary new.

cleanIcon: type
    Pictures at: type put: (Pictures at: type) bitEdit
```

```
copy: type from: typey
    Pictures at: type put: (Pictures at: typey)

fromDisplay: type
    Pictures at: type put: (Form fromDisplay: (200@20 extent: 32@32))

fromUser: type
    Pictures at: type put: (Form fromUser).

iconAt: type
    ↑Pictures at: type

init: type
    Pictures at: type put: (Form fromDisplay: (Rectangle new origin: 0@0 extent: 40@40))

legsOf: type number: num
    | x i |
    (Pictures at: type) displayOn: Display at: 100@100.
    Cursor crossHair show.
    x ← Dictionary new.
    1 to: num do: [:i | x at: i put: (Sensor waitButton - (100@100)).
            Sensor waitNoButton].
    Cursor normal show.
    Legs at: type put: x

make: type like: aForm
    Pictures at: type put: (aForm deepCopy)

makeOpaque: type like: aForm
    Pictures at: type put: (OpaqueForm shape: (aForm deepCopy))

showIconAt: type
    (Pictures at: type) displayAt: 20@500.


Icons class methodsFor: 'instance creation'

middle: start rectangle: type
    | component |
    component ← self new.
    ↑component at: (start extent: (type extent))

middle: start type: type
    | component |
    component ← self new.
    ↑component at: (start extent: ((Icons iconAt: type) extent))


Icons class methodsFor: 'buildling icons'

copyComponent
    Pictures ← Component copyPic.
    Legs ← Component copyLegs

"Icons copyComponent"

copyFromComponent
    "Will be obsolete soon"
    Pictures ← Component pictures deepCopy.
    Legs ← Component legs deepCopy.
    "Icons copyFromComponent"
```

```
legsInspect
    Legs inspect

"Icons legsInspect"

picInspect
    Pictures inspect

"Icons picInspect"

Object subclass: #InstrumentData
    instanceVariableNames: 'information schematic board inspector currentComponent view
boardTestPoints schematicTestPoints '
    classVariableNames: 'Probe '
    poolDictionaries: ''
    category: 'Diagnostics-Graphics'


InstrumentData methodsFor: 'adding components'

addBoardComponent: name boardInstance: boardInstance
    | temp |
    temp ← information at: name ifAbsent: [temp ← information at: name put: PartSpecification new].
    temp boardInstance: boardInstance.
    ↑temp

addComponent: name schematicInstance: schematicInstance boardInstance: boardInstance
    | temp |
    temp ← PartSpecification new.
    information at: name put: temp.
    temp schematicInstance: schematicInstance.
    temp boardInstance: boardInstance.
    ↑temp

addComponent: name schematicInstance: schematicInstance boardInstance: boardInstance information:
info
    | temp |
    temp ← PartSpecification new.
    information at: name put: temp.
    temp schematicInstance: schematicInstance.
    temp boardInstance: boardInstance.
    temp specs: info.
    ↑temp

initialize
    currentComponent ← nil.
    information ← Dictionary new.

removeFromBins: aPartSpecification
        schematic model bins do: [:i| i remove: (aPartSpecification schematicInstance) ifAbsent: [false]].
        board model bins do: [:i| i remove: (aPartSpecification boardInstance) ifAbsent: [false]].
    information removeAssociation: aPartSpecification ifAbsent: [false].


InstrumentData methodsFor: 'picture manipulation'

currentComponent: aPartSpecification
    | boardIcon schematicIcon |

    boardIcon ← aPartSpecification boardInstance.
```

```
    schematicIcon ← aPartSpecification schematicInstance.
    self currentComponent ~~ aPartSpecification ifTrue: [
    self unhighlightCurrentComponent.
    self moveToView: aPartSpecification.
    schematicIcon isNil
        ifFalse: [Display reverse: ((schematic displayTransform: schematicIcon box origin) extent:
schematicIcon box extent).
            schematic model background reverse: (schematicIcon box).
            inspector model selection: (information keyAtValue: aPartSpecification).
            "inspector model toggleListIndex: (inspector getSelectionIndex: (information keyAtValue:
aPartSpecification))" ]
        ifTrue: [schematic flash].
    boardIcon isNil
    ifFalse: [Display reverse: ((board displayTransform: boardIcon box origin) extent: boardIcon box
extent).
            board model background reverse: (boardIcon box) ]
    ifTrue: [board flash]].

    (Delay forMilliseconds: 250) wait.

    [Sensor anyButtonPressed]
     whileTrue: [boardIcon isNil
        ifFalse: [Display flash: ((board displayTransform: boardIcon box origin) extent: boardIcon box
extent)].
    schematicIcon isNil
        ifFalse: [Display flash: ((schematic displayTransform: schematicIcon box origin) extent:
schematicIcon box extent)]].

    ↑currentComponent ← aPartSpecification
```

inspector

```
    ↑inspector
```

inspector: anInspector

```
    inspector ← anInspector
```

movePointToBoardView: aPoint schematicView: anOtherPoint

```
    "This will cause a point that is not on the view to be moved to the center of the screen
    when selected"

    | boardIcon schematicIcon temp |

    (board containsPoint: (temp ← board displayTransform: (aPoint)))
        ifFalse: [(board controller panBy: ((board insetDisplayBox center) - temp)).
    board display].
    (schematic containsPoint: (temp ← schematic displayTransform: (anOtherPoint)))
        ifFalse: [(schematic controller panBy: ((schematic insetDisplayBox center) - temp)).
    schematic display]
```

moveToView: aPartSpecification

```
    "This will cause a part that is not on the view to be moved to the center of the screen
    when selected"

    | boardIcon schematicIcon temp |

    boardIcon ← aPartSpecification boardInstance.
    schematicIcon ← aPartSpecification schematicInstance.
    boardIcon isNil ifFalse:
    [((board insetDisplayBox) contains: (board displayTransform: (boardIcon box)))
       ifFalse: [(board controller panBy: ((board insetDisplayBox center) - (board displayTransform:
```

```
(boardIcon box origin)))).
    board display].].
    schematicIcon isNil ifFalse:
     [((schematic insetDisplayBox) contains: (schematic displayTransform: (schematicIcon box)))
        ifFalse: [(schematic controller panBy: ((schematic insetDisplayBox center) - (schematic
displayTransform: (schematicIcon box origin)))).
    schematic display]].
```

nmoveToView: aPartSpecification

```
    "This will cause a part that is not on the view to be moved to the center of the screen
    when selected"

    | boardIcon schematicIcon temp |

    boardIcon ← aPartSpecification boardInstance.
    schematicIcon ← aPartSpecification schematicInstance.
    boardIcon isNil ifFalse:
     [(board boundingBox contains: (board displayTransform: (boardIcon box)))
        ifFalse: [(board controller panBy: ((board insetDisplayBox center) - (board displayTransform:
(boardIcon box origin)))).
    board display]].
    schematicIcon isNil ifFalse:
     [(schematic boundingBox contains: (schematic displayTransform: (schematicIcon box)))
        ifFalse: [(schematic controller panBy: ((schematic insetDisplayBox center) - (schematic
displayTransform: (schematicIcon box origin)))).
    schematic display]].
```

omoveToView: aPartSpecification

```
    "This will cause a part that is not on the view to be moved to the center of the screen
    when selected"

    | boardIcon schematicIcon temp |

    boardIcon ← aPartSpecification boardInstance.
    schematicIcon ← aPartSpecification schematicInstance.
    boardIcon isNil ifFalse:
     [(board containsPoint: (temp ← board displayTransform: (boardIcon box origin)))
        ifFalse: [(board controller panBy: ((board insetDisplayBox center) - temp)).
    board display]].
    schematicIcon isNil ifFalse:
     [(schematic containsPoint: (temp ← schematic displayTransform: (schematicIcon box origin)))
        ifFalse: [(schematic controller panBy: ((schematic insetDisplayBox center) - temp)).
    schematic display]].
```

placeProbeAt: aPartSpecification

```
    | boardIcon schematicIcon |

    boardIcon ← aPartSpecification boardInstance.
    schematicIcon ← aPartSpecification schematicInstance.
    self currentComponent ~ aPartSpecification ifTrue: [
    self currentComponent: aPartSpecification.
    schematicIcon isNil
        ifFalse: [Probe displayAt: ((schematic displayTransform: schematicIcon box origin) - (Probe
boundingBox topRight))]
        ifTrue: [schematic flash].
    boardIcon isNil
```

```
    ifFalse: [Probe displayAt: ((board displayTransform: boardIcon box origin) - (Probe boundingBox
topRight))]
    ifTrue: [board flash]].
    ↑aPartSpecification
```

probeOnBoard: aBoardAddress onSchematic: aSchematicAddress

```
    | boardIcon schematicIcon |


    self movePointToBoardView: aBoardAddress
        schematicView: aSchematicAddress.
    schematic display.
    board display.
    Probe displayAt: ((schematic displayTransform: aSchematicAddress) - (Probe boundingBox topRight)).
    Probe displayAt: ((board displayTransform: aBoardAddress) - (Probe boundingBox topRight)).
```

unhighlightCurrentComponent

```
    | boardIcon schematicIcon temp |

    boardIcon ← currentComponent boardInstance.
    schematicIcon ← currentComponent schematicInstance.
    schematicIcon isNil
        ifFalse: [(schematic containsPoint: (schematic displayTransform: (schematicIcon box origin)))
ifTrue: [Display reverse: ((schematic displayTransform: ((schematicIcon box origin))) extent: schematicIcon
box extent)].
            schematic model background reverse: (schematicIcon box) ].
    boardIcon isNil
    ifFalse: [(board containsPoint: (board displayTransform: (boardIcon box origin))) ifTrue: [Display
reverse: ((board displayTransform: ((boardIcon box origin))) extent: boardIcon box extent)].
            board model background reverse: (boardIcon box) ]
```

*InstrumentData methodsFor: 'variable access'* board

```
    ↑board
```

board: aView

```
    board ← aView
```

boardTestPoints

```
    ↑boardTestPoints
```

boardTestPoints: anOrderedCollection

```
    boardTestPoints ← anOrderedCollection
```

currentComponent

```
    ↑currentComponent
```

information

```
    ↑information
```

information: anObject

```
    information ← anObject
```

schematic

```
    ↑schematic
```

schematic: aView

```
    schematic ← aView
```

```
schematicTestPoints
    ↑schematicTestPoints

schematicTestPoints: anOrderedCollection
    schematicTestPoints ← anOrderedCollection

view: aView
    view ← aView.
"- - - - - - - - - - - - - - - - - - -"

InstrumentData class
    instanceVariableNames: ''

InstrumentData class methodsFor: 'As yet unclassified'

new
    | anInstrumentData |

    anInstrumentData ← super new.
    anInstrumentData initialize.
    ↑anInstrumentData

readProbe
    Probe ← OpaqueForm shape: (Form readFrom: 'probe').


"InstrumentData readProbe"

setProbe
    Probe ← OpaqueForm shape: (Form fromUser).
    Probe bitEdit

"InstrumentData setProbe"

StandardSystemController subclass: #InstrumentDataController
    instanceVariableNames: ''
    classVariableNames: 'MiddleButtonMessages MiddleButtonMenu '
    poolDictionaries: ''
    category: 'Diagnostics-Graphics'


InstrumentDataController methodsFor: 'mouse activity'

initialize
    super initialize.
    self initializeYellowButtonMenu

initializeYellowButtonMenu
    "Initialize the yellow button pop-up menu and corresponding array of
    messages for the receiver."

    self yellowButtonMenu: MiddleButtonMenu
        yellowButtonMessages: MiddleButtonMessages


InstrumentDataController methodsFor: 'menu messages'

diagnose
    Script cr;cr;cr;cr;cr;cr;cr;endEntry.
    RuleBase frontPanel deduce
```

expand
"This puts the picture back in the 0@0 position when resized of framed"

```
    super expand.
    model schematic controller zeroPanAmount.
    model board controller zeroPanAmount.
    view display.
```

openRuleWindow

```
    RuleBase openRuleWindow
```

openScript

```
    RuleBase openScript
```

waveform

```
TriangleWave type: #voltage amplitude: 500 hertz: 843
"------------------"

InstrumentDataController class
    instanceVariableNames: ''
```

*InstrumentDataController class methodsFor: 'As yet unclassified'* changeMessages

```
    self allInstances do: [:i|
        i yellowButtonMenu: MiddleButtonMenu yellowButtonMessages: MiddleButtonMessages]

"InstrumentDataController changeMessages"
```

changeMessages: type

```
    (type = #full)
        ifTrue: [self initialize1]
        ifFalse: [ (type = #part)
            ifTrue: [self initialize2]
            ifFalse: [self initialize3]].
    self allInstances do: [:i|
        i yellowButtonMenu: MiddleButtonMenu yellowButtonMessages: MiddleButtonMessages]

"InstrumentDataController changeMessages"
```

initialize

```
    MiddleButtonMenu ← PopUpMenu labels: 'show waveform
run diagnosis
show advice
show rules'
    lines: #(2).
    MiddleButtonMessages ← #(waveform diagnose openScript openRuleWindow)

    "InstrumentDataController initialize"
```

initialize1

```
    MiddleButtonMenu ← PopUpMenu labels: 'show waveform
run diagnosis
open advice window
open rules window'
    lines: #(2).
    MiddleButtonMessages ← #(waveform diagnose openScript openRuleWindow)
```

```
    "InstrumentDataController initialize"

initialize2
    MiddleButtonMenu ← PopUpMenu labels: 'run diagnosis
open advice window
open rules window'
    lines: #(1).
    MiddleButtonMessages ← #(diagnose openScript openRuleWindow)

    "InstrumentDataController initialize"

initialize3
    MiddleButtonMenu ← nil."PopUpMenu labels: "
    lines: #(2)."
    MiddleButtonMessages ← #()

    "InstrumentDataController initialize"

menu
    ↑MiddleButtonMenu

InstrumentDataController initialize

StandardSystemView subclass: #InstrumentDataView
    instanceVariableNames: 'collapsePicture '
    classVariableNames: 'FG502 '
    poolDictionaries: ''
    category: 'Diagnostics-Graphics'

InstrumentDataView methodsFor: 'control'

defaultController
    ↑InstrumentDataController

InstrumentDataView methodsFor: 'inspecting list'

replaceInspector
    |inspectorView|
    self subViews do: [:i| (i isKindOf: InspectorView) ifTrue: [i removeFromSuperView]].
    inspectorView ← InspectorView inspector: (DataInspector inspect: model information superView: self).
    inspectorView window: (0 @ 0 extent: 300 @ 80).
    self addSubView: inspectorView.
    model inspector: inspectorView.

updateInspector
    self subViews collect: [ :i|
    (i isKindOf: InspectorView)
    ifTrue: [self removeSubView: i]].
    self addSubView: ( InspectorView inspector: (DictionaryInspector inspect: model information)) above:
self firstSubView.
    i display

InstrumentDataView methodsFor: 'private'

collapse
    "Special collaspe which will result in a picture being displayed along with the
title"
```

```
temp|
    self isCollapsed
        ifFalse:
            [savedSubViews ← subViews.
            self resetSubViews.
            self addSubView: (temp ← FormView new model: collapsePicture).
            labelText isNil ifTrue: [self label: 'No Label'].
            self window: (collapsePicture computeBoundingBox) viewport: (collapsePicture
computeBoundingBox).
            labelFrame borderWidthLeft: 2 right: 2 top: 2 bottom: 2]
```

labelDisplayBox

```
    "Special one to be used with the special collapse in this class. It will
    result in the label always being aligned with the top of the box"
    ↑labelFrame
        align: labelFrame bottomLeft
        with: self displayBox topLeft
```

window: aWindow viewport: aViewport

```
    "see comment in View -- this version will override the scaling and set it to nil"

    self window: aWindow.
    self setTransformation:
        (WindowingTransformation window: aWindow viewport: aViewport).
    subViews do: [:aSubView |
        (aSubView isKindOf: PictureView)
            ifTrue: [aSubView unlock.
                aSubView specialLock]].
    self getViewport
"------------------"

InstrumentDataView class
    instanceVariableNames: ''
```

*InstrumentDataView class methodsFor: 'As yet unclassified'* fg502

```
    ↑FG502
```

fg502: aView

```
    FG502 ← aView
```

fg502SchematicView

```
    ↑FG502 model schematic
```

foo

```
"code to convert from old to new representaiton"

"newSchematic ← PictureView withForm: oldSchematic model modelForm.
newBoard ← PictureView withForm: oldBoard model modelForm.

InstrumentDataView schematic: newSchematic board: newBoard

(oldSchematic model bins keys) collect: [:i|
(foo ← oldSchematic model bins at: i) keys collect: [:b|
a ← (foo) at: b.
(a alias) isNil ifFalse: [
    newSchematic model addSchematicIcon: (a componentType) asString asSymbol
        name: ((((tempo ← (a alias information text asString)) copyFrom: ((tempo findFirst: [:iii| iii= $:]) +
```

```
1) to: ((tempo findFirst: [:iii| iii= $T]) - 1)) copyWithout: $  ) copyWithout: $
)
        place: (a corner)
        information: (a alias information text asString).
oldSchematic flash]]].

(oldBoard model bins keys) collect: [:i|
(foo ← oldBoard model bins at: i) keys collect: [:b|
ab ← (foo) at: b.
    newBoard model addBoardIcon: (ab aRectangle)
        name: (ab information isNil ifTrue: ['Z',((i@b) printString)] ifFalse: [(((((tempo ← (ab information
text asString)) copyFrom: ((tempo findFirst: [:iii| iii= $:]) + 1) to: ((tempo findFirst: [:iii| iii= $T]) - 1))
copyWithout: $  ) copyWithout: $
)])
        place: (ab aRectangle origin)
        information: nil.
oldBoard flash]].
!

schematic: aSchematicView board: aBoardView
    | aView temp temp2 inspectorView leftView rightView |
    aView ← super new.
    aView controller: InstrumentDataController new initialize.
    aView model: InstrumentData new.
    aView model view: aView.
    aView model board: aBoardView.
    aView model schematic: aSchematicView.
    aView label: 'Instrument Data'.
    aView insideColor: Form white.
    aView borderWidth: 2.
    inspectorView ← DataInspectorView inspector: (DataInspector inspect:  aView model information).
    inspectorView controller: DataInspectorController new.
    leftView ← inspectorView firstSubView.
    rightView ← inspectorView lastSubView.
    leftView window: (0 @ 0 extent: 75@80).
    rightView window: (0 @ 0 extent: 300@80).
    aView model inspector: inspectorView.
    inspectorView window: (0 @ 0 extent: 300 @ 80).
    inspectorView transformation: 75@0"View identityTransformation".
    aSchematicView window: (0 @ 0 extent: 300 @ 200).
    aBoardView window: (0 @ 0 extent: 300 @ 200).
    aView addSubView: inspectorView" above: aSchematicView".
    aView addSubView: aSchematicView below: inspectorView.
    aView addSubView: aBoardView below: aSchematicView.
    aView controller: InstrumentDataController new."
    aView minimumSize: (300@480)."
    aView controller open.

Object subclass: #PartSpecification
    instanceVariableNames: 'specs boardInstance schematicInstance '
    classVariableNames: ''
    poolDictionaries: ''
    category: 'Diagnostics-Graphics'


PartSpecification methodsFor: 'variable access'

boardInstance
    ↑boardInstance
```

```
boardInstance: anObject
    ↑boardInstance ← anObject

schematicInstance
    ↑schematicInstance

schematicInstance: anObject
    ↑schematicInstance ← anObject

specs
    ↑specs

specs: anObject
    ↑specs ← anObject

Object subclass: #Picture
    instanceVariableNames: 'background view bins '
    classVariableNames: ''
    poolDictionaries: ''
    category: 'Diagnostics-Graphics'


Picture methodsFor: 'variable access'

background
    ↑background

background: aForm
    ↑background ← aForm

bins
    ↑bins

view: object
    view ← object


Picture methodsFor: 'adding icons'

addBoardIcon: type name: name
    | start end component i halo |

    halo ← OpaqueForm shape: (Icons iconAt: type).
    halo follow: [Sensor cursorPoint]
        while: [Sensor noButtonPressed].

    start ← Sensor waitButton.

    (view containsPoint: start)
        ifTrue: [component ← Icons middle: (view inverseDisplayTransform: (start grid: 1@1)) type: type.
            (bins at: (((view inverseDisplayTransform: start) x)//40)) add: component.

            (view superView model information includesKey: name)
                ifFalse: [component idealObject:
                    (view superview model addComponent: name
                        schematicInstance: nil
                        boardInstance: component)]
                ifTrue: [(view superView model information at: name) boardInstance: component.
                    component idealObject: (view superView model information at: name)].
```

```
                Sensor waitNoButton.
                (Icons iconAt: type) displayOn: background at: (view inverseDisplayTransform: (start grid: 1@1))].
    view display.
```

addBoardIcon: type name: name place: aPoint information: info

```
"This is used only to input a previously existing datastructure"

    | start end component i halo |
    start ← aPoint.
    component ← Icons middle: ((start grid: 1@1)) rectangle: type.
    (bins at: (((start) x)//40) + 1) add: component.
    component idealObject: (view superView model addBoardComponent: (name asString) boardInstance: component).
```

addComponent: type

```
    | start end component i halo |
    halo ← OpaqueForm shape: (Component iconAt: type).
    halo follow: [Sensor cursorPoint]
         while: [Sensor noButtonPressed].
    start ← Sensor waitButton.
    (view containsPoint: start)
        ifTrue: [component ← Component middle: (view inverseDisplayTransform: (start grid: 1@1)) type: type reference: 0@0.
                (bins at: (((view inverseDisplayTransform: start) x)//40)) add: component.
                Sensor waitNoButton.
                component displayOn: background].
    view display.
```

addIcon: type

```
    | start end component i halo |

    halo ← OpaqueForm shape: (Icons iconAt: type).
    halo follow: [Sensor cursorPoint]
         while: [Sensor noButtonPressed].

    start ← Sensor waitButton.
    (view containsPoint: start)
        ifTrue: [component ← Icons middle: (view inverseDisplayTransform: (start grid: 1@1)) type: type.
            (bins at: (((view inverseDisplayTransform: start) x)//40)) add: component.
    view superView model add: PartSpecification new.
            Sensor waitNoButton.
            (Icons iconAt: type) displayOn: background at: (view inverseDisplayTransform: (start grid: 1@1))].
    view display.
```

addSchematicIcon: type name: name

```
    | start end component i halo |

    halo ← OpaqueForm shape: (Icons iconAt: type).
    halo follow: [Sensor cursorPoint]
         while: [Sensor noButtonPressed].

    start ← Sensor waitButton.
    (view containsPoint: start)
        ifTrue: [component ← Icons middle: (view inverseDisplayTransform: (start grid: 1@1)) type: type.
            (bins at: (((view inverseDisplayTransform: start) x)//40)) add: component.
        component idealObject: (view superView model addComponent: name schematicInstance: component boardInstance: nil).
            Sensor waitNoButton.
```

```
        (Icons iconAt: type) displayOn: background at: (view inverseDisplayTransform: (start grid:
1@1))].
    view display.
```

addSchematicIcon: type name: name place: aPoint
"This is used only to input a previously existing datastructure"

```
    | start end component i halo |

    start ← aPoint.
    component ← Icons middle: ((start grid: 1@1)) type: type.
    (bins at: (((start) x)//40) + 1) add: component.
    component idealObject: (view superView model addComponent: (name asString) schematicInstance:
component boardInstance: nil).
```

addSchematicIcon: type name: name place: aPoint information: info
"This is used only to input a previously existing datastructure"

```
    | start end component i halo |

    start ← aPoint.
    component ← Icons middle: ((start grid: 1@1)) type: type.
    (bins at: (((start) x)//40) + 1) add: component.
    component idealObject: (view superView model addComponent: (name asString) schematicInstance:
component boardInstance: nil information: info).
```

*Picture methodsFor: 'making background'* createBackground

```
    | modelImage t1 t2 |
    modelImage ← Quadrangle new.
    modelImage insideColor: Form white.
    modelImage borderColor: Form black.
    modelImage borderWidth: 5.
    Cursor corner show.
    t2 ← Sensor waitButton.
    Cursor normal show.
    modelImage origin: 0@0 corner: t2.
    modelImage displayOn: Display.
    background ← Form fromDisplay: (Rectangle origin: 0@0 corner: t2).
```

displayBackground

```
    background displayOn: Display
```

fixBackground

```
    background edit
```

writeBackground

```
    FillInTheBlank
        request: 'What name for the file?'
        displayAt: 500@500
        centered: true
        action: [:answer | background writeOn: answer]
        initialAnswer: ''
```

*Picture methodsFor: 'private'* reDisplay

```
    background displayOn: Display.
```

setBins

```
    bins ← OrderedCollection new.
    1 to: 26 do: [ :i|
        bins add: OrderedCollection new]
"------------------"

Picture class
    instanceVariableNames: ''
```

*Picture class methodsFor: 'As yet unclassified'* initialize

```
    | t1 |
    t1 ← super new.
    t1 createBackground.
    t1 setBins.
    t1 panAmount: 0@0.
    ↑t1
```

initialize: aForm

```
    | t1 |
    t1 ← super new.
    t1 background: aForm.
    t1 setBins.
    t1 panAmount: 0@0.
    ↑t1
```

new

```
    | aView formView |
    aView ← self initialize.
    ↑aView
```

withForm: aForm

```
    | aView formView |
    aView ← self initialize: aForm.
    ↑aView

Picture initialize

Controller subclass: #PictureController
    instanceVariableNames: 'panAmount '
    classVariableNames: ''
    poolDictionaries: ''
    category: 'Diagnostics-Graphics'
```

*PictureController methodsFor: 'control activity'* controlActivity

```
    Sensor redButtonPressed
        ifTrue: [self redButtonActivity].
    Sensor yellowButtonPressed
        ifTrue: [self yellowButtonActivity].
    super controlActivity.
```

controlInitialize

```
    Cursor crossHair show.
    super controlInitialize
```

```
controlTerminate
    Cursor normal show.
    super controlTerminate

controlToNextLevel
    "Pass control to the next control level (that is, to the Controller of a
    subView of the receiver's view) if possible. The receiver finds the
    subView (if any) of its view whose inset display box (see
    View‡insetDisplayBox) contains the sensor's cursor point. The Controller
    of this subView is then given control if it answers true in response to
    the message Controller‡isControlWanted."

    | aView |
    aView ← view subViewWantingControl.
    aView ~= nil ifTrue: [ (aView isKindOf: FormView)
        ifFalse: [aView highlight. aView controller startUp]]

initialize
    super initialize."
    self initializeYellowButtonMenu"

release
    model release.
    super release

yellowButtonActivity
    view superView controller yellowButtonActivity


PictureController methodsFor: 'panning functions'

pan
    | t1 t2 |
    t1 ← Sensor cursorPoint.

    Cursor move show.
    Cursor move
        displayOn: Display
        at: t1
        clippingBox: Display boundingBox
        rule: 3
        mask: Form gray.
    t2 ← Sensor waitNoButton.
    Cursor crossHair show.
    self panAmount: ((t2 - t1) "+ panAmount").
    view scrollBy: t2 - t1.

panAmount
    ↑panAmount

panAmount: aPoint
"increments the panAmount "
"Transcript cr; show: (aPoint printString); show: ' ';show: (panAmount printString)."
    ↑panAmount ← aPoint + panAmount

panBy: aPoint
    panAmount isNil ifTrue: [panAmount ← 0@0].
    self panAmount: ("panAmount +" aPoint).
    view scrollBy: aPoint.
```

```
zeroPanAmount
    "self panBy: ((panAmount x negated)@(panAmount y negated))".
    self panBy: ((view computeBoundingBox topLeft))"


PictureController methodsFor: 'control'

redButtonActivity
    "This controls the activity for pressing the leftmost button. If the
    left shift is down when the button is pressed it will just do the pan
    function. Otherwise it will check if a component is being pointed
    to and highlight it."

    | icon |
    icon ← nil.
    Sensor leftShiftDown
        ifTrue:
            [self pan.
            view display.
            "view superView currentComponent: view superView currentComponent"]

        ifFalse:
            [(icon ← self view pointingTo: ((self view inverseDisplayTransform: Sensor waitButton))) isNil
            ifTrue:
                [self pan.
                view display]
            ifFalse: [view superView model currentComponent: icon idealObject].
        Sensor waitNoButton].
↑icon

View subclass: #PictureView
    instanceVariableNames: ''
    classVariableNames: ''
    poolDictionaries: ''
    category: 'Diagnostics-Graphics'

PictureView methodsFor: 'controller'

defaultControllerClass
    ↑PictureController


PictureView methodsFor: 'pointing'

pointingTo: tempPoint
    "answers the component pointed to by apoint"

    | searchKey aPoint |
    aPoint ← tempPoint + (0@0)"(controller panAmount)".
    searchKey ← (((aPoint x)//40) min: 25) + 1.
    (searchKey <= 0) ifTrue: [↑nil].
    (model bins at: searchKey) isEmpty ifTrue: [↑nil].
    (model bins at: searchKey) collect: [:icon |
        (icon pointingTo: aPoint)
            ifTrue:[ ↑icon ]].
    searchKey ← (searchKey - 1) max: 1.
    (model bins at: searchKey) collect: [:icon |
        (icon pointingTo: aPoint)
            ifTrue:[ ↑icon ]].
    ↑nil
```

```
specialPointingTo: anArray
"The current rule base thing sends an array instead of a point. This
will convert the array to a point and call pointingTo: then assigns it as the current component"
    self superView model currentComponent: ((self pointingTo: (Point x: (anArray at: 1) y: (anArray at:
3))) idealObject).
↑true
```

*PictureView methodsFor: 'locking, etc.'*

```
lock
    self specialLock

scrollBy: aPoint
    "This wrenches control from the same method in View. the normal one will
    cause points to be adjusted by the scale of the window."

    | aRectangle |
    aRectangle ← insetDisplayBox.
    transformation ← transformation scrollBy: aPoint.
    window ← self getWindow translateBy: aPoint x negated @ aPoint y negated.
    self unlock.
    self specialLock.
    insetDisplayBox ← aRectangle.

specialComputeDisplayTransformation
    "Computes a displayTransform without using the scale"

    self isTopView
        ifTrue: [ ↑transformation]
        ifFalse: [ ↑(WindowingTransformation scale: nil translation:
                (superView displayTransformation translation)) compose: transformation]

specialLock
    "Special lock is employed to fool the system into not using the scale to determine
    display transforms"

    self isLocked ifTrue: [ ↑self].
    displayTransformation ← self computeDisplayTransformation.
    insetDisplayBox ← self computeInsetDisplayBox.
    displayTransformation ← self specialComputeDisplayTransformation.
    subViews do: [:aSubView | aSubView lock]
"------------------"

PictureView class
    instanceVariableNames: ''
```

*PictureView class methodsFor: 'As yet unclassified'*

```
new
    "Create and schedule a view of the receiver."

    | formView topView |
    topView ← super new.
    topView model: Picture new.
    topView model view: topView.
    formView ← SpecialFormView new model: (topView model background).
    formView controller: NoController new initialize.
    topView addSubView: formView.
```

```
    topView insideColor: Form darkGray.
    topView borderWidthLeft: 2
        right: 2
        top: 2
        bottom: 2.
    ↑topView
```

withForm: aForm

```
    "Create and schedule a view of the receiver."

    | formView topView |
    topView ← super new.
    topView model: (Picture withForm: aForm).
    topView model view: topView.
    formView ← SpecialFormView new model: aForm.
    formView controller: NoController new initialize.
    topView addSubView: formView.
    topView insideColor: Form darkGray.
    topView borderWidthLeft: 2
        right: 2
        top: 2
        bottom: 2.
    ↑topView
```

```
FormView subclass: #SpecialFormView
    instanceVariableNames: ''
    classVariableNames: ''
    poolDictionaries: ''
    category: 'Diagnostics-Graphics'
```

*SpecialFormView methodsFor: 'display'* displayView

```
    "Refer to the comment in View|displayView."

    | oldOffset |
    insideColor == nil ifFalse: [Display fill: self insetDisplayBox mask: insideColor].
    oldOffset ← model offset.
    model offset: 0@0.
    model
        displayOn: Display
        transformation: (WindowingTransformation scale: nil translation: (self displayTransformation
translation))
        clippingBox: self insetDisplayBox
        rule: self rule
        mask: self mask.
    model offset: oldOffset
Object subclass: #BasicRule
    instanceVariableNames: 'if pass fail whileConsidering english componentFailed '
    classVariableNames: ''
    poolDictionaries: ''
    category: 'Diagnostics-Knowledge'
```

*BasicRule methodsFor: 'rule creation'* component: comp whileConsidering: block1 if: block2 pass: block3 fail: block4 english: aString

```
 "I create the rule variables and values."
```

```
    whileConsidering ← block1.
    if ← block2.
    pass ← block3.
    fail ← block4.
    english ← aString.
    componentFailed ← comp
```

whileConsidering: block1 if: block2 pass: block3 fail: block4 english: aString

```
 "I create the rule variables and values."

    whileConsidering ← block1.
    if ← block2.
    pass ← block3.
    fail ← block4.
    english ← aString
```

*BasicRule methodsFor: 'rule use'* componentFailed

```
    ↑componentFailed
```

english

```
    ↑english
```

fail

```
    ↑fail
```

forget: t1

```
    (Undeclared at: #discoveredFacts)
        remove: t1
```

if

```
    ↑if
```

ifValue

```
    | t1 t2 |
    "whileConsidering do:
        [:t2 |
        InstrumentDataView fg502 model probeOnBoard: (InstrumentDataView fg502 model
boardTestPoints at: t2)
            onSchematic: (InstrumentDataView fg502 model schematicTestPoints at: t2).
        t2 = whileConsidering last ifFalse: [BinaryChoice
                message: 'Place a probe where indicated -
 this is location: ' , t2 printString
                displayAt: Sensor cursorPoint
                centered: true
                ifTrue: []
                ifFalse: []]]."
    1 to: self if size do:
        [:t2 |
        t1 ← self if at: t2.
        ((((t1 at: 1)
            isKindOf: Array)
            ifTrue: [(Smalltalk at: ((t1 at: 1)
                        at: 1))
                    perform: ((t1 at: 1)
                            at: 2)]
            ifFalse: [Smalltalk at: (t1 at: 1)])
```

```
        perform: (t1 at: 2)
        withArguments: (t1 at: 3))
        ifFalse: [↑false]].
    ↑true

pass

    ↑pass

passValue
    self value: self pass

recall: t1
    (Undeclared at: #discoveredFacts)
        includes: t1

release
    self if release.
    self pass release.
    self fail release.
    self whileConsidering release

remember: t1
    (Undeclared at: #discoveredFacts)
        add: t1

value: array
    | temp |
    1 to: (array size) do: [ :i |
        temp ← array at: i.
        ((((temp at: 1) isKindOf: Array)
                ifFalse:[Smalltalk at: (temp at: 1)]
                ifTrue:[(Smalltalk at: ((temp at: 1) at: 1)) perform: ((temp at: 1) at: 2)])
            perform: (temp at: 2)
            withArguments: (temp at: 3))]

whileConsidering
    ↑whileConsidering
'-------------------'

BasicRule class
    instanceVariableNames: ''


BasicRule class methodsFor: 'instance creation'

component: comp whileConsidering: aBlock4 if: aBlock1 pass: aBlock2 english: aString
    | newRule |
    newRule ← super new.
    ↑newRule component: comp
            whileConsidering: aBlock4
            if: aBlock1
            pass: aBlock2
            fail: []
            english: aString

forget: thing
    (Undeclared at: #discoveredFacts) remove: thing.
```

if: aBlock1 pass: aBlock2 fail: aBlock3

```
| newRule |
newRule ← super new.
↑newRule whileConsidering: [nil]
        if: aBlock1
        pass: aBlock2
        fail: aBlock3
        english: nil
```

if: aBlock1 pass: aBlock2 fail: aBlock3 english: aString

```
| newRule |
newRule ← super new.
↑newRule whileConsidering: [nil]
        if: aBlock1
        pass: aBlock2
        fail: aBlock3
        english: aString
```

if: aBlock1 then: aBlock2

```
| newRule |
newRule ← super new.
↑newRule whileConsidering: [nil]
        if: aBlock1
        pass: aBlock2
        fail: [nil]
        english: ''
```

if: aBlock1 then: aBlock2 english: aString

```
| newRule |
newRule ← super new.
↑newRule whileConsidering: [nil]
        if: aBlock1
        pass: aBlock2
        fail: aString
```

recall: t1

```
(Undeclared at: #discoveredFacts)
    includes: t1
```

remember: t1

```
(Undeclared at: #discoveredFacts)
    add: t1
```

whileConsidering: aBlock4 if: aBlock1 pass: aBlock2 english: aString

```
| newRule |
newRule ← super new.
↑newRule whileConsidering: aBlock4
        if: aBlock1
        pass: aBlock2
        fail: []
        english: aString
```

whileConsidering: aBlock4 if: aBlock1 pass: aBlock2 fail: aBlock3 english: aString

```
| newRule |
newRule ← super new.
↑newRule whileConsidering: aBlock4
        if: aBlock1
        pass: aBlock2
```

```
            fail: aBlock3
            english: aString

whileConsidering: aBlock4 if: aBlock1 then: aBlock2  english: aString
    | newRule |
    newRule ← super new.
    ↑newRule whileConsidering: aBlock4
            if: aBlock1
            pass: aBlock2
            fail: []
            english: aString
Object subclass: #Memory
    instanceVariableNames: 'discoveredFacts '
    classVariableNames: ''
    poolDictionaries: ''
    category: 'Diagnostics-Knowledge'
Memory comment:
'Memory is a repository of discovered facts found during the consultation.
The instance of the variable is accessed in a reasonably convoluted way
through the class methods'
```

*Memory methodsFor: 'As yet unclassified'*

```
remember: t1
    ↑discoveredFacts add: t1
```

*Memory methodsFor: 'memory query'*

```
ask: english about: attribute
    "This allows the memory to ask questions of the user to find
    out relevant facts about the world."
    | t1 |
    t1 ← BinaryChoice
        message: english
        displayAt: InstrumentDataView fg502 insetDisplayBox topCenter + (0@50)
        centered: true
        ifTrue: [self remember: attribute is: 'true'. true]
        ifFalse: [self remember: attribute is: 'false'. false].

recall: thing
    "Causes memory to return the value of a parameter."

    ↑discoveredFacts associationAt: thing

recall: thing is: state
    "Allows you to ask if a parameter has a certain value."

    ↑(discoveredFacts at: thing ifAbsent: [Memory ask: thing about: thing. discoveredFacts at:
thing]) = state

recall: thing is: state ask: aString
    "Allows you to ask if a parameter has a certain value."

    ↑(discoveredFacts at: thing ifAbsent: [Memory ask: aString about: thing. discoveredFacts at:
thing]) = state
```

```
unknown: thing
    "A method for querying whetehr a fact is known"

    ↑(discoveredFacts includesKey: thing) not


Memory methodsFor: 'memory changes'

clear
    discoveredFacts ← (Dictionary new).
    self remember: 'Consultation' is: 'new'.

forget: thing
    "Causes a fact to be retracted."

    ↑discoveredFacts removeKey: thing

remember: thing is: state
    "Allows you put a fact into memory"

    ↑discoveredFacts add: (Association key: thing value: state)


Memory methodsFor: 'private'

discoveredFacts
    ↑discoveredFacts
"------------------"

Memory class
    instanceVariableNames: ''
Memory class comment:
'This rule base component allows storage of facts.
    Facts may be stored as paramter/value couplets'


Memory class methodsFor: 'memory query'

dump
    "Used to see what is really in memory"

    ↑((Undeclared at: #memory) discoveredFacts) inspect

inspect
    "Used to pass the message go the appropriate instance
    method. These are used to get at the global memory
    value."

    ↑(Undeclared at: #memory) inspect

recall
    "Used to pass the message go the appropriate instance
    method. These are used to get at the global memory
    value."

    ↑(Undeclared at: #memory) recall
```

recall: x

```
"Used to pass the message go the appropriate instance
method. These are used to get at the global memory
value."

↑(Undeclared at: #memory) recall: x
```

recall: x is: y

```
"Used to pass the message go the appropriate instance
method. These are used to get at the global memory
value."

↑(Undeclared at: #memory) recall: x is: y
```

recall: x is: y ask: z

```
"Used to pass the message go the appropriate instance
method. These are used to get at the global memory
value."

↑(Undeclared at: #memory) recall: x is: y ask: z
```

recall: x is: y ask: z point: aTestPoint

```
"Used to pass the message go the appropriate instance
method. These are used to get at the global memory
value."

| view |
view ← InstrumentDataView fg502 model.
(aTestPoint isKindOf: Array)
    ifTrue: [aTestPoint do: [:i| view probeOnBoard: (view boardTestPoints at: (i))
    onSchematic: (view schematicTestPoints at: (i)).
    i = aTestPoint last ifFalse: [BinaryChoice
            message: 'Place a probe where indicated -
this is location: ' , i printString
            displayAt: Sensor cursorPoint
            centered: true
            ifTrue: []
            ifFalse: []]]]
    ifFalse: [view probeOnBoard: (view boardTestPoints at: aTestPoint)
    onSchematic: (view schematicTestPoints at: aTestPoint)].
↑(Undeclared at: #memory) recall: x is: y ask: z
```

unknown: x

```
"Used to pass the message go the appropriate instance
method. These are used to get at the global memory
value."

↑(Undeclared at: #memory) unknown: x
```

*Memory class methodsFor: 'memory changes'* clear

```
"Used to pass the message go the appropriate instance
method. These are used to get at the global memory
value."

↑(Undeclared at: #memory) clear

"Memory clear"
```

forget: x

```
"Used to pass the message go the appropriate instance
method. These are used to get at the global memory
value."

↑(Undeclared at: #memory) forget: x
```

remember: x is: y

```
"Used to pass the message go the appropriate instance
method. These are used to get at the global memory
value."

↑(Undeclared at: #memory) remember: x is: y
```

*Memory class methodsFor: 'user query'* ask: x about: y

```
"Used to pass the message go the appropriate instance
method. These are used to get at the global memory
value."

↑(Undeclared at: #memory) ask: x about: y
```

*Memory class methodsFor: 'instance creation'* initialize

```
"Initially creates the memory, and clears it for the first consultation."
Undeclared at: #memory put: self new.
(Undeclared at: #memory) clear

"Memory initialize"
```

```
Memory initialize

Object subclass: #RuleBase
    instanceVariableNames: 'ruleList discoveredFacts consultationFinished probe rulesTested '
    classVariableNames: 'Report Pic1testPoints FrontPanel Probe InABlock VDFBlock SFBlock NCSBlock CSBlock PCSBlock Pic2 TWCBlock Pic1 Pic2testPoints SABlock TLBlock '
    poolDictionaries: ''
    category: 'Diagnostics-Knowledge'
```

*RuleBase methodsFor: 'adding rules'* addRule: aRule

```
"Put a rule int the rule base"

| size |
size ← ruleList size.
ruleList at: size put: aRule
```

addRule: aRule number: number

```
"Put a rule int the rule base"

ruleList at: number put: aRule
```

*RuleBase methodsFor: 'deduction'*

```
deduce
    "I work begin a deduction continue until the constultation is finished."
    | backtrack |
    backtrack ← Memory copy.
    rulesTested ← Set new.
    Sensor leftShiftDown ifFalse: [Memory initialize]. "Don't restart if left shift down"

    consultationFinished ← false.
    [consultationFinished]
        whileFalse: [self deduceOneStep].
    (Memory unknown: 'Deduction')
        ifTrue: [BinaryChoice
        message: 'No deduction is possible given the symptoms
Would you like to redo the last set of symptoms?'
        displayAt: Sensor cursorPoint
        centered: true
        ifTrue: [InstrumentDataView fg502 fastDisplay.
            Script cr; show: 'Stepping back ....'.
            Undeclared at: #Memory put: backtrack.
            ↑self deduce]
        ifFalse: [↑Script cr; show: 'No further deduction made']].
    (Memory recall: 'Deduction' is: 'forgotten')
        ifTrue: [BinaryChoice
        message: 'Would you like to resume diagnosis?'
        displayAt: Sensor cursorPoint
        centered: true
        ifTrue: [InstrumentDataView fg502 fastDisplay.
            Script cr; show: 'Stepping back ....'.
            Undeclared at: #Memory put: backtrack.
            ↑self deduce]
        ifFalse: [Script cr; show: 'No further deduction made']].
    Script cr; show: 'Consultation completed.'.

deduceOneStep
    "I check each of the rules in the rule base, and execute the first one that passes. If the shift
    key is held,
    I will display the rule being examined in a window."
        | temp p1back p2back cursor val delay |

    cursor ← Cursor currentCursor.
    (ruleList detect: [:i | Cursor move show.
        Sensor leftShiftDown ifTrue: [self halt.].
            (rulesTested includes: i)
                    ifTrue: [false]
            ifFalse:[RuleWindow cr; cr; show: i english.
                rulesTested add: i.
                val ←i ifValue.
                Sensor blueButtonPressed ifTrue: [consultationFinished ← true. ↑nil].
                temp ← i.
            val]]
    ifNone: [temp ← nil. consultationFinished ← true]).
    temp isNil
        ifFalse: [RuleWindow cr; show: '—PASSED —'.
                Script "clear;" cr"; changed: self".
                temp passValue. Sensor leftShiftDown ifTrue: [self halt]].
    Cursor currentCursor: cursor

odeduceOneStep
    "I check each of the rules in the rule base, and execute the first one that passes. If the shift
    key is held,
```

```
      I will display the rule being examined in a window."
          | temp p1back p2back cursor val delay |
  cursor ← Cursor currentCursor.
  (ruleList detect: [:i | RuleWindow cr; cr; show: i english.
          Cursor move show.
          (rulesTested includesElement: i)
                  ifTrue: [false]
          ifFalse:[rulesTested add: i.
          val ←i ifValue.
          Sensor blueButtonPressed ifTrue: [consultationFinished ← true. ↑nil].
          temp ← i.
          val]]
   ifNone: [temp ← nil. consultationFinished ← true]).
  temp isNil
      ifFalse: [RuleWindow cr; show: '—PASSED —'.
              Script clear; cr; changed: self.
              temp passValue].
  Cursor currentCursor: cursor
```

oodeduceOneStep

```
  "I check each of the rules in the rule base, and execute the first one that passes. If the shift
  key is held,
  I will display the rule being examined in a window."
      | temp p1back p2back cursor val delay |
  cursor ← Cursor currentCursor.
  (ruleList detect: [:i | RuleWindow cr; cr; show: i english.
          Cursor move show.
          val ←i ifValue.
          Sensor blueButtonPressed ifTrue: [consultationFinished ← true. ↑nil].
          temp ← i.
          val]
   ifNone: [temp ← nil. consultationFinished ← true]).
  temp isNil
      ifFalse: [RuleWindow cr; show: '—PASSED —'.
              Script clear; cr; changed: self.
              temp passValue].
  Cursor currentCursor: cursor
```

*RuleBase methodsFor: 'evaluation'* ifValue

```
  "Steps through the if clauses and continues until a false is reached or
  all are completed successfully."
  | temp |
  1 to: (self if size) do: [ :i |
      temp ← self if at: i.
      (Smalltalk at: (temp at: 1))
          perform: (temp at: 2)
  ↑true   withArguments: (temp at: 3) ifFalse: [↑false]].
```

passValue

```
  self value: self pass
```

value: array

```
  | temp |
  1 to: (array size) do: [ :i |
      temp ← array at: i.
      (Smalltalk at: (temp at: 1))
          perform: (temp at: 2)
          withArguments: (temp at: 3)]
```

*RuleBase methodsFor: 'private'*

```
init
    Memory clear.
    ruleList ← Dictionary new.
    consultationFinished ← false

picInspect
    Pic1testPoints inspect

"RuleBase picInspect."

release
    ruleList collect: [:i| i release].
    ruleList release

setPic1tp: x pic2: y
    Pic1testPoints ← x.
    Pic2testPoints ← y
stop
    Memory remember: 'Deduction' is: 'complete'.
    consultationFinished ← true

stopAndAsk
    Memory remember: 'Deduction' is: 'forgotten'.
    consultationFinished ← true
"_ _ _ _ _ _ _ _ _ _ _ _ _ _ _ _ _ _"

RuleBase class
    instanceVariableNames: ''
RuleBase class comment:
'I control the production system. I contain all of the instances of rules that are
to be used in the system. I contain methods for running through the rules to
make discoveries'
```

*RuleBase class methodsFor: 'initialization'*

```
blocksNew
    TWCBlock ← RuleBase new.
    VDFBlock ←RuleBase new.
    SABlock ← RuleBase new.
    InABlock ← RuleBase new.
    NCSBlock ← RuleBase new.
    PCSBlock ← RuleBase new.
    SFBlock ← RuleBase new.
    CSBlock ←RuleBase new.
    TLBlock ← RuleBase new.
    FrontPanel ← RuleBase new.
    FrontPanel init.
    TWCBlock init.
    VDFBlock init.
    SABlock init.
    InABlock init.
    NCSBlock init.
    PCSBlock init.
    SFBlock init.
    CSBlock init.
    TLBlock init.

        "RuleBase blocksNew"
```

```
csBlock
    ↑CSBlock

frontPanel
    ↑FrontPanel
    "RuleBase frontPanel"

inaBlock
    ↑InABlock

initialize
    ↑(self new) init

makeReport
    Report ← Form fromUser
"RuleBase makeReport"

ncsBlock
    ↑NCSBlock

openRuleWindow
    Smalltalk at: #RuleWindow put: (TextCollector new).
    TextCollectorView open: (Smalltalk at: #RuleWindow put: (TextCollector new)) label:
'Rules under examination'.

"RuleBase openRuleWindow.
RuleBase openScript"

openScript
    Smalltalk at: #Script put: (TextCollector new).
    TextCollectorView open: (Smalltalk at: #Script put: (TextCollector new)) label: 'Trouble-
    shooting Advice'.

"RuleBase openScript"

pcsBlock
    ↑PCSBlock

pic1ins
    Pic1testPoints inspect
    "RuleBase pic1ins"

pic2ins
    Pic2testPoints inspect
    "RuleBase pic2ins"

pic2Inspect
    Pic2testPoints inspect

"RuleBase pic2Inspect."

picInspect
    Pic1testPoints inspect

"RuleBase picInspect."

report
    Report ← Form fromUser

"RuleBase report"
```

```
reportE
    Report edit

"RuleBase reportE"

saBlock
    ↑SABlock

setPic1tp: x pic2: y
    Pic1testPoints ← x.
    Pic2testPoints ← y


setPic: one two: two
    Pic1 ← one.
    Pic2 ← two

sfBlock
    ↑SFBlock

showReport
    Cursor normal show.
    Sensor waitButton.
    Sensor waitNoButton.
    Report openAs: 'Repair Summary'

tlBlock
    ↑TLBlock

twcBlock
    ↑TWCBlock

vdfBlock
    ↑VDFBlock


RuleBase class methodsFor: 'grabbing the rule base'

look
    "RuleBase frontPanel inspect"

RuleBase initialize

Object subclass: #GeneralWave
    instanceVariableNames: 'scale amplitude phase hertz type '
    classVariableNames: ''
    poolDictionaries: ''
    category: 'Diagnostics-Waveforms'


GeneralWave methodsFor: 'As yet unclassified'

amplitude: x
    amplitude ← x


draw
    | window |
    window ← Form new.
    window extent: 500@230.
    window white.
```

```
    (self formWave) displayOn: window at: 120@105.
    Scope type: type amplitude: amplitude hertz: hertz scale: scale on: window.
    ↑window openAs: 'Expected Waveform'

hertz: x
    hertz ← x


phase: x
    phase ← x


scale
    scale ← (hertz log: 10) floor @ (amplitude log: 10) ceiling

scale: x
    scale ← x

type: x
    type ← x
"- - - - - - - - - - - - - - - - - - -"

GeneralWave class
    instanceVariableNames: ''


GeneralWave class methodsFor: 'As yet unclassified'

type: xtype amplitude: size hertz: cycles
    | wave curve t1 density it|
    it ← self new.
    it type: xtype.
    it amplitude: size.
    it phase: 0.
    it hertz: cycles.
    it scale.
    ↑it draw

    "TriangleWave type: #voltage amplitude: 500 hertz: 843"

GeneralWave subclass: #CamelWave
    instanceVariableNames: ''
    classVariableNames: ''
    poolDictionaries: ''
    category: 'Diagnostics-Waveforms'


CamelWave methodsFor: 'messages'

formWave
    | wave curve t1 density |
    wave ← Form new.
    wave extent: 4 @ 4.
    wave gray.
    curve ← Spline new.
    curve form: wave.
    (hertz // (10 raisedToInteger: scale x) < 10 ) | (hertz // (10 raisedToInteger: scale x) = 10)
        ifTrue: [density ← 2]
        ifFalse: [density ← 10].
  0
```

```
    to: 360
    by: density
    do:
        [:i |
        t1 ← (((i * (hertz / (10 raisedToInteger: scale x))) asFloat degreesToRadians sin) abs *
(((amplitude // (10 raisedToInteger: ((scale y) - 2))) floor))).
        curve add: i @ t1].
  ↑curve computeCurve
```

```
GeneralWave subclass: #DC
  instanceVariableNames: ''
  classVariableNames: ''
  poolDictionaries: ''
  category: 'Diagnostics-Waveforms'
```

*DC methodsFor: 'As yet unclassified'* formWave

```
  | wave start end |
  wave ← Form new.
  wave extent: 4 @ 4.
  wave gray.
  start ← 0 @ ((amplitude / (10 raisedToInteger: scale y) asFloat) * 100) asInteger.
  end ← 360@ ((amplitude / (10 raisedToInteger: scale y) asFloat) * 100) asInteger.
  ↑(Line
        from: start
        to: end
        withForm: wave)
```

```
Object subclass: #Scope
  instanceVariableNames: ''
  classVariableNames: 'Screen '
  poolDictionaries: ''
  category: 'Diagnostics-Waveforms'
```

*Scope methodsFor: 'As yet unclassified'* type: type amplitude: amp hertz: hertz scale:scale on: aForm

```
  | label1 label2 label3 label4 label5 label6 label7 label8 xscale yscale window |
  window ← Screen deepCopy.
  type = #voltage
     ifTrue: [label1 ← '     mV' copy.
              label2 ← '-     mV' copy.
              label3 ← '     0 mV' copy.].
  type = #current
     ifTrue: [label1 ← '     mA' copy.
              label2 ← '-     mA' copy.
              label3 ← '     0 mA' copy.].
  type = #power
     ifTrue: [label1 ← '     watts' copy.
              label2 ← '-     watts' copy.
              label3 ← '     0 watts' copy.].
  label4 ← '     1 Second/Division' copy.
  label5 ← 'Maximum: ' copy.
  label6 ← 'Hertz: ' copy.
  label7 ← amp printString asDisplayText.
  label8 ← hertz printString asDisplayText.
```

```
    xscale ← scale x.
    yscale ← scale y.
    label1 replaceFrom: (7 - yscale) to: 7 with: '10000000' startingAt: 1.
    label2 replaceFrom: (7 - yscale) to: 7 with: '10000000' startingAt: 1.
    label4 replaceFrom: (7 - xscale) to: 7 with: '.0000000' startingAt: 1.
    label1 displayOn: window at: (7@9).
    label2 displayOn: window at: (7@195).
    label3 displayOn: window at: (7@100).
    label4 displayOn: window at: (210@205).
    label5 displayOn: window at: (290@9).
    label6 displayOn: window at: (290@25).
    label7 displayOn: window at: (370@9).
    label8 displayOn: window at: (350@25).
    ↑window displayOn: aForm at: 0@0 rule: Form paint
"- - - - - - - - - - - - - - - - - -"

Scope class
    instanceVariableNames: ''
```

*Scope class methodsFor: 'As yet unclassified'*

```
createScreen
    | axis tics|
    axis ← Form new.
    Screen ← Form new.
    axis extent: 4@4.
    Screen extent: 500@230.
    axis black.
    Screen white.
    (Line from: 0@205 to: 0@-205 withForm: axis) displayOn: Screen at: (120@105).
    (Line from: 0@0to: 360@0 withForm: axis) displayOn: Screen at: (120@105).

    (Line from: 0@0 to: 16@0 withForm: axis) displayOn: Screen at: (120@5).
    (Line from: 0@0 to: 16@0 withForm: axis) displayOn: Screen at: (120@205).
0 to: 360 by: 36 do: [ :i|
    (Line from: i@-7 to: i@7 withForm: axis) displayOn: Screen at: (120@105)].
1 to: 9 do: [:i| i = 5
        ifTrue: [tics ← 13]
        ifFalse: [tics ← 7].
    (Line from: 0@0 to: tics@0 withForm: axis) displayOn: Screen at: (120@(105- (i * 10))).
    (Line from: 0@0 to: tics@0 withForm: axis) displayOn: Screen at: (120@(105 + (i * 10))).]

    "Scope createScreen"

screenEdit
    Screen edit

"Scope screenEdit"

type: type amplitude: amplitude hertz: hertz scale: scale on: aForm
    | x |
    x ← Scope new.
    ↑x type: type amplitude: amplitude hertz: hertz scale: scale on: aForm
view
    Screen openAs: 'Test View'
GeneralWave subclass: #SineWave
    instanceVariableNames: ''
    classVariableNames: ''
    poolDictionaries: ''
    category: 'Diagnostics-Waveforms'
```

*SineWave methodsFor: 'As yet unclassified'*

```
formWave
    | wave curve t1 density |
    wave ← Form new.
    wave extent: 4 @ 4.
    wave gray.
    curve ← Spline new.
    curve form: wave.
    (hertz // (10 raisedToInteger: scale x) < 10 ) | (hertz // (10 raisedToInteger: scale x) = 10)
        ifTrue: [density ← 10]
        ifFalse: [density ← 20].
    0
        to: 360
        by: density
        do:
            [:i |
            t1 ← ((i * (hertz / (10 raisedToInteger: scale x))) asFloat degreesToRadians sin *
(((amplitude //  (10 raisedToInteger: ((scale y) - 2))) ceiling))).
            curve add: i @ t1].
    ↑curve computeCurve

GeneralWave subclass: #SquareWave
    instanceVariableNames: ''
    classVariableNames: ''
    poolDictionaries: ''
    category: 'Diagnostics-Waveforms'
```

*SquareWave methodsFor: 'As yet unclassified'*

```
formWave
    | wave curve t1 density density2 start end positive |
    wave ← Form new.
    wave extent: 4 @ 4.
    wave gray.
    curve ← LinearFit new.
    density ← ((hertz // (10 raisedToInteger: scale x)) asFloat * 4) floor.
    density2 ← 720 // density.
    end ← Point new.
    start ← 0@0.
    positive ← 1.
    curve form: wave.
    density2
        to: 360
        by: density2
        do:
            [:i |
            end x: i.
            positive = 1
                ifTrue:
                    [end y: ((amplitude / (10 raisedToInteger: scale y) asFloat) * 100) asInteger.
                    positive ← 0]
                ifFalse:
                    [end y: (((amplitude / (10 raisedToInteger: scale y) asFloat) * 100) asInteger)
                    negated. positive ← 1].
            start y: end y.
            curve add: start.
            curve add: end.
            start ← Point x: (end x) y: (end y).
            end ← Point new].
    ↑curve
```

```
GeneralWave subclass: #TriangleWave
    instanceVariableNames: ''
    classVariableNames: ''
    poolDictionaries: ''
    category: 'Diagnostics-Waveforms'


TriangleWave methodsFor: 'As yet unclassified'

formWave
    | wave curve t1 density density2 start end direction |
    wave ← Form new.
    wave extent: 4 @ 4.
    wave gray.
    curve ← LinearFit new.
    density ← ((hertz // (10 raisedToInteger: scale x)) asFloat * 4) floor.
    density2 ← 360 // density.
    end ← Point new.
    start ← 0@0.
    direction ← 1.
    curve form: wave.
    density2
        to: 360
        by: density2
        do:
            [:i |
            end x: i.
            start y = 0
                ifTrue: [direction = 1
                        ifTrue:
                            [end y: ((amplitude / (10 raisedToInteger: scale y) asFloat) * 100) asInteger.
                            direction ← 0]
                        ifFalse:
                            [end y: (((amplitude / (10 raisedToInteger: scale y) asFloat) * 100) asInteger)
negated.
                            direction ← 1]]
                ifFalse: [end y: 0].
            curve add: end.
            start ← Point x: (end x) y: (end y).
            end ← Point new].
    ↑curve
RuleBase tlBlock addRule: (BasicRule whileConsidering: #(24)
    if: #((Memory recall:is:ask:point: ('N24zerooff' 'true'
        'Is the signal at N24 a triangle wave with a non-zero DC offset?' 24)))
    then: #((Script cr ()) (Script cr ()) (Script
            show: ('the triangle wave comparator has failed, examine that next'))
        ((RuleBase twcBlock) deduce ())
        ((RuleBase tlBlock) stop ()))
    english: 'RULE 3: If the signal at N24 is a triangle wave with a non-zero DC offset , then the triangle
wave comparator has failed, examine that next')
    number: 3.


RuleBase tlBlock addRule: (BasicRule whileConsidering: #(20 24)
    if: #((Memory recall:is:ask:point: ('N20=N24' 'false' 'Is the voltage at N20 equal to that of N24?' (20
24))))
    then: #((Script cr ()) (Script cr ()) (Script show: ('The source follower block has failed, check that
next')) ((RuleBase sfBlock) deduce ())
        ((RuleBase tlBlock) stop ()))
```

```
    english: 'RULE 4: If V(N20) is not equal to V(N24), then the source follower block has failed, check
that next')
    number: 4.


RuleBase tlBlock addRule: (BasicRule whileConsidering: #(19 20 24)
    if: #((Memory recall:is:ask:point: ('N24hi' 'true' 'Is N24 high?' 24))
        (Memory recall:is:ask:point: ('N20hi' 'true' 'Is N20 high?' 19))
        (Memory recall:is:ask:point: ('N19hi' 'true' 'Is N19 high?' 20)))
    then: #((Script cr ()) (Script cr ()) (Script
            show: (' The triangle comparator block has failed, check that next . . .'))
        ((RuleBase twcBlock) deduce ())
        ((RuleBase tlBlock) stop ()))
    english: 'RULE 5: If V(N24) and V(N20) and V(N19) are all high, then the triangle comparator block
has failed, check that next')
    number: 5.


RuleBase tlBlock addRule: (BasicRule whileConsidering: #(19 20 24)
    if: #((Memory recall:is:ask:point: ('N24lo' 'true' 'Is N24 low?' 24))
        (Memory recall:is:ask:point: ('N20lo' 'true' 'Is N20 low?' 20))
        (Memory recall:is:ask:point: ('N19lo' 'true' 'Is N19 low?' 19)))
    then: #((Script cr ()) (Script cr ()) (Script
            show: (' The triangle comparator block has failed, check that next . . .'))
        ((RuleBase twcBlock) deduce ())
        ((RuleBase tlBlock) stop ()))
    english: 'RULE 6: If V(N24) and V(N20) and V(N19) are all low, then the triangle comparator block
has failed, check that next')
    number: 6.

RuleBase tlBlock addRule: (BasicRule whileConsidering: #(3 4)
    if: #((Memory recall:is:ask:point: ('N4=N3' 'false' 'Does the voltage at N4 equal that of N3' (3 4))))
    then: #((Script cr ()) (Script cr ()) (Script show: ('The dial voltage follower block has failed . . .
checking . . .'))
        ((RuleBase vdfBlock) deduce ())
        ((RuleBase tlBlock) stop ()))
    english: 'RULE 9: If the voltage at N4 does not equal the voltage of N3, then the dial voltage follower
block has failed')
    number: 9.

RuleBase tlBlock addRule: (BasicRule whileConsidering: #(3 4)
    if: #((Memory unknown: ('dvf')) (Memory recall:is:ask:point: ('N4=N3' 'true' 'Does the voltage at N4
equal that of N3' (3 4))))
    then: #((Script cr ()) (Script cr ()) (Script show: ('The dial voltage follower block is ok'))
            (Memory remember:is: ('dvf' 'ok')))
    english: 'RULE 10: If the voltage at N4 does equal the voltage of N3, then the dial voltage follower
block is ok')
    number: 10.
RuleBase tlBlock addRule: (BasicRule whileConsidering: #(8 14)
    if: #((Memory recall:is:ask:point: ('N8=-N4+17' 'false' 'Does the voltage at N8 equal the negative of
N4 plus 17?' (8 14))))
    then: #((Script cr ()) (Script cr ()) (Script
            show: (' The summing amplifier block has failed, check that next . . .'))
        ((RuleBase saBlock) deduce ())
        ((RuleBase tlBlock) stop ()))
    english: 'RULE 11: If the voltage at N8 does not equal the negative voltage at N4 plus 17, then the
dial voltage follower has failed.')
    number: 11.
```

```
RuleBase tlBlock addRule: (BasicRule whileConsidering: #(8 14)
    if: #((Memory unknown: ('sa'))
        (Memory recall:is:ask:point: ('N8=-N4+17' 'true' 'Does the voltage at N8 equal the negative of N4
plus 17?' (8 14))))
    then: #((Script cr ()) (Script cr ()) (Script show: ('The summing amplifier block is ok'))
            (Memory remember:is: ('sa' 'ok')))
    english: 'RULE 12: If the voltage at N8 does equal the negative voltage at N4 plus 17, then the
summing amplifier has failed.')
    number: 12.

RuleBase tlBlock addRule: (BasicRule whileConsidering: #(8 12)
    if: #((Memory recall:is:ask:point: ('N12=-N8' 'false' 'Does the voltage of N12 equal the negative of
N8?' (8 12))))
    then: #((Script cr ()) (Script cr ()) (Script
            show: (' The inverting amplifier block has failed, check that next . . .'))
        ((RuleBase inaBlock) deduce ())
        ((RuleBase tlBlock) stop ()))
    english: 'RULE 13: If the voltage of N12 does not equal the negative of N8, then the inverting
amplifier has failed.')
    number: 13.


RuleBase tlBlock addRule: (BasicRule whileConsidering: #(8 12)
    if: #((Memory unknown: ('ia')) (Memory recall:is:ask:point: ('N12=-N8' 'true' 'Does the voltage of
N12 equal the negative of N8?' (8 12))))
    then: #((Script cr ()) (Script cr ()) (Script
            show: (' The inverting amplifier block is ok'))
            (Memory remember:is: ('ia' 'ok')))
    english: 'RULE 14: If the voltage of N12 does equal the negative of N8, then the inverting amplifier is
ok.')
    number: 14.

RuleBase tlBlock addRule: (BasicRule whileConsidering: #()
    if: #((Memory recall:is:ask:point: ('dvf' 'ok' 'Is the dial voltage follower block known to be ok?' ()))
        (Memory recall:is:ask:point: ('sa' 'ok' 'Is the summing amplifier block known to be ok?' ()))
        (Memory recall:is:ask:point: ('ia' 'ok' 'Is the inverting amplifier block known to be ok?' ())))
    then: #((Script cr ()) (Script cr ()) (Script
            show: (' The triangle wave current source block has failed, check that next . . .'))
        ((RuleBase twcBlock) deduce ())
        ((RuleBase tlBlock) stop ()))
    english: 'RULE 15: If the dial voltage follower block is ok and the summing amplifier block is ok and
the inverting amplifier block is ok , then the triangle wave current source block is failed. ')
    number: 15.


RuleBase sfBlock addRule: (BasicRule whileConsidering: #(20 21)
    if: #((Memory recall:is:ask:point: ('N21=N20' 'true' 'Does the voltage of N21 equal N20?' (20 21)))
        (Memory unknown: ('Q202')))
    then: #((Memory remember:is: ('Q200' 'good')) (Memory remember:is: ('Q202' 'good')))
    english: 'RULE 101: If voltage at N21 equals voltage at N20 , then Q200 and Q202 are good')
    number: 101.

RuleBase sfBlock addRule: (BasicRule whileConsidering: #(20 21)
    if: #((Memory recall:is:ask:point: ('N21dc' 'true' 'Is N21 DC?' 21))
        (Memory unknown: ('Q204'))
        (Memory recall:is:ask:point: ('N20dc' 'true' 'Is N20 DC?' 20)))
    then: #((Script cr ()) (Script cr ()) (Script show: ('Remove Q204 and measure the voltage at N21 and
N20'))
```

```
"q204" ((InstrumentDataView fg502SchematicView) specialPointingTo: ((872@302)))
        (Memory remember:is: ('Q204' 'removed')))
    english: 'RULE 106b: If if voltage at N21 and at N20 is DC, then remove Q204 and measure voltage at N21 and N20')
    number: 1061.

RuleBase sfBlock addRule: (BasicRule whileConsidering: #(20 21)
    if: #(
"q204" ((InstrumentDataView fg502SchematicView) specialPointingTo: ((872@302)))
        (Memory recall:is:ask:point: ('N21=N20a' 'true' 'Does the voltage of N21 equal N20 when Q204 is removed?' (20 21))))
    then: #((Script cr ()) (Script cr ()) (Script show: ('Q204 is malfunctioning - replace'))
"q204" ((InstrumentDataView fg502SchematicView) specialPointingTo: ((872@302)))
((RuleBase sfBlock) stop ()))
    english: 'RULE 108: If voltage at N20 equals voltage at N21 and Q204 has been removed, then replace Q204')
    number: 108.

RuleBase sfBlock addRule: (BasicRule whileConsidering: #(20 21)
    if: #((Memory unknown: ('Q204')) (Memory recall:is:ask:point: ('N21=N20a' 'false' 'Does the voltage of N21 equal N20 when Q204 is removed?' (20 21))))
    then: #((Script cr ()) (Script cr ()) (Script show: ('Q204 is OK put it back'))
"q204" ((InstrumentDataView fg502SchematicView) specialPointingTo: ((872@302)))
 (Memory remember:is: ('Q204' 'good')))
    english: 'RULE 108b: If voltage at N20 does not equal the voltage at N21 and Q204 has been removed, then Q204 is good')
    number: 1081.

RuleBase sfBlock addRule: (BasicRule whileConsidering: #(20 21)
    if: #((Memory recall:is:ask:point: ('N21<<N20' 'true' 'Is N21 less than N20?' (20 21)))
        )
    then: #((Script cr ()) (Script cr ()) (Script show: ('Either Q200 is shorted or Q202 is open - replace both components'))
"q202" ((InstrumentDataView fg502SchematicView) specialPointingTo: ((794@314)))
"q200" ((InstrumentDataView fg502SchematicView) specialPointingTo: ((797@256)))
        ((RuleBase sfBlock) stop ()))
    english: 'RULE 106: If voltage at N21 is much less than the voltage at N20, then Q202 is shorted or Q200 is open - replace both Q200 and Q202')
    number: 106.

RuleBase sfBlock addRule: (BasicRule whileConsidering: #(20 21)
    if: #((Memory recall:is:ask:point: ('N21>>N20' 'true' 'Is N21 greater than N20?' (20 21))))
    then: #((Script cr ()) (Script cr ()) (Script show: ('Either Q200 is open or Q202 is shorted - replace both components'))
"q202" ((InstrumentDataView fg502SchematicView) specialPointingTo: ((794@314)))
"q200" ((InstrumentDataView fg502SchematicView) specialPointingTo: ((797@256)))
        ((RuleBase sfBlock) stop ()))
    english: 'RULE 107: If voltage at N21 is much greater than the voltage at N20, then Q200 is shorted or Q202 is open - replace both Q200 and Q202')
    number: 1076.

RuleBase sfBlock addRule: (BasicRule whileConsidering: #(22 21)
    if: #((Memory recall:is:ask:point: ('N22<N21by.7' 'false' 'Is the voltage of N22 0.7v less than N21?' (22 21)))
        (Memory unknown: ('Q210')))
    then: #((Script cr ()) (Script cr ()) (Script show: ('Remove Q210')) (Memory remember:is: ('Q210' 'removed')))
    english: 'RULE 110b: If Voltage at N22 is not .7V less than Voltage at N21, then remove Q210 and remeasure')
    number: 1101.
```

```
RuleBase sfBlock addRule: (BasicRule whileConsidering: #(22 21)
    if: #((Memory recall:is:ask:point: ('N22<N21by.7' 'true'
            'Is the voltage of N22 0.7v less than N21 when Q210 is removed?' (22 21))))
    then: #((Script cr ()) (Script cr ()) (Script show: ('Q210 is malfunctioning - replace'))
"q210" ((InstrumentDataView fg502SchematicView) specialPointingTo: ((952@277)))
 ((RuleBase sfBlock) stop ()))
    english: 'RULE 110: If Voltage at N22 is .7V less than Voltage at N21 and Q210 has been removed,
then Q210 has failed - replace')
    number: 110.

RuleBase sfBlock addRule: (BasicRule whileConsidering: #(21 22)
    if: #((Memory recall:is:ask:point: ('N22<N21by.7' 'false'
            'Is the voltage of N22 0.7v less than N21 when Q210 is removed?' (21 22))))
    then: #((Script cr ()) (Script cr ()) (Script show: ('Q204 is malfunctioning - replace'))
"q204" ((InstrumentDataView fg502SchematicView) specialPointingTo: ((872@302)))
 ((RuleBase sfBlock) stop ()))
    english: 'RULE 111: If Voltage at N22 is not .7V less than Voltage at N21 and Q210 has been removed,
then Q204 has failed - replace')
     number: 111.


RuleBase sfBlock addRule: (BasicRule whileConsidering: #(21 22)
    if: #((Memory recall:is:ask:point: ('N22=0' 'true' 'Does N22 equal 0v?' 22))
        (Memory recall:is:ask:point: ('N21=-.7' 'false' 'Does N21 equal -0.7v?' 21)))
    then: #((Script cr ()) (Script cr ()) (Script show: ('diode CR204 is shorted - replace'))
"cr204"((InstrumentDataView fg502SchematicView) specialPointingTo: (( 914@309))) ((RuleBase sfBlock)
stop ()))
    english: 'RULE 112: If Voltage at N22 is 0V and Voltage at N21 is not at -0.7v, then diode CR204 is
shorted - replace')
    number: 112.
RuleBase csBlock addRule: (BasicRule whileConsidering: #(19)
if: #((Memory recall:is:ask:point: ('V(N19)=17' 'true' 'Does N19 equal 17v?' 19)))
pass:#((Memory remember:is: ('V(N19)' 'high')))
english: 'RULE 201: If V(N19) is 17v, then V(N19) is high')
number: 201.

RuleBase csBlock addRule: (BasicRule whileConsidering: #(20)
if: #((Memory recall:is:ask:point: ('V(N20)=17' 'true' 'Does N20 equal 17v?' 20)))
pass:#((Memory remember:is: ('V(N20)' 'high')))
english: 'RULE 201b: If V(N20) is 17v, then V(N20) is high')
number: 2011.

RuleBase csBlock addRule: (BasicRule whileConsidering: #(19)
if: #((Memory recall:is:ask:point: ('V(N19)=17' 'false' 'Does N19 equal 17v?' 19)))
pass:#((Memory remember:is: ('V(N19)' 'low')))
english: 'RULE 202: If V(N19) is not 17v, then V(N19) is low')
number: 202.

RuleBase csBlock addRule: (BasicRule whileConsidering: #(20)
if: #((Memory recall:is:ask:point: ('V(N20)=17' 'false' 'Does N20 equal 17v?' 20)))
pass:#((Memory remember:is: ('V(N20)' 'low')))
english: 'RULE 202b: If V(N20) is not 17v, then V(N20) is low')
number: 2021.

RuleBase csBlock addRule: (BasicRule whileConsidering: #(24)
if: #((Memory recall:is:ask:point: ('V(N24)rsymetric' 'false' 'Does the voltage at N24 show a left time-
assymetric ramp?' 24)))
pass:#((Script cr ()) (Script cr ()) (Script show: ('either CR140 is shorted or CR145 is open,  replace both'))
"cr140" ((InstrumentDataView fg502SchematicView) specialPointingTo: ((499@243)))
```

"cr145" ((InstrumentDataView fg502SchematicView) specialPointingTo: ((522@244))) ((RuleBase csBlock) stop ()))
english: 'RULE 205: If V(N24) shows a left time-assymetric ramp, then either CR140 is shorted or CR145 is open, replace both')
number: 205.

RuleBase csBlock addRule: (BasicRule whileConsidering: #(24)
if: #((Memory recall:is:ask:point: ('V(N24)lsymetric' 'false' 'Does the voltage at N24 show a right time-assymetric ramp?' 24)))
pass:#((Script cr ()) (Script cr ()) (Script show: ('either CR175 is shorted or CR170 is open, replace both'))
"cr175" ((InstrumentDataView fg502SchematicView) specialPointingTo: ((527@275)))
"cr170"((InstrumentDataView fg502SchematicView) specialPointingTo: ((495@268)))
((RuleBase csBlock) stop ()))
english: 'RULE 207: If V(N24) shows a right time-assymetric ramp, then either CR175 is shorted or CR170 is open, replace both')
number: 207.

RuleBase csBlock addRule: (BasicRule whileConsidering: #(24)
if: #((Memory recall:is:ask:point: ('V(N24)lhybrid' 'false' 'Does the voltage at N24 show a right hybrid wave?' 24)))
pass:#((Script cr ()) (Script cr ()) (Script show: ('CR140 is shorted, replace'))
"cr140" ((InstrumentDataView fg502SchematicView) specialPointingTo: ((499@243)))
((RuleBase csBlock) stop ()))
english: 'RULE 209: If V(N24) shows a right hybrid wave, then CR140 is shorted, replace')
number: 209.

RuleBase csBlock addRule: (BasicRule whileConsidering: #(24)
if: #((Memory recall:is:ask:point: ('V(N24)rhybrid' 'false' 'Does the voltage at N24 show a left hybrid wave?' 24)))
pass:# ((Script cr ()) (Script cr ()) (Script show: ('CR170 is shorted, replace'))
"cr170"((InstrumentDataView fg502SchematicView) specialPointingTo: ((495@268)))
((RuleBase csBlock) stop ()))
english: 'RULE 210: If V(N24) shows a left hybrid wave, then CR170 is shorted, replace')
number: 210.

RuleBase csBlock addRule: (BasicRule whileConsidering: #(24)
if: #((Memory recall:is:ask:point: ('V(N24)' 'low' 'Is the voltage of N24 low?' 24)))
pass:#((Script cr ()) (Script cr ()) (Script show: ('CR175 or CR145 is open, replace both'))
"cr145"((InstrumentDataView fg502SchematicView) specialPointingTo: ((522@244)))
"cr175"((InstrumentDataView fg502SchematicView) specialPointingTo: ((527@275)))
((RuleBase csBlock) stop ()))
english: 'RULE 211: If V(N24) is low, then CR175 or CR145 is open, replace both')
number: 211.

RuleBase pcsBlock addRule: (BasicRule whileConsidering: #(8)
if: #((Memory recall:is:ask:point: ('V(N8)range' 'false' 'Is N8 in the range between +7v and +17v?' 8)))
pass: #((Script cr ()) (Script cr ()) (Script show: ('Either the summing amplifier or the dial voltage follower has failed')) (Memory remember:is: ('SAB' 'potential')) (Memory remember:is: ('DVFB' 'potential'))
((RuleBase pcsBlock) stop ()))
english: 'RULE 301: If V(N8) is not in the range of +7v to +17v, then the summing amplifier or the dial voltage follower has failed')
number: 301.

RuleBase pcsBlock addRule: (BasicRule whileConsidering: #(8)

```
if: #((Memory recall:is:ask:point: ('V(N8)range' 'true' 'Is N8 in the range between +7v and +17v?'))
(Memory recall:is:ask:point: ('N8=N14' 'true' 'Does the voltage at N8 equal N14?' 8)))
pass: #((Script cr ()) (Script cr ()) (Script show: ('CR145 is open, replace'))
"cr145" ((InstrumentDataView fg502SchematicView) specialPointingTo: (( 522@244)))
 ((RuleBase pcsBlock) stop ()))
english: 'RULE 302: If V(N8) is not in the range of +7v to +17v and V(N8) equals V(N14), then CR145 is
open, replace')
number: 302.
RuleBase pcsBlock addRule: (BasicRule whileConsidering: #(8 13 14)
if: #((Memory recall:is:ask:point: ('V(N8)range' 'true' 'Is N8 in the range between +7v and +17v?' 8))
(Memory recall:is:ask:point: ('N8>N14' 'true' 'Does the voltage at N8 equal N14?' 14)) ((Memory
recall:is:ask:point: ('N13posrail' 'true' 'Is N13 at the postive rail?' 13))))
pass: #((Script cr ()) (Script cr ()) (Script show: ('Q140 has failed, replace'))
"q140" ((InstrumentDataView fg502SchematicView) specialPointingTo: (( 500@166)))
((RuleBase pcsBlock) stop ()))
english: 'RULE 303: If V(N8) is not in the range of +7v to +17v and V(N8) is greater than V(N14) and
V(N13) is at the positive rail, then Q140 has failed, replace')
number: 303.


RuleBase pcsBlock addRule: (BasicRule whileConsidering: #(8 13 14)
if: #((Memory recall:is:ask:point: ('V(N8)range' 'true' 'Is N8 in the range between +7v and +17v?' 8))
(Memory recall:is:ask:point: ('N8>N14' 'false' 'Is the voltage of N8 greater than N14?' 14)) (Memory
recall:is:ask:point: ('N13negrail' 'true' 'Is N13 at the negative rail?' 13)))
pass: #((Script cr ()) (Script cr ()) (Script show: ('Q140 has failed, replace'))
"u140" ((InstrumentDataView fg502SchematicView) specialPointingTo: (( 453@165)))
((RuleBase pcsBlock) stop ()))
english: 'RULE 304: If V(N8) is not in the range of +7v to +17v and V(N8) is less than V(N14) and
V(N13) is at the negative rail, then U140 has failed, replace')
number: 304.
Object subclass: #BasicRule
    instanceVariableNames: 'if pass fail whileConsidering english componentFailed '
    classVariableNames: ''
    poolDictionaries: ''
    category: 'Diagnostics-Knowledge'
```

*BasicRule methodsFor: 'rule creation'* component: comp whileConsidering: block1 if: block2 pass: block3 fail: block4 english: aString

```
 "I create the rule variables and values."

    whileConsidering ← block1.
    if ← block2.
    pass ← block3.
    fail ← block4.
    english ← aString.
    componentFailed ← comp
```

whileConsidering: block1 if: block2 pass: block3 fail: block4 english: aString

```
 "I create the rule variables and values."

    whileConsidering ← block1.
    if ← block2.
    pass ← block3.
    fail ← block4.
    english ← aString
```

*BasicRule methodsFor: 'rule use'*

```
componentFailed
    ↑componentFailed

english
    ↑english

fail

    ↑fail

forget: t1
    (Undeclared at: #discoveredFacts)
        remove: t1

if
    ↑if

ifValue
    | t1 t2 |
    "whileConsidering do:
        [:t2 |
        InstrumentDataView fg502 model probeOnBoard: (InstrumentDataView fg502 model
boardTestPoints at: t2)
            onSchematic: (InstrumentDataView fg502 model schematicTestPoints at: t2).
        t2 = whileConsidering last ifFalse: [BinaryChoice
                message: 'Place a probe where indicated -
  this is location: ' , t2 printString
                displayAt: Sensor cursorPoint
                centered: true
                ifTrue: []
                ifFalse: []]]."
    1 to: self if size do:
        [:t2 |
        t1 ← self if at: t2.
        ((((t1 at: 1)
            isKindOf: Array)
            ifTrue: [(Smalltalk at: ((t1 at: 1)
                    at: 1))
                perform: ((t1 at: 1)
                    at: 2)]
            ifFalse: [Smalltalk at: (t1 at: 1)])
            perform: (t1 at: 2)
            withArguments: (t1 at: 3))
            ifFalse: [↑false]].
    ↑true

pass

    ↑pass

passValue
    self value: self pass

recall: t1
    (Undeclared at: #discoveredFacts)
        includes: t1

release
    self if release.
```

```
    self pass release.
    self fail release.
    self whileConsidering release

remember: t1
    (Undeclared at: #discoveredFacts)
        add: t1

value: array
    | temp |
    1 to: (array size) do: [ :i |
        temp ← array at: i.
        ((((temp at: 1) isKindOf: Array)
                ifFalse:[Smalltalk at: (temp at: 1)]
                ifTrue:[(Smalltalk at: ((temp at: 1) at: 1)) perform: ((temp at: 1) at: 2)])
            perform: (temp at: 2)
            withArguments: (temp at: 3))]
whileConsidering
    ↑whileConsidering
"- - - - - - - - - - - - - - - - - - "

BasicRule class
    instanceVariableNames: ''


BasicRule class methodsFor: 'instance creation'

component: comp whileConsidering: aBlock4 if: aBlock1 pass: aBlock2  english: aString
    | newRule |
    newRule ← super new.
    ↑newRule  component: comp
                whileConsidering: aBlock4
                if: aBlock1
                pass: aBlock2
                fail: []
                english: aString

forget: thing
    (Undeclared at: #discoveredFacts) remove: thing.

if: aBlock1 pass: aBlock2 fail: aBlock3
    | newRule |
    newRule ← super new.
    ↑newRule whileConsidering: [nil]
                if: aBlock1
                pass: aBlock2
                fail: aBlock3
                english: nil

if: aBlock1 pass: aBlock2 fail: aBlock3 english: aString
    | newRule |
    newRule ← super new.
    ↑newRule whileConsidering: [nil]
                if: aBlock1
                pass: aBlock2
                fail: aBlock3
                english: aString

if: aBlock1 then: aBlock2
    | newRule |
```

```
    newRule ← super new.
    ↑newRule whileConsidering: [nil]
            if: aBlock1
            pass: aBlock2
            fail: [nil]
            english: ''
```

if: aBlock1 then: aBlock2 english: aString

```
    | newRule |
    newRule ← super new.
    ↑newRule whileConsidering: [nil]
            if: aBlock1
            pass: aBlock2
            fail: aString
```

recall: t1

```
    (Undeclared at: #discoveredFacts)
        includes: t1
```

remember: t1

```
    (Undeclared at: #discoveredFacts)
        add: t1
```

whileConsidering: aBlock4 if: aBlock1 pass: aBlock2 english: aString

```
    | newRule |
    newRule ← super new.
    ↑newRule whileConsidering: aBlock4
            if: aBlock1
            pass: aBlock2
            fail: []
            english: aString
```

whileConsidering: aBlock4 if: aBlock1 pass: aBlock2 fail: aBlock3 english: aString

```
    | newRule |
    newRule ← super new.
    ↑newRule whileConsidering: aBlock4
            if: aBlock1
            pass: aBlock2
            fail: aBlock3
            english: aString
```

whileConsidering: aBlock4 if: aBlock1 then: aBlock2 english: aString

```
    | newRule |
    newRule ← super new.
    ↑newRule whileConsidering: aBlock4
            if: aBlock1
            pass: aBlock2
            fail: []
            english: aString
```

APPENDIX E

```
miniGlibGrammar
        "Equation symbols:
                '^' parent, '@' self, '$' value of self,
                '_' anon var, '<...>' string, ';' equation seperator"

<glib statement> ->
        <value predicate> [^=@] .
<glib statement> ->
        <structural description> [^=@] .
<glib statement> ->
```

```
        IF <diagnostic condition> [^ arg1 •]
        THEN <functional context> [^ arg2 •;
                                   ^ form <rule(^ arg1, ^ arg2, _)>] .
<glib statement> ->
        IF <diagnostic condition> [^ arg1 •]
        WHEN <structural context> [^ arg3 •]
        THEN <functional context> [^ arg2 •;
                                   ^ form <rule(^ arg1, ^ arg2, ^ arg3)>] .

<diagnostic condition> ->
        <atomic diagnostic condition> [^=•]
<diagnostic condition> ->
        <atomic diagnostic condition> [^ arg1 •]
        AND <diagnostic condition> [^ arg2 •; ^ form <and(^ arg1, ^ arg2)>]

<atomic diagnostic condition> ->
        <value predicate> [^=•]
<atomic diagnostic condition> ->
        <functional context> [^=•]

<functional context> ->
        <atomic functional context> [^=•]
<functional context> ->
        <atomic functional context> [^ arg1 •]
        AND <functional context> [^ arg2 •; ^ form <and(^ arg1, ^ arg2)>]
<functional context> ->
        <atomic functional context> [^ arg1 •]
        OR <functional context> [^ arg2 •; ^ form <or(^ arg1, ^ arg2)>]

<atomic functional context> ->
        <device> [^ dev •] HAS FAILED [^ form <status(component(^ dev), failed)>]
<atomic functional context> ->
        <device> [^ dev •] IS OK [^ form <status(component(^ dev), ok)>]
<atomic functional context> ->
        <substructure> [^ dev •] HAS FAILED [^ form <status(block(^ dev), failed)>]
<atomic functional context> ->
        <substructure> [^ dev •] IS OK [^ form <status(block(^ dev), ok)>]

<structural context> ->
        <atomic structural context> [^=•]
<structural context> ->
        <atomic structural context> [^ arg1 •]
        AND <structural context> [^ arg2 •; ^ form <and(^ arg1, ^ arg2)>]

<atomic structural context> ->
        <device> [^ dev •] IS REMOVED [^ form <removed(^ dev)>]

<structural description> ->
        THE CIRCUIT CONTAINS <compound structural object>
        [^ dev •; ^ action defcomp; ^ form <hasComponent(block(circuit), ^ arg2)>]
<structural description> ->
        <structural object> [^ arg1 •]
        CONTAINS <compound structural object>
        [^ dev •; ^ action defcomp; ^ form <hasComponent(^ arg1, ^ arg2)>]
<structural description> ->
        <structural object> [^ arg2 •]
        IS A PART OF <structural object>
        [^ arg1 •; ^ form <hasComponent(^ arg1, ^ arg2)>]
<structural description> ->
        <structural object> [^ arg2 •]
        IS A PART OF THE CIRCUIT
        [^ form <hasComponent(block(circuit), ^ arg2)>]

<compound structural object> ->
        <structural object> [^=•]
<compound structural object> ->
        <structural object> [^ arg1 •]
        AND <compound structural object> [^ arg2 •; ^ action defcomp]

<structural object> ->
        <substructure> [^ dev •; ^ form <block(^ dev)>]
<structural object> ->
        <device> [^ dev •; ^ form <block(^ dev)>]

<value predicate> ->
        <signal> [^ sig •]
        HAS <signal property> [^=•]
        OF <value expression> [^ val •; ^ action sigprop]
<value predicate> ->
        <signal> [^ sig •]
        IS <boolean signal property> [^ prop amp; ^ val •; ^ action sigprop]
<value predicate> ->
        <signal> [^ sig •]
        IS <signal description> [^=•; ^ form <form(^ sig, ^ desc)>]
```

```
<value predicate> ->
        <object reference> [^ arg1 •]
        IS <value expression> [^ arg2 •; ^ form <value(^ arg1, ^ arg2)>]
<value predicate> ->
        <value expression> [^ arg1 •]
        IS <value expression> [^ arg2 •; ^ form <value(^ arg1, ^ arg2)>]
<value predicate> ->
        <value expression> [^ arg1 •]
        <comparator> [^=•]
        <value expression> [^ arg2 •; ^ form <comp(^ op, ^ arg1, ^ arg2)>]

<signal description> ->
        <simple signal description> [^=•]
<signal description> ->
        <simple signal description> [^=•]
        <signal operation> [^=•]
        <signal description> [^ arg2 •; ^ form <^ op(^ desc, ^ arg2)>]

<simple signal description> ->
        <det-a> <signal class> [^ action sigdesc]
<simple signal description> ->
        <det-a> <signal class>
        WITH <signal property list> [^=•; ^ action sigdesc]

<signal property list> ->
        <signal property expression> [^=•]
<signal property list> ->
        <signal property expression> [^=•]
        AND <signal property list> [^ list •]

<signal property expression> ->
        <signal property> [^=•] OF <value expression> [^ (^ prop) •]

<value expression> ->
        <atomic value reference> [^=•]
<value expression> ->
        <compound value reference> [^=•]

<compound value reference> ->
        ( <value expression> [^=•] )
<compound value reference> ->
        <monadic operator> <value expression> [^ val •; ^ form <^ op(^ val)>]
<compound value reference> ->
        <value expression> [^ arg1 •]
        <dyadic operator> [^=•]
        <value expression> [^ arg2 •; ^ form <^ op(^ arg1, ^ arg2)>]

<atomic value reference> ->
        <intensional value reference> [^=•]
<atomic value reference> ->
        <intensional value reference> [^=•]
        IN <measure> [^ unit •; ^ action checkunit]
<atomic value reference> ->
        <constant> [^=•]

<intensional value reference> ->
        <voltage value reference> [^=•]
<intensional value reference> ->
        <current value reference> [^=•]
<intensional value reference> ->
        <generic value reference> [^=•]

<voltage value reference> ->
        THE VOLTAGE ACROSS <node> [^ arg1 •]
        AND <node> [^ arg2 •; ^ form <voltage(^ arg1, ^ arg2)>]
<voltage value reference> ->
        THE <terminal> [^ term1 •]
        <terminal> [^ term2 •]
        VOLTAGE OF <device>
        [^ dev •; ^ action defnode; ^ form <voltage(^ arg1, ^ arg2)>]

<current value reference> ->

        THE CURRENT THROUGH <node> [^ arg1 •; ^ form <current(^ arg1)>]
<current value reference> ->
        THE <terminal> [^ term1 •]
        CURRENT OF <device>
        [^ dev •; ^ action defnode; ^ form <current(^ arg1)>]

<generic value reference> ->
        <object reference> [^ arg1 •]
        <property> [^ op •; ^ form <^ op(^ arg1)>]
<generic value reference> ->
        THE <property> [^ op •]
        OF <argument> [^ arg1 •; ^ form <^ op(^ arg1)>]
```

```
<generic value reference> ->
        THE <property>
        OF <generic value ref aux1> <argument> [^ action notimpl]
<generic value reference> ->
        <property> ( <argument> ) [^ action notimpl]
<generic value reference> ->
        <property> ( <generic value ref aux2> <argument> ) [^ action notimpl]

<generic value ref aux1> ->
        <argument> AND [^ action notimpl]
<generic value ref aux1> ->
        <argument> AND <generic value ref aux1> [^ action notimpl]

<generic value ref aux2> ->
        <argument> , [^ action notimpl]
<generic value ref aux2> ->
        <argument> , <generic value ref aux2> [^ action notimpl]

<argument> ->
        <object reference> [^=@]
<argument> ->
        <atomic value reference> [^ action notimpl]

<object reference> ->
        <signal> [^=@]
<object reference> ->
        <device> [^=@]
<object reference> ->
        <path> [^=@]
<object reference> ->
        <node> [^=@]
<object reference> ->
        <substructure> [^=@]

<signal> ->
        <n-signal> <unsigned integer> [^ num $; ^ form <signal(^ num)>]
<device> ->
        <device type> [^ dev @]
        <unsigned integer> [^ num @; ^ form <^ dev(^ num)>]
<path> ->
        <n-path> <unsigned integer> [^ num $; ^ form <path(^ num)>]
<path> ->
        FROM <node> [^ node1 @]
        TO <node> [^ node2 @; ^ action defpath]
<path> ->
        BETWEEN <node> [^ node1 @]
        AND <node> [^ node2 @; ^ action defpath]
<path> ->
        THE PATH FROM <node> [^ node1 @]
        TO <node> [^ node2 @; ^ action defpath]
<path> ->
        THE PATH BETWEEN <node> [^ node1 @]
        AND <node> [^ node2 @; ^ action defpath]

<node> ->
        NODE <unsigned integer> [^ num $; ^ form <node(^ num)>]
<node> ->
        THE <terminal> [^ term1 @]
        OF <device> [^ dev @; ^ action defnode]

<substructure> ->
        <substructure type> [^=@]
        <unsigned integer> [^ num $; ^ form <^ dev(^ num)>]

<property> ->
        <signal property> [^ form <^ prop>]
<property> ->
        <scalar property> [^=@]

<constant> ->
        <boolean constant> [^=@]
<constant> ->
        <literal constant> [^=@]
<constant> ->
        <real-number> [^ form $]
<constant> ->
        <real-number> [^ val $] <measure> [^=@]
<constant> ->
        <integer> [^ form $]
<constant> ->
        <integer> [^ val $] <measure> [^=@]

<measure> ->
        <atomic measure> [^ unit @; ^ mul 1; ^ action checkunit]
```

```
<measure> ->
        <measure prefix> [^=●]
        <atomic measure> [^ unit ●: ^ action checkunit]

<real-number> ->
        <integer> [^=●]
        . <unsigned integer> [^ frac ●]
<real-number> ->
        <integer> [^=●]
        . <unsigned integer> [^ frac ●]
        <exp-e> <integer> [^ exp ●]

<integer> ->
        <unsigned integer> [^ int $]
<integer> ->
        <sign> [^ sign ●] <unsigned integer> [^ int ●]
```

APPENDIX F

MINI-GLIB ONTOLOGY

```
N represents an unsigned integer; other capital letters represent numbers

<glib statement> -->
        <diagnostic rule> .
        <structural description> .
        <value predicate> .

<diagnostic rule> -->
        rule(<diagnostic condition>, <functional context>, <structural context>)

<diagnostic condition> -->
        and(<value predicate>, <diagnostic condition>)
        and(<functional context>, <diagnostic condition>)
        <value predicate>
        <functional context>

; disjunctive conclusions are implemented but not used.
<functional context> -->
        status(<functional context list>, failed)
        status(<functional context list>, ok)

<functional context list> -->
        component(<device>)
        block(<substructure>)
        and(component(<device>), <functional context list>)
        and(block(<substructure>), <functional context list>)

<structural context> -->
        removed(<device list>)

<device list> -->
        <device>
        and(device, <device list>)

<structural description> -->
        hascomponent(block(circuit), component(<device>))
        hascomponent(block(circuit), block(<substructure>))
        hascomponent(block(<substructure>), component(<device>))
        hascomponent(block(<substructure>), block(<substructure>))

<value predicate> -->
        form(signal(N),
             signal(waveshape(<signal class>), F, A, P, O))
        value(<object reference>, <value expression>)
        value(<value expression>, <value expression>)
        comp(less, <value expression>, <value expression>)
        comp(lesseq, <value expression>, <value expression>)
        comp(eq, <value expression>, <value expression>)
        comp(neq, <value expression>, <value expression>)
        comp(grtr, <value expression>, <value expression>)
        comp(grtreq, <value expression>, <value expression>)

<value expression> -->
        <value reference>
        invert(<value expression>)
        negate(<value expression>)
        add(<value expression>, <value expression>)
        div(<value expression>, <value expression>)
        mul(<value expression>, <value expression>)
        power(<value expression>, <value expression>)
        sub(<value expression>, <value expression>)
```

```
<value reference> -->
        <constant>
        voltage(node(N), node(N))
        current(node(N))
        <property>(<object reference>)  ; should this be
                                        ; property(<property>,<object>) ?

; object references has to be seperated from constants to break circularity
<object reference> -->
        signal(N)
        path(N)
        node(N)
        <device>
        <substructure>

<device> -->
        transistor(N)
        resistor(N)
        capacitor(N)
        ic(N)
        diode(N)
        led(N)
        rectifier(N)

<substructure> -->
        filter(N)
        powersupply(N)
        oscillator(N)
        block(N)
        ampstage(N)

<property> -->
        amp
        freq
        offs
        phase
        capacitance
        current
        impedance
        power
        resistance
        voltage

<constant> -->
        true
        false
        on
        off
        high
        low
        <number>                ; real, integer, or unsigned
```

APPENDIX G
PARSER AND RULE GENERATOR SOFTWARE

```
Dictionary variableSubclass: #GDict
    instanceVariableNames: ''
    classVariableNames: 'W '
    poolDictionaries: ''
    category: 'Glib-Parser'
```

*GDict methodsFor: 'accessing'* add: category to: word

```
    | c |
    (c ← super at: word ifAbsent: [nil]) isNil
        ifTrue: [self at: word put: category]
        ifFalse:
            [(c isMemberOf: Set)
                ifTrue: [c add: category. super at: word put: c]
                ifFalse: [super at: word put: (Set with: c with: category)]].
```

at: word
```
    "modified at: to return word if no entry"

    | c |
    W ← word.
    c ← super at: word.
    (c isMemberOf: Set) ifTrue: [↑c collect: [:x| x first]].
    ↑Set with: c first
```

equationsAt: aWord inCategory: aCategory
```
    "Return the equations associated with aWord in aCategory.
    If none, return nil."

    | assoc |
    assoc ← super at: aWord.
    (assoc isMemberOf: Set)
        ifTrue: [assoc ← assoc detect: [:each| each first = aCategory] ifNone: [↑nil]].
    assoc size = 2
        ifTrue: [↑assoc at: 2].
    ↑nil
```

*GDict methodsFor: 'error recovery'* errorKeyNotFound
```
    "The item is not in the dictionary - probably a phrase explicitly in the grammar or an integer"

    | |
    W isDigitString
        ifTrue: [↑Array with: '<unsigned integer>']
        ifFalse: [↑Array with: W].
Dictionary variableSubclass: #RevDict
    instanceVariableNames: 'searchKey '
    classVariableNames: ''
    poolDictionaries: ''
    category: 'Glib-Parser'
```

*RevDict methodsFor: 'adding'* add: word to: category
```
    "Stores reverse dictionary"
    | contents|
    ((self keys) includes: category)
        ifFalse: [contents ← Set new.
                  contents add: word.
                  self at: category put: contents.]
        ifTrue: [(self at: category) add: word.]
    .
```

*RevDict methodsFor: 'accessing'* allValues
```
    "GLIB message to get all the values in a single set"

    | wordList |
    wordList ← Set new.
    (self keys) do: [:x| wordList addAll: (self at: x)].
    ↑wordList
```

```
at: sought
    searchKey ← sought.
    ↑super at: sought

errorKeyNotFound
    "The item is not in the dictionary.
    Assumed to be a phrase explicitly in the grammar or an integer"
    |t|
    t ← Set new.
    t add: searchKey.
    ↑t

keyAtValue: value
    "Answer the key that contains the external name for the argument, value.
        Used in GLIB to get the constituent associated with a help menu item"

    self associationsDo:
        [:association | (association value includes: value) ifTrue: [↑association key]].
Object subclass: #Constituent
    instanceVariableNames: 'head partParse ruleTail goalCategory goalParent segmentBuffer name
subparseActivated '
    classVariableNames: 'Count Maestro NonTerminals Terminals '
    poolDictionaries: ''
    category: 'Glib-Parser'


Constituent methodsFor: 'subparses'

done: filler as: phrase with: anEquation
    "filler completed the subparse"
    "segment and filler to partParse"
    |filledSlot|
    filledSlot ← CStructureNode new.
    filledSlot at: 1 put: phrase.
    filledSlot at: 2 put: filler partParse.
    filledSlot at: 3 put: anEquation.
    partParse nextPut: filledSlot.

start: h lc: l with: w goal: g in: parent
    "initiate a constituent"
    |filledSlot|

    "Transcript cr; show: 'start:lc: ', l printString, ' ', w printString."
    filledSlot ← CStructureNode new.
    filledSlot at: 1 put: l.
    (w isMemberOf: Constituent)
        ifTrue: [filledSlot at: 2 put: w partParse]
        ifFalse: [filledSlot at: 2 put: w].
    filledSlot at: 3 put: (h at: 3).
    head ← h at: 1.
    partParse ← ReadWriteStream with: Array new.
    partParse reset.
    partParse nextPut: filledSlot.
    segmentBuffer ← ReadWriteStream with: Array new.
    ruleTail ← AugmentedStream with: (h at: 2) contents.
    ruleTail setEquations: (h at: 2) equations.
    ruleTail reset.
    goalCategory ← g.
    goalParent ← parent.
    subparseActivated ← nil.
```

*Constituent methodsFor: 'copying'*

```
copy
    "Used to make a copy of a parent on completion of a subparse"

    | newC |

    newC ← Constituent new.
    newC initWith: head pp: partParse rt: ruleTail gp: goalParent gc: goalCategory sb: segmentBuffer.
    ↑newC
initWith: h pp: pp rt: rt gp: gp gc: gc sb: sb
    "Used to make a copy of a parent on completion of a subparse"

    head ← h.
    partParse ← ReadWriteStream with: pp contents. "pp deepCopy."
    ruleTail  ← rt deepCopy.
    goalCategory ← gc.
    goalParent ← gp.
    segmentBuffer ← sb deepCopy.
    subparseActivated ← nil.

spawn: h pp: pp rt: rt gp: gp gc: gc
    "Put a copy of a constituent without its first segment into ruleTail."

    | dummy y |
    head ← h.
    partParse ← ReadWriteStream with: (pp contents).
    dummy ← rt deepCopy.
    dummy next.
    y ← dummy remainingEquations.
    ruleTail ← AugmentedStream with: (dummy upTo: 'foo').
    ruleTail setEquations: y.
    ruleTail reset.
    goalCategory ← gc.
    goalParent ← gp.
    segmentBuffer ← ReadWriteStream with: Array new.
    subparseActivated ← nil.
```

*Constituent methodsFor: 'next word'*

```
nextSegment
    "Examines ruleTail and segmentBuffer to get next segment.
    segmentBuffer is used to mediate *-ed segements
    Makes a copy to skip *-ed segments"

    | segment |
    (segmentBuffer atEnd)
        ifFalse:
            [segment ← Array with: segmentBuffer next with: nil.]
        ifTrue:
            [segmentBuffer isEmpty
                ifFalse:
                    ["Flush the buffer completely so that it is known to be finished"
                    segmentBuffer ← ReadWriteStream with: Array new].
            segment ← ruleTail peek.
            (segment last = $*)
                ifTrue:
                    [(segment first = $()    "Equations are not considered here – bug!"
                        ifTrue:
```

```
                    [segmentBuffer ← (segment copyFrom: 2 to: ((segment size) - 2)) asBuffer.
                    segment ← Array with: segmentBuffer next with: nil.
                    Maestro copy: head pp: partParse rt: ruleTail gp: goalParent gc:
goalCategory.]
               ifFalse:
                    [segmentBuffer ← (segment copyFrom: 1 to: ((segment size) - 1)) asBuffer.
                    segment ← Array with: segmentBuffer next with: nil.
                    Maestro copy: head pp: partParse rt: ruleTail gp: goalParent gc:
goalCategory.]]
          ifFalse:
               [segment ← Array with: ruleTail next with: ruleTail previousEquation.]].
    ↑segment          "An array with a segment and an equation."
```

nextSegmentPeek

```
    "Examines ruleTail and segmentBuffer to peek at next segment."

    | segment peek pair|

    pair ← Array new: 2.
    peek ← Set new.
    (segmentBuffer atEnd)
        ifFalse:
            [pair at: 1 put: self.
            pair at: 2 put: segmentBuffer peek.
            peek add: pair.
            ↑peek]
        ifTrue:
            [ruleTail atEnd
                ifTrue: "Have to complete subparses to be able to peek"
                    [↑Maestro end: self  am: head to: goalCategory in: goalParent]
                ifFalse:
                    [pair at: 1 put: self.
                    pair at: 2 put: ruleTail peek.
                    peek add: pair.
                    ↑peek]].
```

word: word in: category forBuffer: bufferWords

```
    "New input."
    | segment filledSlot |

    filledSlot ← CStructureNode new.
    subparseActivated isNil
        ifTrue:
            [segment ← self nextSegment]
        ifFalse:
            [segment ← subparseActivated].
    filledSlot at: 1 put: category.
    filledSlot at: 2 put: word.
    filledSlot at: 3 put: (segment at: 2).
    ((word sameAs: segment first)
        or: [category sameAs: segment first])
        ifTrue:
            [partParse nextPut: filledSlot.
            "Transcript cr; show: 'word:in: ', word printString, ' ',category printString."
            self bufferPut: bufferWords.
            ↑true].
    (NonTerminals includes: segment first)
        ifTrue:        "Should segment be segment first?"
```

```
            [Maestro makeSubparse: segment first in: self with: word in: category forBuffer: bufferWords.
            subparseActivated ← segment.
            ↑false]
        ifFalse:
            ["Fail: undo the effect of nextSegment."
            Maestro fail: self.
            subparseActivated isNil ifTrue: [ruleTail unGet].
            ↑false]
```

*Constituent methodsFor: 'recovery'* bufferPut: words

```
    "multiword rule segment. First already found so shift forward in segmentBuffer"

    words isNil
        ifFalse:
            [segmentBuffer ← words asBuffer.
            segmentBuffer reset.
            segmentBuffer next.]
```

*Constituent methodsFor: 'display state'* state

```
    "The state of the parse"

    text copy print|

    Sensor leftShiftDown & false ifFalse: [↑nil].

    Transcript nextPutAll: '=========='; cr; nextPutAll: head; cr.

    text ← ''.
    partParse contents do:
        [:x|(x last) class = Constituent
                ifTrue:
                    [print ← ' aConstituent']
                ifFalse:
                    [print ← x last].
        text ← text , (x first) , ' = ' , print , ' | '].
    Transcript nextPutAll: '———'; cr; nextPutAll: text; cr.

    text ← ''.
    copy ← segmentBuffer deepCopy.
    (copy upTo: 'foo') do: [:x| text ← text , x , ' '].
    Transcript nextPutAll: text; cr.

    text ← ''.
    copy ← ruleTail deepCopy.
    (copy upTo: 'foo') do: [:x| text ← text , x , ' '].
    Transcript nextPutAll: text; cr; endEntry.
```

*Constituent methodsFor: 'accessing'* name: integer

```
    name ← integer
```

partParse

```
    "Answer the instance variable partParse of the receiver
    for the sake of visibility to Pegasus."
```

```
    | |
    ↑partParse

ruleTail
    ↑ruleTail
"- - - - - - - - - - - - - - - - - - -"

Constituent class
    instanceVariableNames: ''


Constituent class methodsFor: 'instance creation'

fix: m vNT: vNT vT: vT
    "sets class variable Maestro "

    | |
    Maestro ← m.
    Count ← 0.
    NonTerminals ← vNT.
    Terminals ← vT

new
    "Increments the counter used to name the constituents"

    | t |

    Count ← Count + 1.
    t ← super new.
    t name: Count.
    ↑t

release
    Maestro ← nil.
    Count ← nil.
    Terminals ← nil.
    NonTerminals ← nil
Object variableSubclass: #Dictionaries
    instanceVariableNames: 'vTerminal dictionary reverseDictionary '
    classVariableNames: 'W '
    poolDictionaries: ''
    category: 'Glib-Parser'


Dictionaries methodsFor: 'initialization'

at: word put: category
    "Makes dictionary and reverse dictionary"

    | |
    dictionary add: category to: word.
    reverseDictionary add: word to: category first.
    vTerminal add: category.

formatDictionary: stringDictionary
    "Stores a dictionary presented as a single string.
    NO multiple spaces are allowed."

    | start stop words category equations cr max |
```

```
    cr ← Character cr.
    max ← stringDictionary size.
    start ← 1.
    [stop ← stringDictionary findString: ' <' startingAt: start.
    stop ~= 0]
        whileTrue:
            [words ← stringDictionary copyFrom: start to: stop - 1.
            start ← stop + 1.
            stop ← stringDictionary findString: '>' startingAt: start.
            category ← stringDictionary copyFrom: start to: stop.
            equations ← nil.
            stop < max
                ifTrue:
                    [(stringDictionary at: stop + 1) = cr
                        ifFalse:
                            [start ← stop + 2.
                            stop ← stringDictionary findString: ']' startingAt: start.
                            equations ← stringDictionary copyFrom: start to: stop]].
            start ← stop + 2.
            equations isNil
                ifTrue: [self at: words put: (Array with: category)]
                ifFalse: [self at: words put: (Array with: category with: equations)]]

initialize: application
    "Creates dictionary and reverseDictionary"

    | |

    dictionary ← GDict new.
    reverseDictionary ← RevDict new.
    vTerminal ← Set new.
    (application = 'glib')
        ifTrue:
            [self formatDictionary: (self glibDictionary)].

    (application = 'nanoglib')
        ifTrue:
            [self formatDictionary: (self nanoGlibDictionary)].

    (application = 'peg')
        ifTrue:
            [self formatDictionary: (self pegDictionary)].


Dictionaries methodsFor: 'accessing'

dict
    "standard dictionary"

    | |
    ↑dictionary

revDict
    "reverse dictionary"

    | |
    ↑reverseDictionary


Dictionaries methodsFor: 'applications'
```

glibDictionary
"MaxiGlib dictionary"

↑'. <sentence terminator>
* <dyadic operator> [↑ op mul]
** <dyadic operator> [↑ op power]
+ <dyadic operator> [↑ op add]
+ <sign>
/ <dyadic operator> [↑ op div]
- <dyadic operator> [↑ op sub]
- <sign>
< <comparator> [↑ op less]
<= <comparator> [↑ op lesseq]
= <comparator> [↑ op eq]
~= <comparator> [↑ op neq]
> <comparator> [↑ op grtr]
>= <comparator> [↑ op grtreq]
0th <ordinal units suffix>
1st <ordinal units suffix>
2nd <ordinal units suffix>
3rd <ordinal units suffix>
4th <ordinal units suffix>
5th <ordinal units suffix>
6th <ordinal units suffix>
7th <ordinal units suffix>
8th <ordinal units suffix>
9th <ordinal units suffix>
A <atomic measure>
A <det-a>
A <letter>
ADDED TO <signal operation> [↑ op add]
AMPERES <atomic measure>
AMPLIFIER STAGE <substructure type> [↑ dev ampStage]
AMPLITUDE <signal property> [↑ prop amp]
ANODE <terminal>
AT ALL TIMES <temporal context>
ATTO <measure prefix> [↑ mul 1.0e-18]
B <letter>
BASE <terminal>
BLOCK <substructure type> [↑ dev @]
BOOLEAN <scalar type>
BRIGHT <literal constant>
C <letter>
CAPACITANCE <scalar property>
CAPACITOR <device type>
CATHODE <terminal>
CENTI <measure prefix> [↑ mul 0.01]
COLLECTOR <terminal>
CONVOLVED WITH <signal operation> [↑ op convolve]
CURRENT <scalar property>
D <letter>
DECA <measure prefix> [↑ mul 10.0]
DECI <measure prefix> [↑ mul 0.1]
DEGREES <atomic measure> [↑ mul 0.01745328]
DEVICE <structural object type>
DIM <literal constant>
DIODE <device type>
DIVIDED BY <dyadic operator> [↑ op div]
DRAIN <terminal>
E <exp-e>

E <letter>
EIGHTH <alphabetic ordinal>
EMITTER <terminal>
EXA <measure prefix> [1.0e18]
F <atomic measure>
F <letter>
FALSE <boolean constant>
FARADS <atomic measure>
FEMTO <measure prefix> [↑ mul 1.0e-15]
FIFTH <alphabetic ordinal>
FILTER <substructure type> [↑ dev @]
FIRST <alphabetic ordinal>
FLASHING <literal constant>
FOURTH <alphabetic ordinal>
FREQUENCY <signal property> [↑ prop freq]
G <letter>
GATE <terminal>
GIGA <measure prefix> [↑ mul 1.0e9]
H <letter>
HECTO <measure prefix> [↑ mul 100.0]
HERTZ <atomic measure>
HIGH <boolean signal property>
HZ <atomic measure>
I <letter>
IC <device type>
IMPEDANCE <scalar property>
INTEGER <scalar type>
INTERVAL <temporal object type>
IS EQUAL TO <comparator> [↑ op eq]
IS GREATER THAN <comparator> [↑ op grtr]
IS GREATER THAN OR EQUAL TO <comparator> [↑ op grtreq]
IS LESS THAN <comparator> [↑ op less]
IS LESS THAN OR EQUAL TO <comparator> [↑ op lesseq]
IS NOT EQUAL TO <comparator> [↑ op neq]
J <letter>
K <letter>
KILO <measure prefix> [↑ mul 1000]
L <letter>
LED <device type>
LOW <boolean signal property>
M <letter>
MAY ONLY <specification modality>
MEGA <measure prefix> [↑ mul 1.0e6]
MICRO <measure prefix> [↑ mul 1.0e-6]
MILLI <measure prefix> [↑ mul 0.001]
MINUS <dyadic operator> [↑ op sub]
MULTIPLIED BY <signal operation> [↑ op mul]
MUST <specification modality>
N <letter>
NANO <measure prefix> [↑ mul 1.0e-9]
NEGATIVE <polarity>
NEGATIVE RAMP <signal class> [↑ class negramp]
NINETH <alphabetic ordinal>
O <atomic measure>
O <letter>
OFF <literal constant>
OFFSET <signal property> [↑ prop offs]
OHMS <atomic measure>
ON <literal constant>
OSCILLATOR <substructure type> [↑ dev @]

P <letter>
PATH <n-path>
PATH <structural object type>
PECTA <measure prefix> [↑ mul 1.0e15]
PHASE <signal property> [↑ prop phase]
PICO <measure prefix> [↑ mul 1.0e-12]
PLUS <dyadic operator> [↑ op add]
POINT <structural object type>
POSITIVE <polarity>
POSITIVE RAMP <signal class> [↑ class posramp]
POWER <scalar property>
POWER SUPPLY <substructure type> [↑ dev powerSupply]
Q <letter>
R <atomic measure>
R <letter>
RADIANS <atomic measure>
REAL NUMBER <scalar type>
RECTIFIER <device type>
RESISTANCE <scalar property>
RESISTOR <device type>
S <letter>
SECOND <alphabetic ordinal>
SET OF INTERVALS <temporal object type>
SEVENTH <alphabetic ordinal>
SIGNAL <n-signal>
SIGNAL <signal class> [↑ class signal]
SINE WAVE <signal class> [↑ class sine]
SIXTH <alphabetic ordinal>
SOURCE <terminal>
SQUARE WAVE <signal class> [↑ class square]
SUBSTRUCTURE <structural object type>
SUBTRACTED FROM <signal operation> [↑ op sub]
T <letter>
TENTH <alphabetic ordinal>
TERA <measure prefix> [↑ mul 1.0e12]
THE INVERSE OF <monadic operator> [↑ op invert; ↑ action checkop]
THE NEGATIVE OF <monadic operator> [↑ op negate]
THE RECIPROCAL OF <monadic operator> [↑ op invert; ↑ action checkop]
THIRD <alphabetic ordinal>
TIMES <dyadic operator> [↑ op mul]
TO THE POWER OF <dyadic operator> [↑ op power]
TRANSISTOR <device type>
TRIANGLE WAVE <signal class> [↑ class triangle]
TRUE <boolean constant>
U <letter>
V <atomic measure>
V <letter>
VOLTAGE <scalar property>
VOLTS <atomic measure>
W <letter>
WATTS <atomic measure>
WITH ENVELOPE <signal operation> [↑ op window]
X <letter>
Y <letter>
Z <letter>' nanoGlibDictionary
'+ <sign>
- <sign>

```
< <comparator> [↑ op less]
<= <comparator> [↑ op lesseq]
= <comparator> [↑ op eq]
~= <comparator> [↑ op neq]
> <comparator> [↑ op gtr]
>= <comparator> [↑ op gtreq]
AMPS <unit>
CAPACITOR <device type>
DIODE <device type>
IS EQUAL TO <comparator> [↑ op eq]
IS EQUAL TO NOT <comparator> [↑ op neq]
RESISTOR <device type>
TRANSISTOR <device type>
VOLTS <unit>'
"- - - - - - - - - - - - - - - - - -"

Dictionaries class
    instanceVariableNames: ''
```

*Dictionaries class methodsFor: 'instance creation'* newApplication: application

```
    "The dictionaries"

    | t |
    t ← super new.
    ↑t initialize: application
Object subclass: #GlibStream
    instanceVariableNames: 'wPt rPt Queue '
    classVariableNames: ''
    poolDictionaries: ''
    category: 'Glib-Parser'
```

*GlibStream methodsFor: 'accessing'* putFirst: item

```
    " Puts at the front of queue so that is not processed on this cycle"

    | |
    wPt = Queue size ifTrue: [Queue grow. Transcript cr; show: 'Queue grew to ', (Queue size
printString)].
    wPt to: 1 by: -1 do:
        [:i| Queue at: i + 1 put: (Queue at: i)].
    Queue at: 1 put: item.
    wPt ← wPt + 1.
    rPt ← rPt + 1.
```

queue

```
    | |
    ↑Queue select: [:x| x notNil]
```

readC

```
    "Reads a constituent from stream"

    | |
    rPt ← rPt + 1.
    rPt > wPt
```

```
        ifTrue: [rPt ← wPt.  ↑nil]
        ifFalse: [↑Queue at: rPt]

size
    " "

    | |
    ↑wPt

writeC: cons
    "Adds a constituent to stream"

    | |
    wPt ← wPt + 1.
    wPt > Queue size ifTrue: [Queue grow. Transcript cr; show: 'Queue grew to: ', (Queue size
printString)].
    Queue at: wPt put: cons.
```

*GlibStream methodsFor: 'positioning'*

```
restart
    "restarts read for the GlibStream"

    rPt ← 0.

start
    "Initializes the GlibStream"

    | |
    Queue ← Array new: 20.
    wPt ← 0.
    rPt ← 0.
```

*GlibStream methodsFor: 'removing'*

```
remove: item
    1 to: (Queue size) do:
        [:i| ((Queue at: i) = item)
            ifTrue: [ i to: ((Queue size) - 1)
                            do: [:j| Queue at: j put: (Queue at: (j +1)).].
                     wPt ← wPt -1.  wPt < 0 ifTrue: [self halt].
                     rPt ← rPt -1.  rPt < 0 ifTrue: [rPt ← 0].
                     ↑nil]]

removeAll
    "Clears the queue"

    1 to: Queue size do: [:i| Queue at: i put: nil].
    wPt ← 0.
    rPt ← 0.
```

*GlibStream methodsFor: 'testing'*

```
empty
    "Is the queue empty"

    ↑(Queue at: 1) isNil
"- - - - - - - - - - - - - - - - - -"
```

```
GlibStream class
    instanceVariableNames: ''
```

*GlibStream class methodsFor: 'instance creation'*

```
new
    " "

    | t |
    t ← super new.
    t start.
    ↑t

    "GlibStream new"
Object subclass: #GParse
    instanceVariableNames: 'grammar dictionaries dictionary reverseDictionary size active sleep dead
failing vTerminal vNonTerminal root parses firstWord filter glibInterface predictions predictionsDictionary
'
    classVariableNames: ''
    poolDictionaries: ''
    category: 'Glib-Parser'
```

*GParse methodsFor: 'supbarses'*

```
end: const am: phrase to: goal in: parent
    "end of rule"

    | selectedRules constit copy peeks|

    "Show the completed subparse"
    const state.

    peeks ← Set new.
    active remove: const.
    (phrase sameAs: root)
        ifTrue:
            ["a parse - but may be initial embedded??"
            parses add: const partParse].

    (phrase sameAs: goal) & (sleep includes: parent)
        ifTrue:
            ["HAVE TO MAKE A COPY OF PARENT"
            copy ← parent copy.
            "put on active, but must process on this cycle".
            copy done: const as: phrase with: parent ruleTail previousEquation.
            active writeC: copy.
            peeks addAll: copy nextSegmentPeek].

        "intermediate in a subparse".
        selectedRules ← Set new.
        (grammar getRules: phrase goalCategory: goal) do:
            [:x| selectedRules add: x].
        selectedRules do:
            [:x|  constit ← Constituent new.
            constit start: x lc: phrase with: const goal: goal in: parent.
            active writeC: constit.
            peeks addAll: constit nextSegmentPeek].
↑peeks
```

```
"Pecking may produce a plethora of segments ...."
"Will have to return a set ..."

fail: aConstituent
    "A subparse has failed."

    ↑self
makeSubparse: segment in: parent with: word in: category forBuffer: bufferWords
    "a subparse"

    | selectedRules constit |

    selectedRules ← Set new.
    (grammar getRules: category goalCategory: segment) do:
        [:x| selectedRules add: x].
    (grammar getRules: word goalCategory: segment) do:
        [:x| selectedRules add: x].
    (selectedRules isEmpty)
        ifTrue:
            [failing add: parent.
            active remove: parent.]
        ifFalse:
            [selectedRules do:
                [:x| constit ← Constituent new.
                constit start: x lc: category with: word goal: segment in: parent.
                constit bufferPut: bufferWords.
                "Do not want the subparse to be reprocessed on this cycle"
                active putFirst: constit].
            active remove: parent.
            sleep add: parent.].


GParse methodsFor: 'initialization'

augmentReverseDictionary
    "Help filter to contain words only"

    (filter keys) do:
        [:x| reverseDictionary at: x put: (self makeWords: (filter at: x))].

makeWords: segments
    "Non-terminals to terminals to words"

    |wordList terminalList|

    terminalList ← segments reject: [:nt| vNonTerminal includes: nt].
    wordList ← Set new.
    terminalList do: [:x| (vTerminal includes: x)
        ifTrue: [wordList addAll: (reverseDictionary at: x)]
        ifFalse: [wordList add: x]].
    wordList isEmpty ifTrue: [wordList ← terminalList].

    ↑wordList

reset
    " Initialises for a new sentence "

    active removeAll.
    dead removeAll: dead.
    failing removeAll: failing.
    sleep removeAll: sleep.
```

```
    predictions ← reverseDictionary at: root.
    predictionsDictionary ← nil.
    firstWord ← true.
    predictions size = 1
        ifTrue:
            [predictions do:
                [:fw| glibInterface store: (fw , ' ')]].

setUp: application interface: anInterface
    " "

    glibInterface ← anInterface.
    dead ← Set new.
    failing ← Set new.
    sleep ← Set new.
    parses ← Set new.
    active ← GlibStream new.

    dictionaries ← Dictionaries newApplication: application.
    dictionary ← dictionaries dict.
    reverseDictionary ← dictionaries revDict.
    "free up some Oops"
    dictionaries ← nil.

    size ← 100.
    application = 'glib'
        ifTrue: [root ← '<glib statement>'].

    application = 'nanoglib'
        ifTrue: [root ← '<glib statement>'].

    application = 'pcg'
        ifTrue: [root ← '<Sentence>'].

    grammar ← LcGrammar newGr: size application: application.

    vTerminal ← grammar vTerminal.
    vNonTerminal ← grammar vNonTerminal.
    filter ← grammar filter.
    self augmentReverseDictionary.
    predictions ← reverseDictionary at: root.
    predictionsDictionary ← nil.
    firstWord ← true.
    predictions size = 1
        ifTrue:
            [predictions do:
                [:fw| glibInterface store: (fw , ' ')]].

    Constituent fix: self vNT: vNonTerminal vT: vTerminal.
GParse methodsFor: 'top level'

abort
    "Abort the sentence and restart"

    self reset.

copy: head pp: partParse rt: ruleTail gp: goalParent gc: goalCategory
    "A copy needed because of *-ed rule segments"

    | copy |
```

```
    copy ← Constituent new.
    active writeC: copy.
    copy spawn: head pp: partParse rt: ruleTail gp: goalParent gc: goalCategory

displayParses
    "Show the parses found"

    | foo foo2 cr|
    cr ← '
'.
    parses isEmpty
        ifTrue: [foo ← #oink]
        ifFalse: [Sensor leftShiftDown ifTrue: [self halt].
                foo ← Pegasus fetch: (parses asOrderedCollection at: 1)
                        functors: OrderedCollection new.
                foo2 ← Pegasus fetch: (parses asOrderedCollection at: 1)
                        args: OrderedCollection new].
    foo2 isNil
        ifTrue: [foo2 ← OrderedCollection new].
    glibInterface answer: cr , (Pegasus munge:foo it:foo2) , ' ' , cr.

firstSelect: word forBuffer: bufferWords in: category
    "Gets things going for the first word"

    |wordPiece selectedRules constit|

    selectedRules ← Set new.
    (grammar getRules: category goalCategory: root) do:
        [:x| selectedRules add: x].
    (grammar getRules: word goalCategory: root) do:
        [:x| selectedRules add: x].
    wordPiece ← word copyUpTo: $ .
    selectedRules do:
        [:r| constit ← Constituent new.
        constit start: r lc: category with: wordPiece
            goal: root in: nil.
        active putFirst: constit.
        ((bufferWords notNil) & (bufferWords ~= wordPiece))
            ifTrue:
                [constit bufferPut: bufferWords]].
nextSelect: displayWord forBuffer: bufferWords in: category
    "Gets a constituent going again"

    | chosenConstituents wordPiece cCC |

    bufferWords notNil
        ifTrue:
            [wordPiece ← displayWord copyUpTo: $ ]
        ifFalse:
            [wordPiece ← displayWord].

    "Only the category of integers appears in aDictionary"
    "Several constituents may have the same phrase"
    displayWord isDigitString
        ifTrue:
            [chosenConstituents ← self allKeysWithValue: category in: predictionsDictionary]
        ifFalse:
            [chosenConstituents ← self allKeysWithValue: displayWord in: predictionsDictionary].
```

```
chosenConstituents do:
    [:cC| (active queue includes: cC)  "Several possibilities may point to the same constituent"
                                        "This has assumed they are multi-word strings"
        ifTrue:
            [cCC ← cC copy.
            cCC bufferPut: bufferWords.
            active writeC: cCC]
        ifFalse:
            [(cC word: wordPiece in: category forBuffer: bufferWords)
                ifTrue: "Subparses etc. will be put in active, but not self"
                    [active writeC: cC]]].
```

parse: word

```
    "top-level of parser"

    |displayWord w|
    w ← word.
    predictions isEmpty
        ifTrue:
            [w ← '**PARSED'].
    Sensor currentCursor: (Cursor wait).

    (w = '**PARSED'
        or: [w = '**EDIT'
            or: [w = '**ENTRY'
                or: [w = '**ABORT']]])
        ifTrue:
            [displayWord ← w]
        ifFalse:
            [failing removeAll: failing.
            parses ← Set new.
            displayWord ← self testAgainst: w.
            (active queue) do: [:x| x state].
            firstWord
                ifTrue:
                    [displayWord ← '
', displayWord.
                    firstWord ← false].
            self predict].

    Sensor currentCursor: (Cursor normal).
    ↑displayWord
```

partialMatch: word in: wordList

```
    "For multi-word entries and ? help"
    "Is the typed word a first fragment of a string of words"

    |base length|

    (word ~= '')
        ifTrue:
            [(word last) = $?
                ifTrue:
                    [base ← word copyUpTo: $?]
                ifFalse:
                    [base ← word, ' '].
            length ← base size.
            ↑wordList select:
                [:wd |(wd size) >= length
```

```
                ifTrue: [(wd copyFrom: 1 to: length) = base]
                ifFalse: [false]]]
        ifFalse:
            [↑wordList]
```

predict

```
    "Set up the predictions of next words"

    predictionsDictionary ← RevDict new.
    (active queue) do:
        [:x | (x nextSegmentPeek) do:
            [:pair| predictionsDictionary
                    at: (pair at: 1)
                    put: (reverseDictionary at: (pair at: 2)).]].
    predictions ← predictionsDictionary allValues.

    predictions size = 1
        ifTrue:
            [predictions do:
                "[:fw| glibInterface predict: (fw , ' ')]]."
                [:fw| fw isWord ifTrue: [glibInterface predict: (fw , ' ').]]].

    predictions isEmpty & firstWord not
        ifTrue:
            [glibInterface store: '**PARSED '].
```

select: displayWord forBuffer: bufferWords

```
    "Gets a constituent going"

    firstWord
        ifTrue:
            [(dictionary at: displayWord) do:
                [:category| self firstSelect: displayWord forBuffer: bufferWords in: category]]
        ifFalse:
            [(dictionary at: displayWord) do:
                [:category| self nextSelect: displayWord forBuffer: bufferWords in: category]]
```

select: displayWord inCategory: category

```
    "Special kludge for <unsigned integer>'s.  See select:forBuffer:"

    firstWord
        ifTrue:
            [self firstSelect: displayWord forBuffer: nil in: category]
        ifFalse:
            [self nextSelect: displayWord forBuffer: nil in: category]
```

testAgainst: word

```
    "Compare actual against predicted"

    |displayWordList wordPiece|

    predictions isEmpty
        ifTrue:
            [↑nil].

    "Transcript cr; show: '"', word, '"'."
    active removeAll.
    displayWordList ← predictions.
    (predictions includes: word)
        ifTrue:
```

```
            [self select: word forBuffer: nil.
            ↑word]
        ifFalse:
            ["kludge to get numbers working"
            ((word isDigitString) and: [predictions includes: '<unsigned integer>'])
                ifTrue: [self select: word inCategory: '<unsigned integer>'.
                        ↑word].
            "Is the typed word a first fragment of a string of words"
            displayWordList ← self partialMatch: word in: displayWordList.

            displayWordList isEmpty
                ifTrue:
                    [displayWordList ← glibInterface dwim: word couldBe: predictions strength: 50].
            wordPiece ← self immediatelyDisplayable: displayWordList].

    wordPiece notNil
        ifTrue:
            [displayWordList do:
                [:wd| wd = wordPiece
                    ifTrue:
                        [self select: wd forBuffer: nil]
                    ifFalse:
                        [self select: wd forBuffer: wd]].

                ↑wordPiece]

            ifFalse: "Display a menu"
                [↑self recover: word from: displayWordList].
```

*GParse methodsFor: 'recovery'*

```
allKeysWithValue: value in: dict
    "Several constituents may continue with the same phrase"

    | keys |
    keys ← Set new.
    dict associationsDo: [:v| ((v value) includes: value) ifTrue: [keys add: (v key)]].

    ↑keys

at: index in: menu
    "gets the indexed menu entry"
    "NB: There is assumed to be a final crlf on the menu"

    | start stop cr|

    index < 1 ifTrue: [↑nil].

    cr ← '
'.
    stop ← 0.
    1 to: index do:
        [:i| start ← stop.
        stop ← menu findString: cr startingAt: (start + 1).
        stop = 0 ifTrue: [↑nil]].
    stop ← menu findString: ' (#' startingAt: (start + 1).
    ↑menu copyFrom: (start + 1) to: (stop - 1)
```

```
displayMenu: displayWords default: wordList
    |index help nextHelpMenu displayWord displayWordList |

    "Display a menu"

     displayWords isEmpty
        ifTrue: [displayWordList ← wordList]
        ifFalse: [displayWordList ← displayWords].

    (displayWordList size = 1)
        ifTrue:
            [displayWordList do:
                [:x| x isWord ifTrue: [↑x]]].

    (displayWordList includes: '**ABORT')
        ifFalse:
            [displayWordList ← displayWordList asSortedCollection.
            displayWordList addLast: '**ABORT'].
    parses isEmpty
        ifFalse:
            [displayWordList add: '**PARSED'].
    nextHelpMenu ← self makeMenu: displayWordList.
    help ← GlibPopUpMenu
                labels: (nextHelpMenu copyFrom: 1 to: (nextHelpMenu size - 1)).

    Sensor currentCursor: (Cursor normal).
    displayWord ← self response: help words: nextHelpMenu from: displayWordList.
    [(displayWord isMemberOf: String) and: [displayWord isWord]]
        whileFalse: [displayWord ← self response: help
                                        words: nextHelpMenu
                                        from: displayWordList.].
    Sensor currentCursor: (Cursor wait).
    ↑displayWord

immediatelyDisplayable: displayWordList
    "Must be one set of words, e.g. <UnsignedInteger> must be displayed"
    "Or it can be a common first word of every member of the set"
    "Returns what is immediatly displayable"

    |fwds|

        (displayWordList size) = 1
        ifTrue:
            [displayWordList do:
                [:wd|wd isWord
                    ifTrue:
                        [glibInterface flush: wd.
                        ↑wd]
                    ifFalse: [↑nil]]]
        ifFalse:
            [fwds ← Set new.
            displayWordList do:
                [:wd| fwds add: (wd copyUpTo: $ )].
            (fwds size) = 1
                ifTrue: [fwds do: [:wd| ↑wd]]
                ifFalse: [↑nil]].

makeMenu: wList
    "Words to words in menu format - with crlf"
    |menuList i|
```

```
i ← 1.
menuList ← String new: 0.
wList do: [:y| y ← y , ' (#' , (i printStringRadix: 10) , ')' , '
'.
        i ← i + 1.
        menuList ← menuList copyReplaceFrom: (menuList size + 1) to: menuList size with: y.].
↑menuList
```

match: word in: category

```
"Used when a menu item is entered from the keyboard
and the menu item is categorical: e.g. <UnsignedInteger>"
"word must be a digitString. Specific to GLIB"
| |
↑category = '<unsigned integer>' or: [category = '<integer>' or: [category = '<real-number>'
    or: [category = '<non unit integer>' & word ~= '1']]]
```

recover: word from: displayWordList

```
"Display a menu"

|displayWord wordPiece|


"Flush the input buffer"
glibInterface reset.

displayWord ← self displayMenu: displayWordList default: predictions.
(displayWord = '**ABORT'
    or: [displayWord = '**PARSED'])
    ifTrue:
        [↑displayWord].
"May be getting a set back if the user keyboarded"
displayWord class = SortedCollection
    ifTrue:
        [displayWord isEmpty
            ifTrue: "A typo in keyboarding"
                [displayWord ← self recover: word]
            ifFalse:
                [displayWord do:
                    [:word| self select: word forBuffer: word.
                    wordPiece ← word copyUpTo: $ ].
                displayWord ← wordPiece.
                "Have to return the first word in the choices"]]
    ifFalse:
        [self select: displayWord forBuffer: nil].

↑displayWord
```

response: help words: nextHelpMenu from: displayWordList

```
| index displayWord found|
found ← false.
[found]
    whileFalse:
        [index ← 0.
        [index = 0]
            whileTrue:
                [index ← help startUp: #redButton.].
        index = nil
            ifTrue:
                [displayWord ← glibInterface keyboarding: displayWordList.
```

```
((displayWord class = String) and: [displayWord first = $#])
    ifTrue:
        [index ← (displayWord copyFrom: 2 to: (displayWord size)) asNumber.
        displayWord ← self at: index in: nextHelpMenu.
        found ← displayWord notNil]
    ifFalse:
        [displayWord isEmpty

                ifFalse:
                    [found ← true]]]
    ifFalse:
        [displayWord ← self at: index in: nextHelpMenu.
        found ← true.]].

↑displayWord
```

*GParse methodsFor: 'releasing'* release

```
    Constituent release.
    glibInterface ← nil.
    grammar release.
    grammar ← nil.
    dictionary ← nil.
    reverseDictionary ← nil.
    active removeAll.
    active ← nil.
    sleep ← nil.
    dead ← nil.
    failing ← nil.
    vTerminal ← nil.
    vNonTerminal ← nil.
    filter ← nil.
    root ← nil.
    parses ← nil.
    predictions ← nil.
    predictionsDictionary ← nil.
    size ← firstWord ← nil
```

*GParse methodsFor: 'c-structure conversion'* cleanUpEquationsFor: aStream

```
    "Constituents were removed during parsing. Now replace
    identity equations on terminal nodes with equations from
    the dictionary."

    | equations |
    aStream contents do:
        [:aNode| ((aNode at: 2) isMemberOf: ReadWriteStream)
            ifTrue: [self cleanUpEquationsFor: (aNode at: 2)]
            ifFalse:    "Get equations from dictionary."
                [self phrasify: aStream from: aNode.
                (((aNode at: 2) isMemberOf: String) and: [(aNode at: 1) isWord not])
                    ifTrue:
                        [equations ← dictionary equationsAt: (aNode at: 2)
                                                inCategory: (aNode at: 1).
                        equations notNil
                            ifTrue:
```

```
[((aNode at: 3) isNil or: [(aNode at: 3) = '[↑=@]'])
    ifTrue: [aNode at: 3 put: equations]
ifFalse: [aNode at: 3 put: ((aNode at: 3) copyFrom: 1 to: (aNode at...
size - 1),
                              '; ', (equations copyFrom: 2 to: (equations
size))]]]]]
```

cStructure

```
    "Return the c-structure created by the parse.
    The objective here is to clean up the cStructure
    by getting equations from the dictionary."

    | cStructureRoot |
    parses isEmpty
        ifFalse:
            [cStructureRoot ← parses asOrderedCollection first.
            self cleanUpEquationsFor: cStructureRoot.
            parses ← CStructureNode with: '<root>' with: cStructureRoot.
            Sensor leftShiftDown
                ifTrue: [self displayCStructure]]
        ifTrue:
            [cStructureRoot ← nil.
            Sensor leftShiftDown ifTrue: [Transcript cr; show: 'Not parsed.']].
    ↑cStructureRoot
```

displayCStructure

```
    (parses isMemberOf: Set)
        ifFalse: [parses displayAll]
```

matchPhrase: aString in: anArray from: aNode

```
    "Return true if the phrase in aString matches
    the words in anArray beginning with aNode."

    | i start stop |
    i ← 1.
    [aNode == (anArray at: i)]
        whileFalse: [i ← i+1].
    i ← i+1.     "First word already matched."
    start ← (aNode at: 2) size + 2.
    start > (aString size) ifTrue: [↑false].
    [stop ← (aString findString: ' ' startingAt: start).
    (aString copyFrom: start to: stop-1) = ((anArray at: i) at: 2)]
        whileTrue:
            [stop = (aString size) ifTrue: [↑true].
            (i ← i+1) > (anArray size) ifTrue: [↑false].
            start ← stop+1].
    ↑false
```

phrasify: aStream from: aNode

```
    "Check if aNode heads up a phrase. If so,
    consolidate the words into aNode at: 2."

    | word |
    (aNode at: 1) isWord ifTrue: [↑self]. "Only need to check non-terminals?"
    (reverseDictionary at: (aNode at: 1)) do:
        [:aString| ((aString size >= (word ← aNode at: 2) size) and:
                [((aString copyFrom: 1 to: word size) = word) and:
                    [self matchPhrase: (aString, ' ') in: aStream contents from: aNode]])
                        ifTrue:
```

```
        [aNode at: 2 put: aString.         "We want the whole phrase to be here."
        ↑self]]
"- - - - - - - - - - - - - - - - - - -"

GParse class
    instanceVariableNames: ''
```

*GParse class methodsFor: 'instance creation'* new: application interface: anInterface

```
    "Initialization"

    | t |
    t ← super new.
    t setUp: application interface: anInterface.
    ↑t
Object subclass: #LcGrammar
    instanceVariableNames: 'inLc inRule size vNonTerminal vTerminal vocabulary filter helpFilter '
    classVariableNames: ''
    poolDictionaries: ''
    category: 'Glib-Parser'
```

*LcGrammar methodsFor: 'rule access'* getRules: category goalCategory: parentCategory

```
    "Gets rule given lc category and parent"
    |rules|
    rules ← (inRule at: (self positionOf: category)).
    rules isNil
        ifTrue: [↑Set new]
        ifFalse:
            [↑(rules contents) select:
                [:x| (filter at: parentCategory) includes: (x at: 1)]]
```

*LcGrammar methodsFor: 'hash collision'* positionOf: item

```
    "avoids hash collisions"

    | p |
    p ← (item hash \\ size) + 1.
    [((inLc at: p) = nil) or: [((inLc at: p) = item)]]
        whileFalse: [p ← (p rem: 100) + 1].  "This should be modulo size!!!"
    ↑p
```

*LcGrammar methodsFor: 'initialization'* addRule: rule

```
    "Stores rule in LC format"

    | lhs lc rt pos x y |

    rule reset.
    lhs ← rule next.
    vNonTerminal add: lhs.
    (lhs first ~= $<) | (lhs last ~= $>) ifTrue: [self halt].
```

```
 (rule next) = '->' ifFalse: [self halt].
lc ← rule next.
 (filter at: lhs ifAbsent: [nil]) isNil
     ifTrue:
          [filter at: lhs put: (Set with: lc)]
     ifFalse:
          [(filter at: lhs) add: lc].
pos ← self positionOf: lc.
inLc at: pos put: lc.
y ← rule previousEquation.
x ← rule remainingEquations.
rt ← AugmentedStream with: (rule upTo: 'foo').
rt reset.
rt setEquations: x.
x ← Array with: lhs with: rt with: y.  "The equation assoc with the head of the rule
                                         actually belongs to the symbol in inLc."
(inRule at: pos) isNil
     ifTrue: [inRule at: pos put: (ReadWriteStream with: (Array new))].
(inRule at: pos) nextPut: x
```

chunkRule: rule

```
"Chunks a single grammar rule"

| chunkedRule start stop sequence segment key length|
"Transcript show: rule; cr."
chunkedRule ← AugmentedStream with: Array new.
chunkedRule reset.
sequence ← String new.
start ← 1.
stop ← 1.
length ← rule size.

[stop ~= 0 & (stop < length)]
     whileTrue:
          [key ← rule at: start.
          key = $<
               ifTrue:
                    [stop ← rule findString: '>' startingAt: start.
                    segment ← rule copyFrom: start to: stop.
                    vocabulary add: segment.
                    (stop < length)
                         ifTrue:
                              [((rule at: (stop + 1)) = $*)
                                   ifTrue:
                                        [stop ← stop + 1.
                                        segment ← segment , '*']].
                    sequence ~= ''
                         ifTrue:
                              [chunkedRule nextPut: (sequence copyFrom: 1 to: ((sequence size) - 1)).
                              sequence ← String new.].
                    chunkedRule nextPut: segment.
                    start ← stop + 2.]
               ifFalse: [(key isAlphaNumeric or: [self isPunctuation: key])
                    ifTrue:
                         [stop ← rule findString: ' ' startingAt: start.
                         stop = 0
                              ifTrue:
                                   [segment ← rule copyFrom: start to: rule size.
                                   chunkedRule nextPut: (sequence , segment).
                                   sequence ← String new.]
```

```
                ifFalse:
                    [segment ← rule copyFrom: start to: stop - 1.
                    sequence ← sequence , segment , ' '.
                    start ← stop + 1]]
        ifFalse: [key = ${
            ifTrue:
                [stop ← rule findString: '}' startingAt: start.
                segment ← rule copyFrom: start to: stop.
                (stop < length)
                    ifTrue:
                        [((rule at: (stop + 1)) = $*)
                            ifTrue:
                                [stop ← stop + 1.
                                segment ← segment , '*']].
                sequence ~= ''
                    ifTrue:
                        [chunkedRule nextPut: (sequence copyFrom: 1 to: ((sequence
size) - 1)).
                        sequence ← String new.].
                chunkedRule nextPut: segment.
                start ← stop + 2]
            ifFalse: [key = $<
                    ifTrue:
                        [stop ← rule findString: '>' startingAt: start.
                        segment ← rule copyFrom: start to: stop.
                        chunkedRule nextPut: segment.
                        start ← stop + 2]
                    ifFalse:
                        [key = $[
                        ifTrue:
                            [stop ← rule findString: ']' startingAt: start.
                            segment ← rule copyFrom: start to: stop.
                            sequence ~= ''
                                ifTrue:
                                    [chunkedRule nextPut: (sequence copyFrom: 1
to: ((sequence size) - 1)).
                                    sequence ← String new.].
                            chunkedRule attachEquation: segment.
                            start ← stop + 2]
                        ifFalse: [self halt]]]]]].

    self addRule: chunkedRule
```

create: dim application: application

```
    "Sets up the grammar in a structure of size"

    size ← dim.
    inLc ← Array new: dim.
    inRule ← Array new: dim.
    vNonTerminal ← Set new.
    vTerminal ← Set new.
    vocabulary ← Set new.
    filter ← Dictionary new.
    helpFilter ← Dictionary new.
    "Next line deleted by steve -- see addRule:"
    "1 to: size do: [:i| inRule at: i put: (ReadWriteStream with: (Array new))]."

    (application = 'glib')
        ifTrue:
```

```
        [self formatGrammar: (self miniGlibGrammar)].

    (application = 'nanoglib')
        ifTrue:
            [self formatGrammar: (self nanoGlibGrammar)].

    (application = 'peg')
        ifTrue:
            [self formatGrammar: (self pegGrammar)].
```

formatGrammar: stringGrammar

```
    "formats a grmmar presented as a single string"

    |cr start stop rule |

    cr ← '
'.
    start ← 1.
    [stop ← stringGrammar findString: cr startingAt: start.
    stop ~= 0.]
        whileTrue:
            [rule ← stringGrammar copyFrom: start to: stop - 1.
            start ← stop + 1.
            self chunkRule: rule].
    self chunkRule: (stringGrammar copyFrom: start to: (stringGrammar size)).
```

isPunctuation: aCharacter

```
    "Punctuation: ( ) . ,"

    ↑aCharacter = $(
        or: [aCharacter = $)
            or: [aCharacter = $.
                or: [aCharacter = $,]]]
```

*LcGrammar methodsFor: 'derivatives'* filter

```
    "Computes the reachability matrix"
    "A partial filter was computed when the grammar was stored"

    | list entries augments augmented osize nsize |

    list ← filter keys.
    augmented ← true.
    [augmented]
        whileTrue:
            [augmented ← false.
            list do:
                [:x| entries ← filter at: x.
                entries do:
                    [:y| augments ← filter at: y ifAbsent: [nil].
                    augments isNil
                        ifFalse:
                            [osize ← (filter at: x) size.
                            (filter at: x) addAll: augments.
                            "elements may already be in the set"
                            nsize ← (filter at: x) size.
                            osize = nsize
                                ifFalse:
```

```
[augmented ← true]]]]].

    "Filter entry must include itself"
    list do: [:x| (filter at: x) add: x].
    ↑filter
```

helpFilter

```
    "helpFilter is the terminal elements of filter"
    "method filter must have been called first to do the transitive closure"

    | selections |

    (filter keys) do:
        [:x| helpFilter
            at: x
            put: ((filter at: x) reject: [:s| vNonTerminal includes: s])].

    ↑helpFilter
```

vNonTerminal

```
    "non-terminal vocabulary"
    "Computed when the grammar was processed"

    ↑vNonTerminal
```

vTerminal

```
    "non-terminal vocabulary"

    | |

    ↑vTerminal ← vocabulary select:
        [:x| (vNonTerminal includes: x) not ]
```

*LcGrammar methodsFor: 'applications'* miniGlibGrammar

```
    "Equation symbols: '↑' parent, '@' self, '$' value of self, '←' anon var, '<...>' string, ';' equation
seperator"

↑'<glib statement> -> <value predicate> [↑=@] .
<glib statement> -> <structural description> [↑=@] .
<glib statement> -> IF <diagnostic condition> [↑ arg1 @] THEN <functional context> [↑ arg2 @; ↑ form
<rule(↑ arg1, ↑ arg2, ←)>] .
<glib statement> -> IF <diagnostic condition> [↑ arg1 @] WHEN <structural context> [↑ arg3 @]
THEN <functional context> [↑ arg2 @; ↑ form <rule(↑ arg1, ↑ arg2, ↑ arg3)>] .
<diagnostic condition> -> <atomic diagnostic condition> [↑=@]
<diagnostic condition> -> <atomic diagnostic condition> [↑ arg1 @] AND <diagnostic condition> [↑ arg2
@; ↑ form <and(↑ arg1, ↑ arg2)>]
<atomic diagnostic condition> -> <value predicate> [↑=@]
<atomic diagnostic condition> -> <functional context> [↑=@]
<functional context> -> <atomic functional context> [↑=@]
<functional context> -> <atomic functional context> [↑ arg1 @] AND <functional context> [↑ arg2 @; ↑
form <and(↑ arg1, ↑ arg2)>]
<functional context> -> <atomic functional context> [↑ arg1 @] OR <functional context> [↑ arg2 @; ↑
form <or(↑ arg1, ↑ arg2)>]
<atomic functional context> -> <device> [↑ dev @] HAS FAILED [↑ form <status(component(↑ dev),
failed)>]
```

<atomic functional context> -> <device> [↑ dev @] IS OK [↑ form <status(component(↑ dev), ok)>]
<atomic functional context> -> <substructure> [↑ dev @] HAS FAILED [↑ form <status(block(↑ dev), failed)>]
<atomic functional context> -> <substructure> [↑ dev @] IS OK [↑ form <status(block(↑ dev), ok)>]
<structural context> -> <atomic structural context> [↑=@]
<structural context> -> <atomic structural context> [↑ arg1 @] AND <structural context> [↑ arg2 @; ↑ form <and(↑ arg1, ↑ arg2)>]
<atomic structural context> -> <device> [↑ dev @] IS REMOVED [↑ form <removed(↑ dev)>]
<structural description> -> THE CIRCUIT CONTAINS <compound structural object> [↑ dev @; ↑ action defcomp; ↑ form <hasComponent(block(circuit), ↑ arg2)>]
<structural description> -> <structural object> [↑ arg1 @] CONTAINS <compound structural object> [↑ dev @; ↑ action defcomp; ↑ form <hasComponent(↑ arg1, ↑ arg2)>]
<structural description> -> <structural object> [↑ arg2 @] IS A PART OF <structural object> [↑ arg1 @; ↑ form <hasComponent(↑ arg1, ↑ arg2)>]
<structural description> -> <structural object> [↑ arg2 @] IS A PART OF THE CIRCUIT [↑ form <hasComponent(block(circuit), ↑ arg2)>]
<compound structural object> -> <structural object> [↑=@]
<compound structural object> -> <structural object> [↑ arg1 @] AND <compound structural object> [↑ arg2 @; ↑ action defcomp]
<structural object> -> <substructure> [↑ dev @; ↑ form <block(↑ dev)>]
<structural object> -> <device> [↑ dev @; ↑ form <block(↑ dev)>]
<value predicate> -> <signal> [↑ sig @] HAS <signal property> [↑=@] OF <value expression> [↑ val @; ↑ action sigprop]
<value predicate> -> <signal> [↑ sig @] IS <boolean signal property> [↑ prop amp; ↑ val @; ↑ action sigprop]
<value predicate> -> <signal> [↑ sig @] IS <signal description> [↑=@; ↑ form <form(↑ sig, ↑ desc)>]
<value predicate> -> <object reference> [↑ arg1 @] IS <value expression> [↑ arg2 @; ↑ form <value(↑ arg1, ↑ arg2)>]
<value predicate> -> <value expression> [↑ arg1 @] IS <value expression> [↑ arg2 @; ↑ form <value(↑ arg1, ↑ arg2)>]
<value predicate> -> <value expression> [↑ arg1 @] <comparator> [↑=@] <value expression> [↑ arg2 @; ↑ form <comp(↑ op, ↑ arg1, ↑ arg2)>]
<signal description> -> <simple signal description> [↑=@]
<signal description> -> <simple signal description> [↑=@] <signal operation> [↑=@] <signal description> [↑ arg2 @; ↑ form <↑ op(↑ desc, ↑ arg2)>]
<simple signal description> -> <det-a> <signal class> [↑ action sigdesc]
<simple signal description> -> <det-a> <signal class> WITH <signal property list> [↑=@; ↑ action sigdesc]
<signal property list> -> <signal property expression> [↑=@]
<signal property list> -> <signal property expression> [↑=@] AND <signal property list> [↑ list @]
<signal property expression> -> <signal property> [↑=@] OF <value expression> [↑ (↑ prop) @]
<value expression> -> <atomic value reference> [↑=@]
<value expression> -> <compound value reference> [↑=@]
<compound value reference> -> ( <value expression> [↑=@] )
<compound value reference> -> <monadic operator> <value expression> [↑ val @; ↑ form <↑ op(↑ val)>]
<compound value reference> -> <value expression> [↑ arg1 @] <dyadic operator> [↑=@] <value expression> [↑ arg2 @; ↑ form <↑ op(↑ arg1, ↑ arg2)>]
<atomic value reference> -> <intensional value reference> [↑=@]
<atomic value reference> -> <intensional value reference> [↑=@] IN <measure> [↑ unit @; ↑ action checkunit]
<atomic value reference> -> <constant> [↑=@]
<intensional value reference> -> <voltage value reference> [↑=@]
<intensional value reference> -> <current value reference> [↑=@]
<intensional value reference> -> <generic value reference> [↑=@]
<voltage value reference> -> THE VOLTAGE ACROSS <node> [↑ arg1 @] AND <node> [↑ arg2 @; ↑ form <voltage(↑ arg1, ↑ arg2)>]
<voltage value reference> -> THE <terminal> [↑ term1 @] <terminal> [↑ term2 @] VOLTAGE OF <device> [↑ dev @; ↑ action defnode; ↑ form <voltage(↑ arg1, ↑ arg2)>]
<current value reference> -> THE CURRENT THROUGH <node> [↑ arg1 @; ↑ form <current(↑ arg1)>]

<current value reference> -> THE <terminal> [↑ term1 @] CURRENT OF <device> [↑ dev @; ↑ action defnode; ↑ form <current(↑ arg1)>]
<generic value reference> -> <object reference> [↑ arg1 @] <property> [↑ op @; ↑ form <↑ op(↑ arg1)>]
<generic value reference> -> THE <property> [↑ op @] OF <argument> [↑ arg1 @; ↑ form <↑ op(↑ arg1)>]
<generic value reference> -> THE <property> OF <generic value ref aux1> <argument> [↑ action notimpl]
<generic value reference> -> <property> ( <argument> ) [↑ action notimpl]
<generic value reference> -> <property> ( <generic value ref aux2> <argument> ) [↑ action notimpl]
<generic value ref aux1> -> <argument> AND [↑ action notimpl]
<generic value ref aux1> -> <argument> AND <generic value ref aux1> [↑ action notimpl]
<generic value ref aux2> -> <argument> , [↑ action notimpl]
<generic value ref aux2> -> <argument> , <generic value ref aux2> [↑ action notimpl]
<argument> -> <object reference> [↑=@]
<argument> -> <atomic value reference> [↑ action notimpl]
<object reference> -> <signal> [↑=@]
<object reference> -> <device> [↑=@]
<object reference> -> <path> [↑=@]
<object reference> -> <node> [↑=@]
<object reference> -> <substructure> [↑=@]
<signal> -> <n-signal> <unsigned integer> [↑ num $; ↑ form <signal(↑ num)>]
<device> -> <device type> [↑ dev @] <unsigned integer> [↑ num @; ↑ form <↑ dev(↑ num)>]
<path> -> <n-path> <unsigned integer> [↑ num $; ↑ form <path(↑ num)>]
<path> -> FROM <node> [↑ node1 @] TO <node> [↑ node2 @; ↑ action defpath]
<path> -> BETWEEN <node> [↑ node1 @] AND <node> [↑ node2 @; ↑ action defpath]
<path> -> THE PATH FROM <node> [↑ node1 @] TO <node> [↑ node2 @; ↑ action defpath]
<path> -> THE PATH BETWEEN <node> [↑ node1 @] AND <node> [↑ node2 @; ↑ action defpath]
<node> -> NODE <unsigned integer> [↑ num $; ↑ form <node(↑ num)>]
<node> -> THE <terminal> [↑ term1 @] OF <device> [↑ dev @; ↑ action defnode]
<substructure> -> <substructure type> [↑=@] <unsigned integer> [↑ num $; ↑ form <↑ dev(↑ num)>]
<property> -> <signal property> [↑ form <↑ prop>]
<property> -> <scalar property> [↑=@]
<constant> -> <boolean constant> [↑=@]
<constant> -> <literal constant> [↑=@]
<constant> -> <real-number> [↑ form $]
<constant> -> <real-number> [↑ val $] <measure> [↑=@]
<constant> -> <integer> [↑ form $]
<constant> -> <integer> [↑ val $] <measure> [↑=@]
<measure> -> <atomic measure> [↑ unit @; ↑ mul 1; ↑ action checkunit]
<measure> -> <measure prefix> [↑=@] <atomic measure> [↑ unit @; ↑ action checkunit]
<real-number> -> <integer> [↑=@] . <unsigned integer> [↑ frac @]
<real-number> -> <integer> [↑=@] . <unsigned integer> [↑ frac @] <exp-e> <integer> [↑ exp @]
<integer> -> <unsigned integer> [↑ int $]
<integer> -> <sign> [↑ sign @] <unsigned integer> [↑ int @]' nanoGlibGrammar
"↑ => current f-struct object, @ child f-struct object, $ value of child f-struct object"
↑'<glib statement> -> <rule> [↑=@] .
<glib statement> -> <observation> [↑=@] .
<rule> -> IF <observation> [↑ arg1 @] THEN <conclusion> [↑ arg2 @; ↑ form <rule(↑ arg1, ↑ arg2)>]
<observation> -> <measurement> [↑ arg2 @] <comparator> [↑=@] <value> [↑ arg3 @; ↑ form <compare(↑ op, ↑ arg2, ↑ arg3)>]
<value> -> <constant> [↑=@]
<value> -> <measurement> [↑=@]
<measurement> -> <voltage measurement> [↑=@]
<measurement> -> <current measurement> [↑=@]
<voltage measurement> -> THE VOLTAGE AT [↑ form <voltage(↑ arg1, ↑ arg2)>] <node> [↑ arg1 @; ↑ arg2 "ground"]

```
<voltage measurement> -> THE VOLTAGE BETWEEN [↑ form <voltage(↑ arg1, ↑ arg2)>] <node> [↑ arg1 @] AND <node> [↑ arg2 @]
<current measurement> -> THE CURRENT THRU [↑ form <current(↑ arg1)>] <node> [↑ arg1 @]
<conclusion> -> <device> [↑ dev @] IS OK [↑ form <status(↑ dev, ok)>]
<conclusion> -> <device> [↑ dev @] IS FAILING [(↑ form <status(↑ dev, failing)>]
<device> -> <device type> [↑ dev @; ↑ form <↑ dev(↑ num)>] <unsigned integer> [↑ num $]
<node> -> NODE [↑ form <node(↑ num)>] <unsigned integer> [↑ num $]
<constant> -> <integer> [↑ val $] <unit> [↑ unit @; ↑ form <↑ unit(↑ val)>]
<constant> -> <integer> [↑ form $]
<constant> -> <real number> [↑ val $] <unit> [↑ unit @; ↑ form <↑ unit(↑ val)>]
<constant> -> <real number> [↑ form $]
<real number> -> <integer> [↑=@] . <unsigned integer> [↑ frac @]
<real number> -> <integer> [↑=@] . <unsigned integer> [↑ frac @] E <integer> [↑ exp @]
<integer> -> <sign> [↑ sign @] <unsigned integer> [↑ int $]
<integer> -> <unsigned integer> [↑ int $]'
```

*LcGrammar methodsFor: 'releasing'*

```
release
    inRule ← nil.
    inLc ← nil.
    vTerminal ← nil.
    vNonTerminal ← nil.
    vocabulary ← nil.
    filter ← nil.
    helpFilter ← nil.
    size ← nil
"- - - - - - - - - - - - - - - - - - -"

LcGrammar class
    instanceVariableNames: ''
```

*LcGrammar class methodsFor: 'instance creation'*

```
newGr: dim application: application
    "LcGrammar stores in LC format"

    | temp |
    temp ← self new.
    temp create: dim application: application.
    ↑ temp
ReadWriteStream subclass: #AugmentedStream
    instanceVariableNames: 'equations '
    classVariableNames: ''
    poolDictionaries: ''
    category: 'Glib-Parser'
```

*AugmentedStream methodsFor: 'private'*

```
growSize
    "Overide Collection|growSize. I must be able to
    put an equation at position."
self halt.
    ↑position - equations size
```

*AugmentedStream methodsFor: 'accessing'*

```
attachEquation: anEquation
    "The first two elements of a grammar rule never
    have equations associated with them."

    [position > equations size]
        whileTrue: [equations grow].
    equations at: position put: anEquation

equations
    ↑equations

previousEquation
    "Return the equation associated with the last-read
    element of the stream."

    equations size >= position
        ifTrue: [↑equations at: position]
        ifFalse: [↑nil]

remainingEquations
    "Return the equations associated with all
    the remianing elements of this stream."

    position <= equations size
        ifTrue: [↑equations copyFrom: position + 1 to: equations size]
        ifFalse: [↑nil]

setEquations: aCollection
    equations ← aCollection
AugmentedStream methodsFor: 'positioning'

unGet
    "Undo the effect of the last next."

    position ← position - 1
"-------------------"

AugmentedStream class
    instanceVariableNames: ''


AugmentedStream class methodsFor: 'instance creation'

with: aCollection
    ↑(super with: aCollection) setEquations: Array new
StringHolderController subclass: #GlibStringHolderController
    instanceVariableNames: 'glibParser sentence sMarker editMode topView keyboard purgeWords '
    classVariableNames: 'InglishYellowButtonMenu InglishYellowButtonMessages RemoteProcessing '
    poolDictionaries: ''
    category: 'Glib-Interface'


GlibStringHolderController methodsFor: 'control'

controlActivity
    "Modified to look for words that result from predictions or editing"

    self scrollBarContainsCursor
        ifTrue:
```

```
            [self scroll]
        ifFalse:
            [self processSentence.
            self processKeyboard.
            self processMouseButtons].
```

*GlibStringHolderController methodsFor: 'keyboard I/O'*

```
echoKeyboard
    "Key struck on the keyboard. Find out which one and, if
    special, carry out the associated special action. Otherwise,
    add the character to the stream of characters.
    This also includes immediate-echo: while the user is typing,
    it displays the characters typed. When a space is encountered, the
    word is parsed
    and the parser output overwrites the immediate-echo."

    | typeAhead nextCharacter line font x w charType terminatorFound purged |
    purged ← true.
    "self replaceSelectionWith2: (Text string: '' emphasis: emphasisHere).
    startBlock ← stopBlock."
    "self display."
    [purged]
        whileTrue:
            [beginTypeInBlock == nil
                ifTrue:
                    [UndoSelection ← self selection.
                    beginTypeInBlock ← startBlock deepCopy].
            self deselect.
            [sensor keyboardPressed]
                whileFalse: [].
            "Prepare for fast-echo loop"
            typeAhead ← WriteStream on: (String new: 128).
            line ← (startBlock expandBy: 9999 @ 0)
                        intersect: paragraph visibleRectangle.
            x ← startBlock left.
            font ← paragraph textStyle fontAt: emphasisHere.
            terminatorFound ← false.
            "Echo loop, accumulates chars in typeAhead stream until a
             space, period, or question mark"
             [terminatorFound = false]
                whileTrue: [[sensor keyboardPressed]
                        whileTrue:
                            [nextCharacter ← sensor keyboardPeek.
                            (self isTerminator: nextCharacter)
                                ifTrue: [terminatorFound ← true].
                            charType ← keyboard at: nextCharacter asciiValue + 1.
                            (self perform: charType with: typeAhead)
                                ifTrue: [↑self].
                            w ← font widthOf: nextCharacter.
                            charType = #normalCharacter: & (x + w <= line right)
                                ifTrue:
                                    [(font characterForm: nextCharacter)
                                        displayAt: x @ (line top + paragraph textStyle baseline - font
ascent).
                                    x ← x + w]]].
            (self shouldPurge: typeAhead contents)
                ifTrue:
```

```
                [purged ← true]
            ifFalse:
                [purged ← false]].
    ↑typeAhead contents
```

entryReadKeyboard

```
    "Key struck on the keyboard."
    "Put accumulated characters into sentence"

    self store: self echoKeyboard.
```

isTerminator: character

```
    "The acceptable terminators"

    ↑character = $
        or: [character = Character cr
            or: [character = $.
                or: [character = $?
                    or: [character = $.... "↑a"
                        or: [character = $ "↑e"
                            or: [character asciiValue = 27 "esc"]]]]]]
```

readKeyboard

```
    "Key struck on the keyboard."

    editMode
        ifTrue:
            [super readKeyboard]
        ifFalse:
            [self entryReadKeyboard]
```

*GlibStringHolderController methodsFor: 'process sentence'* getWord

```
    "Return the next word from string."

    | index word |

    index ← sentence findString: ' ' startingAt: sMarker.
    (index = 0)
        ifTrue:
            [index ← sentence findString: '?' startingAt: sMarker.
            (index = 0)
                ifTrue: [↑nil]
                ifFalse:
                    [word ← sentence copyFrom: sMarker to: index.
                    sMarker ← index + 1.
                    ↑word asUppercase]].
    (index = sMarker)
        ifTrue:
            [sMarker ← sMarker + 1.
            ↑nil].
    word ← sentence copyFrom: sMarker to: index - 1.
    sMarker ← index + 1.
    ↑word asUppercase
```

interpret: fStruct

```
    "Do the semantic processing indicated by fStruct."

    | cr |
    cr ← '
```

```
'.
    fStruct isEmpty
        ifFalse:
            [(fStruct asClause) do: [:x| self sendToProlog: x. self answer: cr, x, '.']].

processSentence
    "Parses anything that has been put into sentence"

    | w word |
    [(word ← self getWord) notNil]
        whileTrue:
            [word ← glibParser parse: word.
            w ← word , ' '.
            self replaceSelectionWith2: (Text string: w emphasis: emphasisHere).
            startBlock ← stopBlock.
            paragraph displayCaretForBlock: stopBlock.
            self autoScroll.
            word = '**PARSED'
                ifTrue:
                    [self controlTerminate.
                    self interpret: (FStructure on: glibParser cStructure).
                    self reset.
                    glibParser reset.
                    self controlInitialize]
                ifFalse:
                    [(word = '**EDIT'
                        or: [word = '**ABORT'])
                        ifTrue:
                            [self reset.
                            glibParser reset]]]

store: aString
    "receives the text from the interface controller"

    sentence ← sentence , aString.


GlibStringHolderController methodsFor: 'remote processing'

replyToProlog: aString
    "Eventually this method will pass aString off to
    a background (unix) prolog process."

    | r |
    RemoteProcessing
        ifTrue: [r ← RemoteCall solve: aString.
                r ok ifFalse: [self halt]]

sendToProlog: aString
    "Eventually this method will pass aString off to
    a background (unix) prolog process."

    self replyToProlog: '?-addClause(', aString, ').'


GlibStringHolderController methodsFor: 'link to parser'

setParser: p
    "link to parser"
```

```
    glibParser ← p.
```

*GlibStringHolderController methodsFor: 'keyboard menu selection'*

```
keyboarding: wordList
    "User has chosen to enter a menu-displayed item from the keyboard"
    "Several items in the menu may start with the same word; hence a set returned"

    |word index selectedWords|

    word ← (self echoKeyboard copyUpTo: $ ) asUppercase.

    word isEmpty ifTrue: [↑Set new].

    word first = $#
        ifTrue:
            [↑word].
    word isDigitString
        ifTrue:
            [wordList do:
                [:wd| (glibParser match: word in: wd)
                    ifTrue: [↑word]]].

    "The typed word must be a word (or first of many) in wordList"
    selectedWords ← glibParser partialMatch: word in: wordList.

    "If ? help was used, show a menu"
    ((word = '') or: [(word last = $?) & (selectedWords size > 1)])
        ifTrue:
            [selectedWords ← glibParser displayMenu: selectedWords default: nil].

    "If no matches so far, try spelling correction"
    selectedWords isEmpty
        ifTrue:
            [selectedWords ← self dwim: word couldBe: wordList strength: 50].

    ↑selectedWords
```

*GlibStringHolderController methodsFor: 'menu messages'*

```
cStruct
    self controlTerminate.
    glibParser displayCStructure.
    self controlInitialize

parse
    "Parses the selected string"

    self store: self selection string.
    self deselect.
    editMode ← false.
    self changed2: #toggleState.
    startBlock ← paragraph characterBlockForIndex: paragraph text size.
    stopBlock ← paragraph characterBlockForIndex: paragraph text size.
```

*GlibStringHolderController methodsFor: 'special characters'*

```
abort: characterString
    "↑a handler"

    sensor keyboard.
    characterString nextPutAll: '**ABORT '.
    glibParser reset.
    ↑false

backspace: characterStream
    "Disable backspace"

    sensor keyboard.
    ↑false

completion: characterString
    "esc handler"

    sensor keyboard.
    characterString nextPutAll: '?'.
    ↑false

edit: characterString
    "↑c handler"

    sensor keyboard.
    self toggleAlter: nil.
    ↑false

period: characterStream
    "Replaces dot  by space dot space"
    sensor keyboard.
    characterStream nextPutAll: ' . '.
    ↑false

terminator: characterStream
    "Replaces cr  by space"
    sensor keyboard.
    characterStream nextPut: $ .
    ↑false


GlibStringHolderController methodsFor: 'mode view access'

doNothing: aVacuousArg
    "Yet another distraction for the sake of the top label."

    | |
    ↑self

noOp
    "a do nothing for the sake of the label."

    | |
    ↑self

toggleAlter: aBoolean
    "self changeRequest ifFalse: [↑ self changed2: #toggleState]."

    editMode ← editMode not.
```

```
    glibParser reset.
    self reset.
    editMode
        ifTrue:
            [self store: '**EDIT ']
        ifFalse:
            [self store: '**ENTRY '].
    self changed2: #toggleState.
```

toggleState

```
    "Used by the Boolean view to find out what
     state is current: entry or edit"

    | |
    ↑editMode
```

*GlibStringHolderController methodsFor: 'mouse buttons'* initializeYellowButtonMenu

```
    self yellowButtonMenu: InglishYellowButtonMenu
        yellowButtonMessages: InglishYellowButtonMessages
```

processRedButton

```
    editMode
        ifTrue:
            [super processBoingoButton]
```

yellowButtonActivity

```
    "Determine which item in the yellow button pop-up menu is selected.
    If one is selected, then send the corresponding message to the object
    designated as the menu message receiver."
    "Modified to react to the mode"

    | index |
    editMode
        ifTrue:
            [yellowButtonMenu ~~ nil
                ifTrue:
                    [index ← yellowButtonMenu startUpYellowButton.
                    index ~= 0
                        ifTrue: [self menuMessageReceiver perform:
                                (yellowButtonMessages at: index)]]
                ifFalse: [super controlActivity]]
        ifFalse:
            [self store: ' '].
```

*GlibStringHolderController methodsFor: 'initialize-release'* initialize

```
    RemoteProcessing ifTrue: [RemoteCall startUp].
    keyboard ← Keyboard deepCopy.
    keyboard at: 2 put: #abort:.
    keyboard at: 6 put: #edit:.
    keyboard at: 28 put: #completion:.
    keyboard at: 14 put: #terminator:.
    keyboard at: 47 put: #period:.
    self reset.
```

```
    editMode ← false.
    self changed2: #toggleState.
    super initialize.

release
    RemoteProcessing ifTrue: [RemoteCall terminate].
    glibParser release.
    glibParser ← nil.
    topView ← nil.
    ↑super release

reset
    sentence ← String new.
    sMarker ← 1.
    purgeWords ← String new.

topView: topV
    "Receives pointer to topView"

    topView ← topV.


GlibStringHolderController methodsFor: 'spelling correction'

dwim: aTestString couldBe: wordList strength: aSmallInteger
    ↑wordList select: [:each | ((each copyUpTo: $ ) spellAgainst: aTestString) > aSmallInteger]


GlibStringHolderController methodsFor: 'print answer'

answer: aString
    |point1 point2|
    "The answer ....."
    point1 ← paragraph text size.
    startBlock ← paragraph characterBlockForIndex: point1.
    point2 ← point1 + aString size + 1.
    stopBlock ← paragraph characterBlockForIndex: point2.
    self replaceSelectionWith2: aString asText.
    startBlock ← paragraph characterBlockForIndex: point2.
    self autoScroll.


GlibStringHolderController methodsFor: 'purging'

flush: phrase
    |index tail| "Skip over the tail of a phrase"
    tail ← phrase tail.
    index ← sentence findString: tail startingAt: sMarker.
    index = 0
        ifFalse:
            [sMarker ← index + (tail size) + 1]
        ifTrue:
            [purgeWords ← purgeWords , phrase , ' '].
predict: words
    "Single prediction: have to allow for fast typers"

    purgeWords ← purgeWords , words.
    self store: words.
```

```
shouldPurge: word
    "If the character has been predicted, flush it"

    |index|
    purgeWords isEmpty
        ifTrue:
            [↑false]
        ifFalse:
            [index ← purgeWords findString: word asUppercase startingAt: 1.
            index = 0
                ifTrue:
                    [purgeWords ← String new.
                    ↑false]
                ifFalse:
                    [purgeWords ← purgeWords copyFrom: index + word size to: purgeWords size.
                    self replaceSelectionWith2: (Text string: '' emphasis: emphasisHere).
                    startBlock ← stopBlock.
                    ↑true]].


GlibStringHolderController methodsFor: 'scrolling'

autoScroll
    "Scroll until the selection is in the view"

    | lineHeight deltaY clippingRectangle |
    lineHeight ← paragraph textStyle lineGrid.
    clippingRectangle ← paragraph clippingRectangle.
    deltaY ← stopBlock top - clippingRectangle top.
    deltaY >= 0
        ifTrue: [deltaY ← stopBlock bottom - clippingRectangle bottom max: 0].
                    "check if stopIndex below bottom of clippingRectangle"
    deltaY ~= 0
        ifTrue: [self scrollBy: (deltaY abs + lineHeight - 1 truncateTo: lineHeight)
                            * deltaY sign].
"-------------------"

GlibStringHolderController class
    instanceVariableNames: ''


GlibStringHolderController class methodsFor: 'class initialization'

initialize
    RemoteProcessing ← false.
    InglishYellowButtonMenu ←
        PopUpMenu
            labels:
'copy
cut
paste
undo
c-struct
DO IT'
    lines: #(4 5).
    InglishYellowButtonMessages ←
        #(copySelection cut paste undo cStruct parse).

    "GlibStringHolderController initialize."
```

*GlibStringHolderController class methodsFor: 'instance creation'*

```
new: application
    "Pointers"

    | t v |
    t ← self new.
    t initialize.
    v ← GParse new: application interface: t.
    t setParser: v.
    v ← nil.
    ↑t
```

*GlibStringHolderController class methodsFor: 'remote processing'*

```
doRemoteProcessing
    RemoteProcessing ← true.
    RemoteCall startUp

noRemoteProcessing
    RemoteProcessing ← false

GlibStringHolderController initialize
PopUpMenu subclass: #GlibPopUpMenu
    instanceVariableNames: ''
    classVariableNames: ''
    poolDictionaries: ''
    category: 'Glib-Interface'
```

*GlibPopUpMenu methodsFor: 'display menu'*

```
startUp: aSymbol
    "Display and make a selection from the receiver as long as
    the button
    denoted by the symbol, aSymbol, or keyboard activity, is
    pressed.
    Answer the current selection."

    self displayAt: Sensor cursorPoint
        during:
            [Sensor cursorPoint: marker center.
            [Sensor keyboardPressed | (self buttonPressed: aSymbol)]
                whileFalse: [].
            Sensor keyboardPressed
                ifTrue: [selection ← nil]
                ifFalse: [[self buttonPressed: aSymbol]
                            whileTrue: [self manageMarker]]].
    ↑selection
StringHolderView subclass: #GlibStringHolderView
    instanceVariableNames: ''
    classVariableNames: ''
    poolDictionaries: ''
    category: 'Glib-Interface'

"-----------------"

GlibStringHolderView class
    instanceVariableNames: ''
```

GlibStringHolderView class comment:
'A specializtion of StringHolderView for Glib'

*GlibStringHolderView class methodsFor: 'instance creation'* open: application

```
    "Create a standard system view of the model, aStringHolder, as viewed by
    an instance of me. The label of the view is aString."
    "application is passed to GParse to choose the appropriate grammar and dictionary"

    | aStringHolderView topView topController myLabel |
    GlibStringHolderController initialize.
    aStringHolderView ← self container: StringHolder new.
    topController ← GlibStringHolderController new: application.
    aStringHolderView controller: topController.
    topView ← StandardSystemView new.
    topView model: aStringHolderView model.
    topView label: 'INGLISH' asText.
    application = 'peg'
        ifTrue: [myLabel ← 'TEK4404 Fact Retrieval System'].
    application = 'glib'
        ifTrue: [myLabel ← 'GLIB Knowledge Acquisition'].
    application = 'nanoglib'
        ifTrue: [myLabel ← 'Experimental GLIB Semantics'].

    topView borderWidth: 1.
    topView addSubView: aStringHolderView
            in: (0@0.1 extent: 1@0.9)
            borderWidth:1.
    topView addSubView:
        (BooleanView   on:topController
                       aspect: #noOp
                       label: myLabel asText
                       change: #doNothing:
                       value: true)
            in: (0 @ 0.0 extent: 0.75 @ 0.1)
            borderWidth: 1.
    topView addSubView:
        (BooleanView   on:topController
                       aspect: #toggleState
                       label: 'Entry' asText
                       change: #toggleAlter:
                       value: true)
            in: (0.75 @ 0.0 extent: 0.25 @ 0.1)
            borderWidth: 1.

    topController topView: topView.

    topView minimumSize: 600 @ 300.
    topView controller open
Array variableSubclass: #CStructureNode
    instanceVariableNames: ''
    classVariableNames: ''
    poolDictionaries: ''
    category: 'Glib-Semantics'
```

*CStructureNode methodsFor: 'accessing'* height

```
    "Return the height of the subtree for which
    I am the root."

    | totalHeight |
    self isLeaf
        ifTrue: [↑1]
        ifFalse:
            [totalHeight ←
                (self at: 2) contents inject: 0 into:
                    [:total :node |
                    total ← (node height) + 1 max: total].
            ↑totalHeight]
```

subNodes

```
    "Return an array of my subNodes."

    ↑(self at: 2) contents
```

width

```
    "Return the width of the subtree for which
    I am the root."

    | totalWidth |
    self isLeaf
        ifTrue: [↑1]
        ifFalse:
            [totalWidth ←
                (self at: 2) contents inject: 0 into:
                    [:total :node |
                    total ← (node width) + total].
            ↑totalWidth]
```

*CStructureNode methodsFor: 'testing'* isLeaf

```
    "Am I a terminal node?"

    ↑(self at: 2) isMemberOf: String
```

*CStructureNode methodsFor: 'displaying'* displayAll

```
    "Display the parse tree."

    | nodeWidth leafWidth levelHeight nLeaves nLevels x y root dispObj |
    Display white.
    nLeaves ← self width.
    nLevels ← self height.
    leafWidth ← Display width - 20 / nLeaves asFloat.
    levelHeight ← Display height - 20 / nLevels asFloat.
    root ← Display boundingBox topCenter + (0 @ (levelHeight // 2)).
    x ← Display boundingBox topLeft x + 10
            + (Display boundingBox topRight x - 10 - (leafWidth * nLeaves truncated))
            // 2.
    y ← root y + (levelHeight truncated).
    dispObj ← ObjectOpaqueForm from: self.
    dispObj displayAt: root - ((dispObj extent x // 2) @ 0).
    root ← root + (0 @ (dispObj extent y)).
    (self at: 2) contents do:
```

```
        [:aNode|
        nodeWidth ← aNode width * leafWidth truncated.
        self displayNode: aNode
            atX: x
            atY: y
            dx: leafWidth truncated
            dy: levelHeight truncated
            from: root
            width: nodeWidth truncated.
        x ← x + nodeWidth].
    [Sensor leftShiftDown] whileFalse.
    ScheduledControllers restore
```

displayAt: aPoint

```
    "Display myself centered at aPoint."

    | dispObj |
    dispObj ← ObjectOpaqueForm from: self.
    dispObj displayAt: aPoint - (dispObj extent // 2)
```

displayForm

```
    "Return a form with my text for
    use by ObjectOpaqueForm."

    | form para text |
    (self at: 3) isNil
        ifTrue: [text ← self at: 1]
        ifFalse: [text ← (self at: 3), '\', (self at: 1)].
    (((self at: 2) isMemberOf: String) and: [(self at: 1) isWord not])
        ifTrue: [text ← text, '\\', (self at: 2)].
    para ← Paragraph withText: text withCRs asText.
    para centered.
    form ← para asForm.
    ↑form
```

displayNode: aNode atX: xStart atY: yStart dx: dx dy: dy from: aPoint width: myWidth

```
    | topCenter width x y newPoint pen dispObj |
    x ← xStart. y ← yStart + dy.
    topCenter ← myWidth // 2.
    newPoint ← (xStart + topCenter) @ yStart.
    pen ← Pen new.
    pen up; goto: aPoint; down; goto: newPoint.
    dispObj ← ObjectOpaqueForm from: aNode.
    dispObj displayAt: newPoint - ((dispObj extent x // 2) @ 0).
    newPoint ← newPoint + (0 @ (dispObj extent y)).
    aNode isLeaf ifFalse:
        [(aNode at: 2) contents do: [:node|
            width ← node width * dx.
            self displayNode: node
                atX: x
                atY: y
                dx: dx
                dy: dy
                from: newPoint
                width: width.
            x ← x + width]]
"- - - - - - - - - - - - - - - - - - -"

CStructureNode class
    instanceVariableNames: ''
```

*CStructureNode class methodsFor: 'instance creation'*

```
new
    ↑super new: 3

with: t1 with: t2
    ↑super with: t1 with: t2 with: nil
Dictionary variableSubclass: #FStructure
    instanceVariableNames: ''
    classVariableNames: 'ExtraClauses GensymCount '
    poolDictionaries: ''
    category: 'Glib-Semantics'
```

*FStructure methodsFor: 'generating symbols'*

```
gensym
    "Generate a (hopefully) unique symbol."

    ↑'g', (GensymCount ← GensymCount + 1) printString
```

*FStructure methodsFor: 'actions'*

```
checkop
    "Watch for any semantically interesting differences
    between reciprocal and inverse operations."

    ↑self

checkunit
    "Units may include a <measure prefix> which specifies
    a multiplicitive factor to be applied to the value of
    the measurement.  Return a string which gives the
    value in base units.  E.g. '10 MILLI VOLTS' => '1.0e-2'"

    (self keys includes: #val) ifFalse: [↑self].
    self at: #form put: (Compiler evaluate: (self at: #val), '*', (self at: #mul)) printString

defcomp
    "Turn a list of component descriptions into seperate clauses."

    | listFS |
    self removeKey: #action.        "what a kludge: prevents infinite looping"
    listFS ← self at: #dev.
    [listFS keys includes: #action] whileTrue:
        [self at: #arg2 put: (listFS at: #arg1) asTerm.
        ExtraClauses nextPut: self asTerm, '.'.        "write a component description"
        listFS ← listFS at: #arg2].
    self at: #arg2 put: listFS asTerm

defnode
    "Define a new node or two."

    | clause key arg sym |
    key ← #term1.
    arg ← #arg1.
    [key isNil]
        whileFalse:
```

```
[clause ← 'defnode(', (sym ← self gensym), ',', 'terminal(',
        (self at: #dev) asTerm, ',', (self at: key) asLowercase, '))'.
    ExtraClauses nextPut: clause.
    self at: arg put: 'node(', sym, ')'.
    ((self keys includes: #term2) & (key = #term1))
        ifTrue: [arg ← #arg2. key ← #term2]
        ifFalse: [key ← nil]]
```

defpath

```
"Define a new path."

self at: #form put: '/*notimpl*/'
```

notimpl

```
"Convert me into a valid signal description."

self at: #form put: '/*notimpl*/'
```

sigdesc

```
"Convert me into a valid signal description."

| listFS key desc comma bar |
listFS ← self.
[listFS keys includes: #list]
    whileTrue:
        [listFS ← listFS at: #list.
        self at: (key ← (listFS at: #prop) asSymbol) put: (listFS at: key)].
comma ← ','.
bar ← ',-'.
key ← self keys.
desc ← 'signal('.
(key includes: #class)
    ifTrue: [desc ← desc, 'waveshape(', (self at: #class), ')']
    ifFalse: [desc ← desc, '-'].
(key includes: #freq)
    ifTrue: [desc ← desc, comma, (self at: #freq) asTerm]
    ifFalse: [desc ← desc, bar].
(key includes: #amp)
    ifTrue: [desc ← desc, comma, (self at: #amp) asTerm]
    ifFalse: [desc ← desc, bar].
(key includes: #phase)
    ifTrue: [desc ← desc, comma, (self at: #phase) asTerm]
    ifFalse: [desc ← desc, bar].
(key includes: #offs)
    ifTrue: [desc ← desc, comma, (self at: #offs) asTerm]
    ifFalse: [desc ← desc, bar].
desc ← desc, ')'.
self at: #desc put: desc
```

sigprop

```
"Convert me into a valid signal description."

| desc bar prop comma |
bar ← ',-'.        "comma/underscore to everyone else"
comma ← ','.
prop ← (self at: #prop) asLowercase.
desc ← 'form(', (self at: #sig) asTerm, ',signal(-'.
prop = 'freq'
    ifTrue: [desc ← desc, comma, (self at: #val) asTerm]
```

```
        ifFalse: [desc ← desc, bar].
    prop = 'amp'
        ifTrue: [desc ← desc, comma, (self at: #val) asTerm]
        ifFalse: [desc ← desc, bar].
    prop = 'phase'
        ifTrue: [desc ← desc, comma, (self at: #val) asTerm]
        ifFalse: [desc ← desc, bar].
    prop = 'offs'
        ifTrue: [desc ← desc, comma, (self at: #val) asTerm]
        ifFalse: [desc ← desc, bar].
    self at: #form put: desc, '))'
```

*FStructure methodsFor: 'converting'*

```
asClause
    "Return a string representing the clause
    determined by my form.  As one GLIB statement
    may generate multiple clauses I use ExtraClauses
    to store the generated clauses."

    ExtraClauses ← WriteStream on: Array new.
    ExtraClauses nextPut: self asTerm.
    ↑ExtraClauses contents

asTerm
    "Return a string representing the term
    determined by my form."

    | stream term word |
    ((self keys) includes: #action)
        ifTrue: [self perform: (self at: #action) asSymbol].
    stream ← (self at: #form) asClauseStream.
    term ← WriteStream on: String new.
    [stream atEnd]
        whileFalse:
            [word ← stream next.
            word = '↑'
                ifTrue:
                    [word ← self at: stream next asSymbol.
                    (word isMemberOf: FStructure)
                        ifTrue: [word ← word asTerm]].
            term nextPutAll: word asLowercase].
    ↑term contents

value
    "Return my value. E.g. the value of an <integer>
    node is string representing that integer."

    | keys string |
    keys ← self keys.
    (keys includes: #sign)
        ifTrue: [string ← self at: #sign]
        ifFalse: [string ← ''].
    (keys includes: #int)
        ifTrue: [string ← string, (self at: #int)].
    (keys includes: #frac)
        ifTrue: [string ← string, '.', (self at: #frac)].
    (keys includes: #exp)
        ifTrue: [string ← string, 'e', ((self at: #exp) value)].
```

```
    string size > 0
        ifTrue: [↑string]
        ifFalse: [↑self]


FStructure methodsFor: 'private'

createFrom: aStream
    "Convert the C-Structure in aStream into an F-Structure."

    | child me |
    aStream isNil ifTrue: [↑self].
    me ← self.
    aStream contents do:
        [ :aTriple|
        ((aTriple at: 2) isMemberOf: ReadWriteStream)
            ifTrue:
                [(aTriple at: 3) isNil
                    ifTrue: [Transcript cr; show: 'No equations for ', (aTriple at: 1).]
                    ifFalse: [(child ← FStructure on: (aTriple at: 2))
                                isEmpty ifTrue: [child ← aTriple]]]
            ifFalse:
                [child ← aTriple].
        (aTriple at: 3) notNil
            ifTrue:
                [me ← me processAll: ((aTriple at: 3) copyFrom: 2 to: (aTriple at: 3) size - 1)
                        withChild: child]].
    ↑me

process: anEquation withChild: childFS
    | start stop key value sourceFS |
    (anEquation at: 1)
        ~= $↑ ifTrue: [self halt].
    anEquation = '↑=@' ifTrue: [(childFS isMemberOf: FStructure)
            ifTrue: [↑self merge: childFS]
            ifFalse: [↑childFS]].
    start ← 3.
    (anEquation at: start)
        = $(
        ifTrue:
            [(anEquation at: start + 1)
                = $↑ ifTrue: [sourceFS ← self].
            (anEquation at: start + 1)
                = $@ ifTrue: [sourceFS ← childFS].
            start ← 6.
            stop ← anEquation findString: ')' startingAt: start.
            key ← (anEquation copyFrom: start to: stop - 1) asSymbol.
            key ← (sourceFS at: key) asSymbol.
            stop ← stop + 1]
        ifFalse:
            [stop ← anEquation findString: ' ' startingAt: start.
            key ← (anEquation copyFrom: start to: stop - 1) asSymbol].
    start ← stop + 1.
    (anEquation at: start)
        = $<
        ifTrue:
            [stop ← (anEquation indexOf: $> ifAbsent: [self halt])
                    - 1.
            start ← start + 1]
        ifFalse: [stop ← anEquation size].
```

```
    value ← anEquation copyFrom: start to: stop.
    value ~= '@' & (value ~= '$')
        ifTrue: [self at: key put: value]
        ifFalse: [(childFS isMemberOf: FStructure)
                ifTrue: [value = '$'
                        ifTrue: [self at: key put: childFS value]
                        ifFalse: [self at: key put: childFS]]
                ifFalse: [childFS first first = $< & (childFS first last = $>)
                        ifTrue:
                            [self at: key put: (childFS at: 2).
                            ((childFS at: 2)
                                isMemberOf: String)
                                ifFalse: [self halt]]
                        ifFalse: [self at: key put: childFS first]]]
```

processAll: equations withChild: childFS

```
    | start stop |
    start ← 1.
    [stop ← equations findString: ';' startingAt: start.
    stop ~= 0]
        whileTrue:
            [self process: (equations copyFrom: start to: stop - 1) withChild: childFS.
            start ← stop + 2].
    ↑self process: (equations copyFrom: start to: equations size) withChild: childFS
```

*FStructure methodsFor: 'merging'* merge: anFS

```
    "Merge the FStructure anFS with myself."

    anFS keysDo:
        [:key | self at: key put: (anFS at: key)]
"- - - - - - - - - - - - - - - - - -"
```

```
FStructure class
    instanceVariableNames: ''
```

*FStructure class methodsFor: 'instance creation'* on: aStream

```
    ↑self new createFrom: aStream
```

*FStructure class methodsFor: 'initialization'* initialize

```
    GensymCount ← 0

    "FStructure initialize"
```

```
FStructure initialize
OpaqueForm subclass: #ObjectOpaqueForm
    instanceVariableNames: 'framed selected position '
    classVariableNames: ''
    poolDictionaries: ''
    category: 'Glib-Semantics'
ObjectOpaqueForm comment:
```

This is a subclass of OpaqueForm which is meant to be used with objects that have a printString. It put the object''s printString into a form, offset to allow for bordering and allows some manipulations.

Instance variables:

```
selected -	For selecting.  Selected ObjectOpaqueForms are shown in reverse.
framed -	For framing.  OOFs framed have a, you guessed it, frame drawn
		around them.
object -	Refers to the object this OOF is displaying.
position -	Gives the position where this OOF is currently being displayed.'
```

*ObjectOpaqueForm methodsFor: 'moving'* moveDirectlyTo: aPoint

```
"Move self to new position in 1 step.

| delta tempbckgrd background curLoc |
background ← Form white deepCopy extent: self extent.
delta ← aPoint - position.
background displayAt: position.
curLoc ← position.
self
    moveTo: (curLoc ← curLoc + delta) rounded
    restoring: background.
position ← curLoc rounded
```

moveDirectlyTo: aPoint background: background

```
"Move self to new position in 1 step with a given background
(used to improve performance)."

| delta tempbckgrd curLoc |
delta ← aPoint - position.
background displayAt: position.
curLoc ← position.
self
    moveTo: (curLoc ← curLoc + delta) rounded
    restoring: background.
position ← curLoc rounded
```

moveTo: aPoint

```
"Move self to new position in 10 steps.

| delta tempbckgrd background curLoc |
background ← Form white deepCopy extent: self extent.
delta ← aPoint - position scaleBy: 0.1 @ 0.1.
background displayAt: position.
curLoc ← position.
1 to: 10 do: [:i | self
        moveTo: (curLoc ← curLoc + delta) rounded
        restoring: background].
position ← curLoc rounded
```

*ObjectOpaqueForm methodsFor: 'accessing'* frame

```
framed ← true.
self borderWidth: 2.
self redisplay
```

framed

```
↑framed
```

```
position
    ↑position

position: aPoint
    position ← aPoint

select
    selected
        ifFalse:
            [selected ← true.
            self reverse]

selected
    ↑selected

unframe
    framed ← false.
    self borderWidth: 2 mask: Form white.
    self redisplay

unselect
    selected
        ifTrue:
            [selected ← false.
            self reverse.
            framed
                ifTrue: [self frame]
                ifFalse: [self unframe]]


ObjectOpaqueForm methodsFor: 'initialization'

initialize: anObject
    "anObject addDependent: self."
    framed ← false.
    selected ← false.
ObjectOpaqueForm methodsFor: 'displaying'

display
    "Changes my position to be aPoint."

    super displayOn: Display at: position

displayAt: aPoint
    "Resets position as a side effect"

    position ← aPoint.
    super displayAt: aPoint

displayOn: aDisplayMedium
    "Changes my position to be aPoint."

    super displayOn: aDisplayMedium at: position

displayOn: aDisplayMedium at: aPoint
    "Changes my position to be aPoint."

    position ← aPoint.
    super displayOn: aDisplayMedium at: aPoint
```

```
redisplay
    position ~ nil ifTrue:
        [figure
            displayOn: Display
            at: position
            clippingBox: Display boundingBox
            rule: Form over
            mask: nil]
```

*ObjectOpaqueForm methodsFor: 'image manipulation'*

```
reverse
    figure reverse.
    self redisplay
```

*ObjectOpaqueForm methodsFor: 'bordering'*

```
borderWidth: anInteger
    "Sets the border width of the form.  Used when selecting or
    unselecting "

    shape borderWidth: anInteger

borderWidth: anInteger mask: aMask
    "Sets the border width of the form.  Used when selecting or
    unselecting"

    shape borderWidth: anInteger mask: aMask
"------------------"

ObjectOpaqueForm class
    instanceVariableNames: ''
```

*ObjectOpaqueForm class methodsFor: 'instance creation'*

```
at: aPoint from: anObject
    "Create an objectOpaqueForm at a given position"

    ↑(self from: anObject) position: aPoint

at: aPoint of: anObject
    "Create an objectOpaqueForm at a given position"

    ↑(self of: anObject) position: aPoint

from: anObject
    "Turn anObject into its displayForm and make me look like that."

    | displayForm newForm |
    displayForm ← anObject displayForm.
    newForm ← Form extent: (displayForm extent + 4).
    displayForm displayOn: newForm at: 2@2.
    displayForm offset = 0
        ifFalse: [newForm offset: displayForm offset + (2@2)].
    ↑(super shape: newForm) initialize: anObject
```

of: anObject

```
    "Turn anObject into its printString and make me look like that."

    | displayForm newForm |
    displayForm ← anObject printString asDisplayText form.
    newForm ← Form extent: (displayForm extent + 4).
    displayForm displayOn: newForm at: 2@2.
    ↑(super shape: newForm) initialize: anObject
'From Smalltalk-80, version 2, of April 1, 1983 on 19 November 1984 at 1:06:13 pm'
```

*Object methodsFor: 'updating'* changed2: aParameter

```
    "Receiver changed. The change is denoted by the argument aParameter.
    Usually the argument is a Symbol that is part of the dependent's change
    protocol. Inform all of the dependents."

    self dependents do: [:aDependent | aDependent update2: aParameter].
```

*String methodsFor: 'GLIB'* asBuffer

```
    "(GLIB) Turns the string of words into a ReadWriteStream of words"

    |s x buffer|

    s ← self.
    buffer ← ReadWriteStream with: Array new.
    [x ← s copyUpTo: $ .
    buffer nextPut:-x.
    (s = x).]
        whileFalse:
            [s ← (s copyFrom: (x size + 2) to: (s size))].
    buffer reset.
    ↑buffer
```

asClauseStream

```
    "Convert myself to a Stream of words and delimiters."

    | delimiters start stop stream delString |
    delimiters ← Set with: $  with: $, with: $( with: $).
    stream ← ReadWriteStream on: Array new.
    start ← stop ← 1.
    [[stop <= self size and: [(delimiters includes: (self at: stop)) not]]
        whileTrue: [stop ← stop + 1].
        start ~= stop
            ifTrue: [stream nextPut: (self copyFrom: start to: stop - 1)].
        ((stop <= self size) and: [(self at: stop) ~= $ ])
            ifTrue:
                [delString ← String new: 1.
                delString at: 1 put: (self at: stop).
                stream nextPut: delString].
        stop < self size]
            whileTrue: [start ← stop ← stop + 1].
    stream reset.
    ↑stream
```

```
asTerm
    "Return a valid prolog term."

    ↑self asLowercase

isDigitString
    "A string of digits"

    | |
    self = ''
        ifTrue: [ ↑false]
        ifFalse:
            [self do: [:i| i isDigit ifFalse: [ ↑false]]].
    ↑true

isWord
    "Is the segment a word"

    | f l|
    (self = '') ifTrue: [ ↑false].
    f ← self first.
    l ← self last.
    ↑((f = $<) | (f = $() | (l = $>)) not

tail
    |index|
    index ← self findString: ' ' startingAt: 1.
    ↑self copyFrom: (index + 1) to: (self size)


ParagraphEditor methodsFor: 'sensor access'

processBoingoButton
    "The user pressed a red mouse button, meaning create a new text selection.
    Highlighting the selection is carried out by the paragraph itself. Double
    clicking causes a selection of the area between the nearest enclosing delimitors;
    extension is based on both ends if different."

    | paragraphOrigin selectionBlocks |
    self deselect.
    self closeTypeIn.
    paragraphOrigin ← paragraph compositionRectangle origin.
    selectionBlocks ← paragraph oingoBoingo: startBlock to: stopBlock.
    selectionShowing ← true.
    startBlock ← selectionBlocks at: 1.
    stopBlock ← selectionBlocks at: 2.
    self updateMarker.
    self setEmphasisHere
ParagraphEditor methodsFor: 'private'

replaceSelectionWith2: aText
    beginTypeInBlock == nil ifTrue: [UndoSelection ← self selection].
    paragraph
        replaceFrom: startBlock stringIndex
        to: stopBlock stringIndex - 1
        with: aText
        displaying: true.
    startBlock ← paragraph characterBlockForIndex: startBlock stringIndex.
    stopBlock ←
        paragraph characterBlockForIndex: startBlock stringIndex + aText size
```

*StringHolderController methodsFor: 'private'*

```
replaceSelectionWith2: aText
    super replaceSelectionWith2: aText.
    self lockModel
```

*Paragraph methodsFor: 'selecting'*

```
oingoBoingo: previousStartBlock to: previousStopBlock
    "Answer with an Array of two CharacterBlocks that represent the text selection that the user makes.
Allow for scrolling to extend selections."

    | pivotBlock startBlock stopBlock showingCaret dy pt okToScroll scrollDelay word |
    startBlock ← stopBlock ← pivotBlock ← self characterBlockAtPoint: Sensor cursorPoint.
    self displayCaretForBlock: pivotBlock.
    showingCaret ← true.
    okToScroll ← true.
    scrollDelay ← Delay forMilliseconds: 250. "For Dorados"
    [Sensor redButtonPressed] whileTrue: [
        pt ← Sensor cursorPoint.
        (okToScroll
         and: [(dy ← self dyForPoint: pt) ~= 0]) ifTrue: [
            [okToScroll ← false. scrollDelay wait. okToScroll ← true]
                forkAt: Processor userInterruptPriority.
            showingCaret
                ifTrue: [
                    self displayCaretForBlock: pivotBlock.
                    showingCaret ← false]
                ifFalse: [self reverseFrom: startBlock to: pivotBlock].
            self scrollBy: dy.
            pt ← dy < 0
                ifTrue: [clippingRectangle topLeft]
                ifFalse: [clippingRectangle bottomRight].
            pivotBlock ← self characterBlockForIndex: pivotBlock stringIndex.
            startBlock ← pivotBlock ].
        stopBlock ← self characterBlockAtPoint: pt.
        stopBlock = startBlock ifFalse: [
            showingCaret ifTrue: [
                self displayCaretForBlock: pivotBlock. showingCaret ← false].
             self reverseFrom: startBlock to: stopBlock.
             startBlock ← stopBlock] ].
    (showingCaret not and: [pivotBlock = stopBlock])
        ifTrue: [self displayCaretForBlock: pivotBlock].
    scrollDelay disable.
    (previousStartBlock = previousStopBlock and:
        [pivotBlock = stopBlock and: [stopBlock = previousStopBlock]])
        ifTrue: "select a word or bracketed range"
            [word ← self selectWord: pivotBlock stringIndex.
            word first = word last ifFalse:
                [self displayCaretForBlock: pivotBlock.
                pivotBlock ← self characterBlockForIndex: word first.
                stopBlock ← self characterBlockForIndex: word last.
                self reverseFrom: pivotBlock to: stopBlock]].
    stopBlock < pivotBlock "seems to ensure startBlock <= stopBlock in P.E."
        ifTrue: [↑Array with: stopBlock with: pivotBlock]
        ifFalse: [↑Array with: pivotBlock with: stopBlock]
```

*SwitchView methodsFor: 'updating'*

```
update2: aParameter
    highlightForm == nil
        ifTrue: [self interrogateModel
                    ifTrue: [(self label: 'Edit' asParagraph) displayComplemented display]
                    ifFalse: [(self label: 'Entry' asParagraph) displayNormal display]]
        ifFalse: [self display]
```

*BooleanView methodsFor: 'updating'*

```
update2: aspect
    aspect == selector ifTrue: [super update2: aspect]
```

We claim:

1. The method of acquiring rules for a computer-based expert system, said rules being characterized by conditions involving queries having more than one possible answer, said method comprising, serially receiving portions of a sentence input from an expert, checking said portions as they are received for their confirmation to a predetermined grammar based upon the logical formation of rules for a given subject matter, providing sentence portion selection information to said expert, wherein said selection information is given to the expert by way of feedback in instances where the expert inputs a sentence portion that does not conform to said predetermined grammar, and translating the sentence into the form of a diagnostic rule when the sentence is complete.

2. The method according to claim 1 wherein said feedback is provided in menu-fashion of possible next choices as would conform to said predetermined grammar.

3. The method of acquiring diagnostic rules for a computer-based expert system, said method comprising, serially receiving the words of a sentence input of an expert, checking each word as it is entered by simultaneously determining alternative parses for the partial sentence so far entered, providing feedback information to the expert when the word entered does not match any of the current partial parses, and translating the sentence into the form of a diagnostic rule.

4. The method according to claim 3 wherein said feedback information is provided in the form of a menu of possible next sentence portions for selection by the expert.

5. The method according to claim 3 wherein the development of said parses is implemented with a breadth-first parsing algorithm on a semantic grammar.

6. The method of acquiring rules for a computer-based expert system, said rules being characterized by conditions involving queries having more than one possible answer, said method comprising, receiving a first sentence portion as automatically determined to conform to a predetermined allowable grammatical construction fitting within an allowable logical sequence, also receiving at least a second sentence portion as automatically determined to conform to a predetermined allowable grammatical construction fitting within an allowable logical sequence with the first sentence portion, and employing said conforming portions to provide an expert rule, wherein at least upon non-conformation of a sentence portion, feedback is provided in the form of a choice of acceptable inputs as would satisfy currently allowable grammatical construction.

7. The method according to claim 6 wherein said choice is provided in the form of a selectable menu.

8. The method according to claim 6 wherein the last mentioned allowable grammatical construction is logically generated in sequence upon the first mentioned allowable grammatical construction.

9. The method of acquiring rules for a computer-based expert system, said rules being characterized by presentation of queries having more than one answer, said method comprising, serially receiving portions of a sentence from an expert wherein each of said portions conforms to a grammar based upon the logical formation of rules for said expert system and wherein a said sentence portion is received as a choice among alternatives electronically presented to said expert wherein successive menu-selections are provided to form succesive sentence portions, as prior menu-selections are completed, and employing said conforming portions to provide an expert rule.

10. The method of acquiring rules for a computer-based expert system, said rules being characterized by a predetermined grammar and conditions involving queries having more than one possible answer, said method comprising, serially receiving portions of a sentence input from an expert, in response to an already received portion of sentence input, generating alternatives for a next portion of a sentence permitted by said predetermined grammar, accepting a further portion of said sentence input from said expert as matches one of said alternatives, as said further sentence portion is accepted, continuing to generate allowable alternatives and accept matching input for following sentence portions from said expert until a statement is completed according to said predetermined grammar, and transforming the completed statement into the form of a diagnostic rule.

11. The method according to claim 10 including graphically presenting said alternatives for a next portion of said sentence to said expert and receiving said further portion of said sentence input from said expert in the form of a selection by said expert of one of the alternatives presented.

12. The method according to claim 10 including graphically presenting alternatives for a next portion of said sentence to said expert in response to input by said expert not matching one of said alternatives.

13. The method according to claim 10 including receiving numerical input from said expert as one or more of said sentence portions.

14. The method according to claim 10, wherein transforming the completed statement into the form of a diagnostic rule comprises:

constructing functional description equations from fragments of said statement, combining functional equations to form functional structures, and converting said functional structures to rule clauses.

* * * * *